US010129211B2

(12) United States Patent
Heath

(10) Patent No.: US 10,129,211 B2
(45) Date of Patent: Nov. 13, 2018

(54) METHODS AND/OR SYSTEMS FOR AN ONLINE AND/OR MOBILE PRIVACY AND/OR SECURITY ENCRYPTION TECHNOLOGIES USED IN CLOUD COMPUTING WITH THE COMBINATION OF DATA MINING AND/OR ENCRYPTION OF USER'S PERSONAL DATA AND/OR LOCATION DATA FOR MARKETING OF INTERNET POSTED PROMOTIONS, SOCIAL MESSAGING OR OFFERS USING MULTIPLE DEVICES, BROWSERS, OPERATING SYSTEMS, NETWORKS, FIBER OPTIC COMMUNICATIONS, MULTICHANNEL PLATFORMS

(71) Applicant: Stephan Heath, Littleton, CO (US)

(72) Inventor: Stephan Heath, Littleton, CO (US)

( * ) Notice: Subject to any disclaimer, the term of this patent is extended or adjusted under 35 U.S.C. 154(b) by 1621 days.

(21) Appl. No.: 13/712,919

(22) Filed: Dec. 12, 2012

(65) Prior Publication Data

US 2013/0268357 A1 Oct. 10, 2013

Related U.S. Application Data

(63) Continuation-in-part of application No. 13/233,352, filed on Sep. 15, 2011, now abandoned, and a
(Continued)

(51) Int. Cl.
*G06Q 30/02* (2012.01)
*H04L 29/06* (2006.01)
(Continued)

(52) U.S. Cl.
CPC ............ *H04L 63/00* (2013.01); *G06Q 10/10* (2013.01); *G06Q 30/02* (2013.01); *G06Q 50/01* (2013.01)

(58) Field of Classification Search
CPC ...................................................... G06Q 30/02
(Continued)

(56) References Cited

U.S. PATENT DOCUMENTS 6,073,124 A 6/2000 Krishnan et al.
7,630,936 B2 12/2009 Kumar et al.
(Continued)

OTHER PUBLICATIONS

Q. Huang and Y. Liu, "On Geo-social network services," 2009 17th International Conference on Geoinformatics, Fairfax, VA, 2009, pp. 1-6; date of conference: Aug. 12-14, 2009; date added to IEEE Xplore Oct. 23, 2009 (Year: 2009).*
(Continued)

*Primary Examiner* — Eric R Netzloff
*Assistant Examiner* — Michael R Stibley
(74) *Attorney, Agent, or Firm* — Peter B. Scull; Hamilton DeSanctis & Cha LLP

(57) ABSTRACT

A method, apparatus, computer readable medium, computer system, wireless or wired network, or system to provide an online and/or mobile security of a user's privacy and/or security method of internet or mobile access or system, apparatus, computer readable medium, or system using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated in a public cloud or a private cloud within an enterprise, a social network, big data analytics or electronic surveillance tracking or some mashup of two or more to prevent the unauthorized collecting, tracking and/or analysis of a user's personal data by a third party and/or for generating relevant advertising, mobile, internet
(Continued)

CLOUD COMPUTING SECURITY AND MOBILE CLOUD SECURITY FOR INTERNET OR MOBILE ACCESS

PROVIDING GUI FOR A USER TO SELECT USER CONTROLLED MOBILE SOCIAL DATA SECURITY AND PRIVACY CONFIGURATIONS OR FILTERS IN ONLINE COMMUNICATIONS AND SOCIAL MEDIA DATA CROSS MULTICHANNEL MOBILE PLATFORMS AND MOBILE COMPUTING TECHNOLOGIES FOR USER'S PREFERRED PRIVACY AND SECURITY, LOCATION-BASED AND 2D OR 3D MAPPED DATA AND SERVICES

↓

FOR SEARCHING, TEXT MESSAGING, INSTANT MESSAGING, INCLUDING MULTIMEDIA MESSAGING, MAP LOCATION, CROSS-CHANNEL MOBILE MESSAGING PLATFORMS, FILE TRANSFER, SEND MULTIMEDIA MESSAGING CONTENT, SHARE GEOGRAPHIC LOCATION CONTACTS, START GROUP CHATS, SEND VIDEOS OR IMAGES, SEND SOCIAL MESSAGING, BROWSING, PURCHASES, LIKES OR DISLIKES, LOCATION, INTERACTIONS OR BROWSING THE CONTENT OF A SOCIAL NETWORK OR MOBILE NETWORK OR OTHER APPLICATION ONLINE OR VIA A MOBILE DEVICE OR WIRELESS DEVICE OR OTHER COMMUNICATION DEVICE AND EXCHANGING DATA

↓

TO GENERATE TARGETED PROMOTIONS, SOCIAL MESSAGING, OR OFFERS IN A SOCIAL NETWORK AND ONLINE social messaging, internet posted promotions or offers for products and/or services.

3 Claims, 30 Drawing Sheets

Related U.S. Application Data continuation-in-part of application No. 13/337,271, filed on Dec. 26, 2011, and a continuation-in-part of application No. 13/594,842, filed on Aug. 26, 2012, now Pat. No. 8,909,771, and a continuation-in-part of application No. PCT/US2012/036896, filed on May 8, 2012, and a continuation-in-part of application No. 13/337,275, filed on Dec. 26, 2011, and a continuation-in-part of application No. 13/359,498, filed on Jan. 27, 2012, now Pat. No. 10,102,546, and a continuation-in-part of application No. 13/369,244, filed on Feb. 8, 2012, and a continuation-in-part of application No. 13/439,735, filed on Apr. 4, 2012, and a continuation-in-part of application No. 13/439,761, filed on Apr. 4, 2012, now Pat. No. 10,096,033, and a continuation-in-part of application No. 13/543,871, filed on Jul. 8, 2012, and a continuation-in-part of application No. 13/551,556, filed on Jul. 17, 2012, now Pat. No. 9,710,821, and a continuation-in-part of application No. 13/430,600, filed on Mar. 26, 2012.

(51) Int. Cl.
*G06Q 50/00* (2012.01)
*G06Q 10/10* (2012.01)

(58) Field of Classification Search
USPC .......................................................... 705/14
See application file for complete search history.

(56) References Cited

U.S. PATENT DOCUMENTS

| | | | |
|---|---|---|---|
| 7,756,756 B1 | 7/2010 | Lifson | |
| 7,831,476 B2 | 11/2010 | Foster et al. | |
| 7,860,852 B2 | 12/2010 | Brunner et al. | |
| 7,908,263 B1 | 3/2011 | Palz et al. | |
| 7,933,897 B2 | 4/2011 | Jones et al. | |
| 7,970,665 B1 | 6/2011 | Lifson | |
| 7,980,466 B2 | 7/2011 | Lee et al. | |
| 8,209,220 B2 | 1/2012 | Yoshikawa et al. | |
| 8,725,399 B2 | 5/2014 | Nonaka | |
| 2002/0055924 A1 | 5/2002 | Liming et al. | |
| 2002/0094868 A1 | 7/2002 | Tuck et al. | |
| 2002/0174073 A1* | 11/2002 | Nordman | H04L 63/0428 705/50 |
| 2003/0158796 A1 | 8/2003 | Balent | |
| 2004/0073634 A1* | 4/2004 | Haghpassand | G06F 21/50 709/220 |
| 2005/0027705 A1 | 2/2005 | Sadri et al. | |
| 2005/0203800 A1* | 9/2005 | Sweeney | G06Q 30/0214 705/14.16 |
| 2005/0288959 A1 | 12/2005 | Eraker et al. | |
| 2006/0170670 A1 | 8/2006 | Burke | |
| 2006/0238380 A1 | 10/2006 | Kimchi et al. | |
| 2006/0265197 A1 | 11/2006 | Peterson et al. | |
| 2007/0043766 A1 | 2/2007 | Nicholas et al. | |
| 2007/0143345 A1 | 6/2007 | Jones et al. | |
| 2007/0174259 A1 | 7/2007 | Amjadi | |
| 2007/0219712 A1 | 9/2007 | Abhyanker | |
| 2007/0265006 A1 | 11/2007 | Washok et al. | |
| 2008/0028341 A1 | 1/2008 | Szeliski et al. | |
| 2008/0086356 A1 | 4/2008 | Glassman et al. | |
| 2008/0140650 A1* | 6/2008 | Stackpole | G06F 17/3087 |
| 2008/0167992 A1* | 7/2008 | Kokernak | G06Q 10/0637 705/51 |
| 2008/0172288 A1 | 7/2008 | Pilkalns et al. | |
| 2008/0177603 A1 | 7/2008 | Muthugopalakrishnan et al. | |
| 2008/0201156 A1 | 8/2008 | Abhyanker et al. | |
| 2008/0214148 A1 | 9/2008 | Ramer et al. | |
| 2008/0222295 A1 | 9/2008 | Robinson et al. | |
| 2008/0243788 A1* | 10/2008 | Reztlaff | G06F 17/30657 |
| 2008/0300979 A1 | 12/2008 | Abhyanker et al. | |
| 2008/0307003 A1 | 12/2008 | O'Donnell | |
| 2008/0307498 A1 | 12/2008 | Johnson et al. | |
| 2009/0044246 A1* | 2/2009 | Sheehan | H04N 21/2221 725/146 |
| 2009/0070129 A1 | 3/2009 | Inbar et al. | |
| 2009/0070204 A1 | 3/2009 | Clancy et al. | |
| 2009/0144144 A1 | 6/2009 | Grouf et al. | |
| 2009/0163187 A1 | 6/2009 | Terrell et al. | |
| 2009/0187486 A1 | 7/2009 | Lefenfeld et al. | |
| 2009/0198607 A1 | 8/2009 | Badger et al. | |
| 2010/0042923 A1 | 2/2010 | Barcay et al. | |
| 2010/0094752 A1 | 4/2010 | Heath | |
| 2010/0119053 A1 | 5/2010 | Goeldi | |
| 2010/0145800 A1 | 6/2010 | Eraker et al. | |
| 2010/0169161 A1 | 7/2010 | Sacco | |
| 2010/0198684 A1 | 8/2010 | Eraker et al. | |
| 2010/0205541 A1* | 8/2010 | Rapaport | G06Q 10/10 715/753 |
| 2010/0226535 A1 | 9/2010 | Kimchi et al. | |
| 2010/0306066 A1 | 12/2010 | Binnewies et al. | |
| 2010/0325563 A1 | 12/2010 | Goldthwaite et al. | |
| 2010/0332368 A1* | 12/2010 | Alderucci | G06Q 40/04 705/37 |
| 2011/0004515 A1 | 1/2011 | Mesaros | |
| 2011/0029360 A1 | 2/2011 | Gollapalli | |
| 2011/0035284 A1 | 2/2011 | Moshfeghi | |
| 2011/0041168 A1 | 2/2011 | Murray | |
| 2011/0066615 A1 | 3/2011 | Pradhan et al. | |
| 2011/0082736 A1 | 4/2011 | Goldman et al. | |
| 2011/0173066 A1 | 7/2011 | Simmons et al. | |
| 2011/0191417 A1 | 8/2011 | Rathord | |
| 2011/0191432 A1 | 8/2011 | Layson et al. | |
| 2011/0196776 A1 | 8/2011 | Rash et al. | |
| 2011/0208724 A1 | 8/2011 | Jones et al. | |
| 2011/0208822 A1 | 8/2011 | Rathod | |
| 2011/0231363 A1 | 9/2011 | Rathod | |
| 2011/0238762 A1 | 9/2011 | Soni et al. | |
| 2011/0246305 A1 | 10/2011 | Brazeau et al. | |
| 2011/0258073 A1 | 10/2011 | Lifson et al. | |
| 2011/0260860 A1* | 10/2011 | Gupta | G06Q 30/02 340/539.13 |
| 2011/0264370 A1* | 10/2011 | Jakobson | G01C 21/3682 701/533 |
| 2011/0270701 A1 | 11/2011 | Black et al. | |
| 2011/0276396 A1 | 11/2011 | Rathod | |
| 2011/0276628 A1 | 11/2011 | Pell | |
| 2011/0283223 A1* | 11/2011 | Vaittinen | G01C 21/3647 715/781 |
| 2011/0313781 A1 | 12/2011 | Ho | |
| 2012/0036015 A1 | 2/2012 | Sheikh | |
| 2012/0054014 A1 | 3/2012 | Cho et al. | |
| 2012/0066037 A1 | 3/2012 | Glen | |
| 2012/0158471 A1 | 6/2012 | Jain et al. | |
| 2012/0245990 A1 | 9/2012 | Agarwal | |
| 2012/0254804 A1 | 10/2012 | Sheha et al. | |
| 2012/0290950 A1* | 11/2012 | Rapaport | H04L 51/32 715/753 |
| 2013/0039531 A1* | 2/2013 | Basso | G06F 3/005 382/103 |
| 2013/0073336 A1 | 3/2013 | Heath | |
| 2013/0073366 A1 | 3/2013 | Heath | |
| 2013/0073374 A1 | 3/2013 | Heath | |
| 2013/0073376 A1 | 3/2013 | Heath | |
| 2013/0073377 A1 | 3/2013 | Heath | |
| 2013/0073387 A1 | 3/2013 | Heath | |
| 2013/0073388 A1 | 3/2013 | Heath | |
| 2013/0073389 A1 | 3/2013 | Heath | |
| 2013/0073400 A1 | 3/2013 | Heath | |

(56) References Cited

U.S. PATENT DOCUMENTS

2013/0073473 A1 3/2013 Heath
2014/0006129 A1 1/2014 Heath
2016/0189174 A1 6/2016 Heath

OTHER PUBLICATIONS

Google Earth, ShowCase Mars, URL: http://www.google.com/earth/explore/showcase/mars.html capture data of Sep. 13, 2010, Internet Archive WayBack Machine.
Trademark Electronic Search System (TESS), Android, Oct. 1, 2014, United State Patent and Trademark Office.
Trademark Electronic Search System (TESS), Apple, Oct. 1, 2014, United State Patent and Trademark Office.
Trademark Electronic Search System (TESS), Blackberry, Oct. 1, 2014, United State Patent and Trademark Office.
Trademark Electronic Search System (TESS), Buy With Me, Oct. 1, 2014, United State Patent and Trademark Office.
Trademark Electronic Search System (TESS), Coca-Cola, Oct. 1, 2014, United State Patent and Trademark Office.
Trademark Electronic Search System (TESS), Coupon Cabin, Oct. 1, 2014, United State Patent and Trademark Office.
Trademark Electronic Search System (TESS), coupons.com, Oct. 1, 2014, United State Patent and Trademark Office.
Trademark Electronic Search System (TESS), Cyworld, Oct. 1, 2014, United State Patent and Trademark Office.
Trademark Electronic Search System (TESS), Eversave, Oct. 1, 2014, United State Patent and Trademark Office.
Trademark Electronic Search System (TESS), Gilt City, Oct. 1, 2014, United State Patent and Trademark Office.
Trademark Electronic Search System (TESS), Homerun, Oct. 1, 2014, United State Patent and Trademark Office.
Trademark Electronic Search System (TESS), Intel, Oct. 1, 2014, United State Patent and Trademark Office.
Trademark Electronic Search System (TESS), iPad, Oct. 1, 2014, United State Patent and Trademark Office.
Trademark Electronic Search System (TESS), iPod Touch, Oct. 1, 2014, United State Patent and Trademark Office.
Trademark Electronic Search System (TESS), KGB Deals, Oct. 1, 2014, United State Patent and Trademark Office.
Trademark Electronic Search System (TESS), Linkedin, Oct. 1, 2014, United State Patent and Trademark Office.
Trademark Electronic Search System (TESS), Linkshare, Oct. 1, 2014, United State Patent and Trademark Office.
Trademark Electronic Search System (TESS), Linux, Oct. 1, 2014, United State Patent and Trademark Office.
Trademark Electronic Search System (TESS), Macintosh, Oct. 1, 2014, United State Patent and Trademark Office.
Trademark Electronic Search System (TESS), Microsoft, Oct. 1, 2014, United State Patent and Trademark Office.
Trademark Electronic Search System (TESS), MIXI, Oct. 1, 2014, United State Patent and Trademark Office.
Trademark Electronic Search System (TESS), Multiply, Oct. 1, 2014, United State Patent and Trademark Office.
Trademark Electronic Search System (TESS), Old Navy, Oct. 1, 2014, United State Patent and Trademark Office.
Trademark Electronic Search System (TESS), Orkut, Oct. 1, 2014, United State Patent and Trademark Office.
Trademark Electronic Search System (TESS), Renren, Oct. 1, 2014, United State Patent and Trademark Office.
Trademark Electronic Search System (TESS), Retail Me Not, Oct. 1, 2014, United State Patent and Trademark Office.
Trademark Electronic Search System (TESS), Scoutmob, Oct. 1, 2014, United State Patent and Trademark Office.
Trademark Electronic Search System (TESS), Skyrock, Oct. 1, 2014, United State Patent and Trademark Office.
Trademark Electronic Search System (TESS), Smart Source, Oct. 1, 2014, United State Patent and Trademark Office.
Trademark Electronic Search System (TESS), Starbucks, Oct. 1, 2014, United State Patent and Trademark Office.
Trademark Electronic Search System (TESS), Superbowl, Oct. 1, 2014, United State Patent and Trademark Office.
Trademark Electronic Search System (TESS), Victoria's Secret, Oct. 1, 2014, United State Patent and Trademark Office.
Trademark Electronic Search System (TESS), Windows Vista, Oct. 1, 2014, United State Patent and Trademark Office.
Trademark Electronic Search System (TESS), Windows XP, Oct. 1, 2014, United State Patent and Trademark Office.
Trademark Electronic Search System (TESS), Woot!, Oct. 1, 2014, United State Patent and Trademark Office.
Trademark Electronic Search System (TESS),Badoo, Oct. 1, 2014, United State Patent and Trademark Office.
Trademark Electronic Search System (TESS),Bebo, Oct. 1, 2014, United State Patent and Trademark Office.
Trademark Electronic Search System (TESS),HI5, Oct. 1, 2014, United State Patent and Trademark Office.
Trademark Electronic Search System (TESS),Nexopia, Oct. 1, 2014, United State Patent and Trademark Office.
Trademark Electronic Search System (TESS),Tagged, Oct. 1, 2014, United State Patent and Trademark Office.
Trademark Electronic Search System (TESS),Tuenti, Oct. 1, 2014, United State Patent and Trademark Office.
Trademark Electronic Search System (TESS), Amazon, Oct. 1, 2014, United State Patent and Trademark Office.
Trademark Electronic Search System (TESS), Facebook, Oct. 1, 2014, United State Patent and Trademark Office.
Trademark Electronic Search System (TESS), Google, Oct. 1, 2014, United State Patent and Trademark Office.
Trademark Electronic Search System (TESS), Groupon, Oct. 1, 2014, United State Patent and Trademark Office.
Trademark Electronic Search System (TESS), IPhone, Oct. 1, 2014, United State Patent and Trademark Office.
Trademark Electronic Search System (TESS), Livingsocial, Oct. 1, 2014, United State Patent and Trademark Office.
International Search Report and Written Opinion of the International Searching Authority. International Application No. PCT/US2012/036896, issued by the United States Patent Office, dated Jul. 20, 2012, Alexandria Virginia.

\* cited by examiner

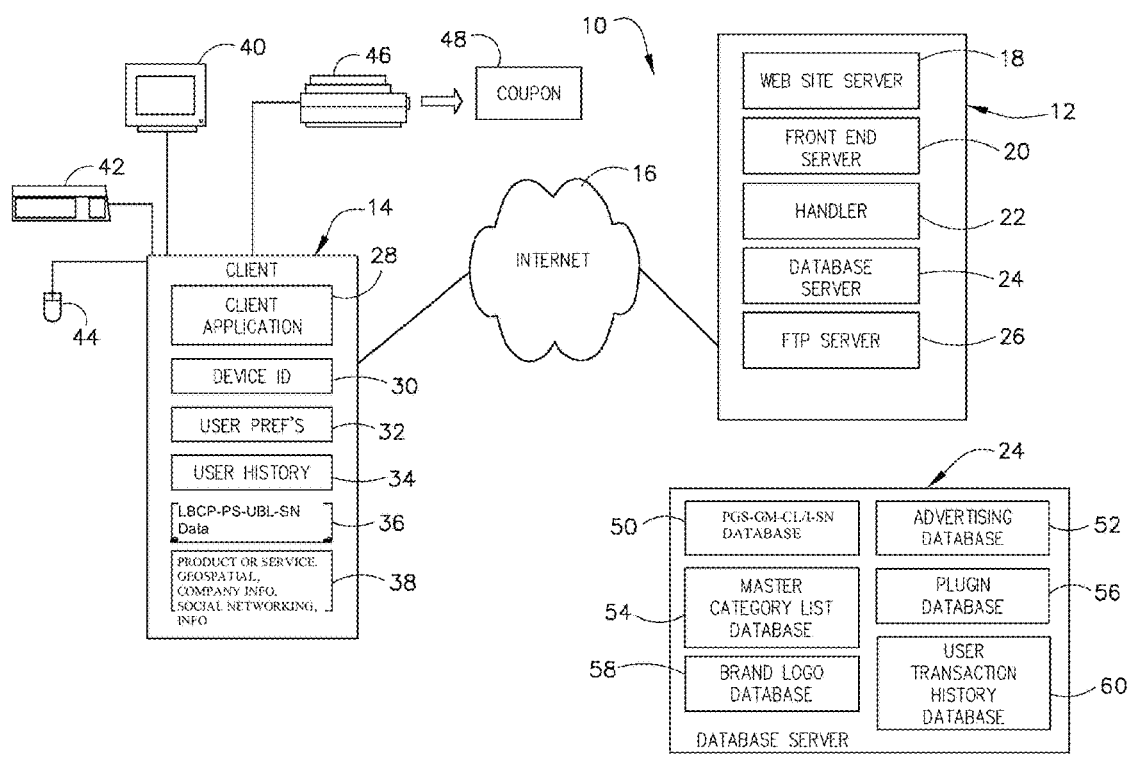

CLOUD COMPUTING SECURITY AND MOBILE CLOUD SECURITY FOR INTERNET OR MOBILE ACCESS

PROVIDING GUI FOR A USER TO SELECT USER CONTROLLED MOBILE SOCIAL DATA SECURITY AND PRIVACY CONFIGURATIONS OR FILTERS IN ONLINE COMMUNICATIONS AND SOCIAL MEDIA DATA CROSS MULTICHANNEL MOBILE PLATFORMS AND MOBILE COMPUTING TECHNOLOGIES FOR USER'S PREFERRED PRIVACY AND SECURITY, LOCATION-BASED AND 2D OR 3D MAPPED DATA AND SERVICES

FOR SEARCHING, TEXT MESSAGING, INSTANT MESSAGING, INCLUDING MULTIMEDIA MESSAGING, MAP LOCATION, CROSS-CHANNEL MOBILE MESSAGING PLATFORMS, FILE TRANSFER, SEND MULTIMEDIA MESSAGING CONTENT, SHARE GEOGRAPHIC LOCATION CONTACTS, START GROUP CHATS, SEND VIDEOS OR IMAGES, SEND SOCIAL MESSAGING, BROWSING, PURCHASES, LIKES OR DISLIKES, LOCATION, INTERACTIONS OR BROWSING THE CONTENT OF A SOCIAL NETWORK OR MOBILE NETWORK OR OTHER APPLICATION ONLINE OR VIA A MOBILE DEVICE OR WIRELESS DEVICE OR OTHER COMMUNICATION DEVICE AND EXCHANGING DATA

TO GENERATE TARGETED PROMOTIONS, SOCIAL MESSAGING, OR OFFERS IN A SOCIAL NETWORK AND ONLINE

FIGURE 29

CLOUD COMPUTING SECURITY AND MOBILE CLOUD SECURITY

IMPLEMENTING ON SAID CLOUD COMPUTING SECURITY SYSTEM CUSTOMIZED OR AUTOMATIC SELECTION BY THE USER OF AT LEAST ONE SECURITY OR PRIVACY CONFIGURATION SELECTED FROM OPTING OUT, FILTERING, PERSONAL FILTERING, MOBILE FILTERING, CATEGORIZING, ENCRYPTING, CONCEALING OR HIDING ONE OR MORE DATA SETS COMPRISING USER GENERATED POSTS OR BROWSING ACTIVITY ONLINE OR VIA A MOBILE OR WIRELESS DEVICE OR OTHER COMMUNICATION DEVICE, SOCIAL NETWORKING INTERACTIONS OR BROWSING THE CONTENT OF A SOCIAL NETWORK OR MOBILE NETWORK OR OTHER APPLICATION OR IMAGES OR VIDEOS, ONLINE COMMUNICATIONS AND SOCIAL MEDIA DATA CROSS MULTICHANNEL MOBILE PLATFORMS AND MOBILE COMPUTING TECHNOLOGIES FOR USER'S CONTROLS

FOR MANAGEMENT OF PRIVACY AND SECURITY SETTINGS FOR CLOUD COMPUTING SERVICES NETWORK FOR INTERNET OR MOBILE ACCESS SECURITY

ALLOWING INTERNET USERS TO PROTECT THEIR PRIVACY, SEARCHING, BROWSING, PURCHASES, LIKES OR DISLIKES, LOCATION, INTERACTIONS OR BROWSING THE CONTENT OF A SOCIAL NETWORK OR MOBILE NETWORK OR OTHER APPLICATION ONLINE OR VIA A MOBILE DEVICE OR WIRELESS DEVICE OR OTHER COMMUNICATION DEVICE

FROM ONE OR MORE SELECTED ADVERTISERS AND PUBLISHERS, GROUPS, BRAND MERCHANTS OR GLOBAL BRANDS OR DEMOGRAPHIC GROUPS, INDIVIDUALS, ACQUAINTANCES, MY WORK, MY FAMILY, MY FRIENDS, MY GAMES, MY THINGS, MY SOCIAL NETWORKS OR MOBILE NETWORKS OR OTHER COMMUNCIATION DEVICE OR MOBILE APPS OR OTHER MOBILE AD NETWORKS AND AD SERVERS, THIRD PARTY APPLICATIONS, PORTALS, WEBSITES, SOCIAL NETWORK AGGREGATION, OR COMBINATIONS THEREOF

FIGURE 30

CLOUD COMPUTING SECURITY AND MOBILE CLOUD SECURITY

USING ENCRYPTION TECHNOLOGIES WITH A MOBILE OR WIRELESS DEVICE AND ENCRYPTION WITH CLOUD COMPUTING, DECRYPTION AND VERIFYING BLOCKS OF DATA ANALYTICS

USING CLOUD COMPUTING AND MULTIPLE DATA CENTERS TO PROCESS PERSONAL DATA AND INFORMATION EXCHANGE WITH A MOBILE, WIRELESS OR WIRED NETWORK OR SYSTEM

WITH A COMBINATION OF COLLECTING, MINING, STORING, PROTECTING AND PREVENTING UNAUTHORIZED ACCESS TO PERSONAL DATA OF A USER OR OTHER INDIVIDUALS, SUCH AS FRIENDS' PHOTOGRAPHS OR LOCATION DATA AND OTHER INFORMATION IN A SOCIAL NETWORK BEFORE STORING PERSONAL INFORMATION IN THE CLOUD

FOR CONSUMER FEEDBACK ANALYTICS WITH A COMBINATION OF LOCATION TRACKING, SOCIAL MEDIA AND CLOUD-BASED DATA ANALYTICS, DATA TRANSFERS AND DATABASE MANAGEMENT SYSTEMS IN THE CLOUD USING ENCRYPTION TECHNOLOGIES WITH A MOBILE OR WIRELESS DEVICE FOR INTERNET OR MOBILE ACCESS OF THE PRESENT INVENTION

FIGURE 31

CLOUD COMPUTING SECURITY AND/OR MOBILE CLOUD SECURITY USING ENCRYPTION TECHNOLOGIES AND/OR FILTERS

TO ACCESS DATA, ENCRYPT AND/OR DECRYPT DATA, SYNC DATA, SECURE DATA STORAGE AND/OR PROCESS DATA USING CLOUD TECHNOLOGY ACROSS MANY DIFFERENT NETWORKS AND/OR FIBER OPTIC COMMUNICATIONS FROM AN ENDPOINT ACCESSED THROUGH MULTIPLE DEVICES, BROWSERS, OPERATING SYSTEMS, NETWORKS, SERVERS, STORAGE, SOFTWARE, APPLICATIONS OR SERVICES

INTEGRATED IN A PUBLIC CLOUD OR A PRIVATE CLOUD WITHIN AN ENTERPRISE, A SOCIAL NETWORK, BIG DATA ANALYTICS OR ELECTRONIC SURVEILLANCE TRACKING OR SOME MASHUP OF TWO OR MORE TO PREVENT THE UNAUTHORIZED COLLECTING, TRACKING AND/OR ANALYSIS OF A USER'S PERSONAL DATA, COMMUNICATIONS DATA, IDENTIFICATION DATA, LOCATION DATA AND/OR OTHER INFORMATION AND/OR DATA BY A THIRD PARTY

FOR MOBILE TRACKING, LOCATION TRACKING, SOCIAL MEDIA COMMUNICATIONS TRACKING, DATA TRACKING, IDENTIFICATION TRACKING, TRAFFIC ANALYSIS, ELECTRONIC SURVEILLANCE TRACKING OR CLOUD-BASED DATA ANALYTICS TRACKING

AND/OR FOR GENERATING RELEVANT ADVERTISING, MOBILE, INTERNET SOCIAL MESSAGING, INTERNET POSTED PROMOTIONS OR OFFERS FOR PRODUCTS AND/OR SERVICES.

FIGURE 32

METHODS TO SCAN A MOBILE OR WIRELESS DEVICE TO DETECT
TRACKING COOKIES AND/OR OTHER TRACKING TECHNOLOGIES

TO IDENTIFY WHO IS COLLECTING, TRACKING AND/OR ANALYZING A USER'S PERSONAL DATA, COMMUNICATIONS DATA, IDENTIFICATION DATA, LOCATION DATA AND/OR OTHER INFORMATION AND/OR DATA

FOR MOBILE TRACKING, LOCATION TRACKING, SOCIAL MEDIA COMMUNICATIONS TRACKING, DATA TRACKING, IDENTIFICATION TRACKING, TRAFFIC ANALYSIS, ELECTRONIC SURVEILLANCE TRACKING OR CLOUD-BASED DATA ANALYTICS TRACKING

AND/OR FOR GENERATING RELEVANT ADVERTISING, MOBILE, INTERNET SOCIAL MESSAGING, INTERNET POSTED PROMOTIONS OR OFFERS FOR PRODUCTS AND/OR SERVICES

FIGURE 33

METHODS AND/OR SYSTEMS FOR AN ONLINE AND/OR MOBILE PRIVACY AND/OR SECURITY ENCRYPTION TECHNOLOGIES USED IN CLOUD COMPUTING WITH THE COMBINATION OF DATA MINING AND/OR ENCRYPTION OF USER'S PERSONAL DATA AND/OR LOCATION DATA FOR MARKETING OF INTERNET POSTED PROMOTIONS, SOCIAL MESSAGING OR OFFERS USING MULTIPLE DEVICES, BROWSERS, OPERATING SYSTEMS, NETWORKS, FIBER OPTIC COMMUNICATIONS, MULTICHANNEL PLATFORMS

PRIORITY

This application is a continuation in part of, and/or claims priority to each of: U.S. application Ser. No. 13/233,352, filed Sep. 15, 2011; Ser. No. 13/337,271, filed Dec. 26, 2011; Ser. No. 13/337,275, filed Dec. 26, 2011; Ser. No. 13/359,498, filed Jan. 27, 2012; Ser. No. 13/369,244, filed Feb. 8, 2012; Ser. No. 13/430,600, filed Mar. 26, 2012; Ser. No. 13,439,735, filed Apr. 4, 2012; and/or Ser. No. 13/439,761, filed Apr. 4, 2012; Ser. No. 13/543,871 filed Jul. 8, 2012; Ser. No. 13/551,556, filed Jul. 17, 2012; Ser. No. 13/594,842 filed Aug. 26, 2012; and/or PCT application PCT/US2012/36896, filed May 8, 2012, each of which applications are entirely incorporated herein by reference.

FIELD OF THE INVENTION

The invention relates to in one aspect to one or more of a method, apparatus, computer readable medium, computer system, wireless or wired network, or system to provide an online and/or mobile security of a user's privacy and/or security method of internet or mobile access or system, apparatus, computer readable medium, or system using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated in a public cloud or a private cloud within an enterprise, a social network, big data analytics or electronic surveillance tracking or some mashup of two or more to prevent the unauthorized collecting, tracking and/or analysis of a user's personal data by a third party and/or for generating relevant advertising, mobile, internet social messaging, internet posted promotions or offers for products and/or services.

BACKGROUND

We are living in the world of Web 2.0, where hundreds of millions of people are connected to the Internet and/or millions of those people are connected to popular social networking sites like Facebook™, LinkedIn™, MySpace™ and/or Twitter™, using blogs and/or posting on YouTube™ and/or Flickr™. The vast amount of ways in which people can be connected online has sparked the interest of cloud computing services, and/or the like. The move to the cloud is one of the defining information technology trends of the early 21 century. By providing businesses, universities, government agencies and/or social networks with access to shared and/or often physical dispersed computing resources, cloud computing can simultaneously offer increased flexibility reduced cost and/or access to a wider array of services. However, cloud computing has also created a new set of security challenges for the user.

Cloud security is an evolving sub-domain of computer security, network security, and, more broadly, information security. It refers to a broad set of policies, technologies and/or controls deployed to protect data in motion or at rest, communications data, applications and/or the associated infrastructure of cloud computing. Cloud security and/or the mobile space hold the most growth potential in the coming years. Cloud computing streamlines how software, business processes and/or services are accessed online and/or via a mobile or wireless device, and/or the like. In some computing applications, and/or services, a significant amount of personal data is exposed to others. For example, in a social networking site, the site requests personal information from the user, (e.g., name, profession, phone number, address, birthday, employer, high school or college attended, etc.). Therefore, a user is given some discretion in configuring his/her a user's privacy and/or security settings in order to determine how much of and/or at what breadth the personal information that may be shared between social networks.

The mobile and/or social revolutions create unpredictable and/or demanding compute loans. Cloud computing infrastructure is the only feasible way to deal with those demands. That is how mobile, social and/or clouds come together. They enable the modern connected society, where people and/or devices and/or applications from social networks that draw their power from compute clouds. Indexing mobile information by location is becoming increasingly important, especially in real-time. The rises of online social networks offer new ways of interacting with other users online, but it also presents challenges in protecting users' privacy and/or safeguarding personal information. People may use social networking services for different reasons: to network with new contacts, reconnect with former friends, maintain current relationships, build or promote a business or project, participate in discussions about a certain topic, or just have fun meeting and/or interacting with other users. When you share information online or in a social network, you need to understand/or the potential risks, and/or be wary of what you share and/or with whom.

In determining the appropriate a user's privacy and/or security settings a user may be given a variety of choices. For example, some sites ask multiple pages of questions to the user in attempting to determine the appropriate settings. Answering the questions may become a tedious and/or time intensive task for the user. As a result, the user may forego configuring his/her preferred a user's privacy and/or security settings. The information exchange of a mobile device with social network systems provides little protection for a user's privacy and/or security settings. These systems require the user to allow access to his or her social network profile and/or location data information and/or at the same time associate that information with the user's identity. Since technology is moving to the cloud, mobile security is going to become even more important than ever. That is why encrypting sensitive personal data is now one of the most important safeguards to enhance information security and/or protect a user's information in the cloud.

SUMMARY OF THE INVENTION

Methods, systems, and/or networks are provided for managing security and/or privacy settings using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent to prevent the unauthorized collecting, tracking and/or analysis of a user's personal data, communications data, identification data, location data and/or other information and/or data by a third party using cloud computing analytics are disclosed. In one embodiment, the method includes communicably coupling a first client to a second or additional client. The method also optionally includes propagating a portion of a plurality of security and/or privacy settings for the first client to the second or additional client. The method further optionally includes, upon receiving by the second or additional client, at least a portion, or subset, of the plurality of security and/or privacy settings for the first client, incorporating the received portion or subset of the plurality of security and/or privacy settings for the first client into a plurality of security and/or privacy settings for the second or additional client.

The present invention provides one or more of a method, apparatus, computer readable medium, computer system, wireless or wired network, or system to provide an online and/or mobile security of a user's privacy and/or security method of internet or mobile access or system, apparatus, computer readable medium, or system for using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud computing for internet or mobile access or system using encryption technologies and/or filters to provide that personal data, communications data, identification data, location data and/or other information and/or data remains secure in the cloud while accessing data via a mobile, wireless or wired network or system with a combination of collecting, mining, syncing and/or protecting data and/or preventing unauthorized access to a user's, others', or companies' or entities' data, such user's or others' media or communications data, data syncs and/or other information in a social network before storing personal data and/or other information in the cloud for consumer feedback analytics with a combination of location tracking, social media communications tracking, data tracking, identification tracking, traffic analysis, electronic surveillance tracking and/or cloud-based data analytics tracking, data transfers and/or data management systems for transactional data management and/or analytical data management (e.g., NoSQL) in the cloud and/or data storage encryption technologies for end user devices authentication protocols online or via a mobile or wireless device before accessing the information, and/or data in the cloud that has been encrypted to access applications, protect data in motion or at rest, communications data and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device, and/or the like.

The present invention provides one or more of a method, apparatus, computer-readable-medium, computer system, wireless or wired network, or system to provide an online and/or mobile security of a user's privacy and/or security method of cloud security to prevent the unauthorized collecting, tracking and/or analysis of a user's personal data, communications data, identification data, location data and/or other information and/or data by a third party using cloud computing analytics, including cloud data mining, cloud database monitoring or cloud-based application monitoring for location tracking, social media communications tracking, data tracking, identification tracking, traffic analysis, electronic surveillance tracking or cloud-based data analytics tracking and/or for generating relevant advertising, mobile, internet social messaging, internet posted promotions, social messaging or offers in the cloud from an endpoint accessed through multiple devices, browsers, operating systems, networks, servers, storage, software, applications or services with cloud computing integration of cloud-based applications and/or cloud-based services with multiple devices, browsers, operating systems, networks, fiber optic communications, multichannel platforms and/or multiple data centers, social networks and/or mobile platforms or mapping applications that access, store and/or process data in the cloud including user's identifiable data, user's behavior data, location data, social networking preferences, online activities, notifications, online and/or mobile communications, spatial, social or when a user can provide or send messages, coupons, clickable advertisements, and/or mobile advertisements related to a location to other users via their mobile devices to their friends, family, business associates, or others, interactions or purchases made by friends or peers, user's behavior data, location data, sharing links or updates, communications, syncs and/or data transfers and/or data management systems for transactional data management and/or analytical data management in the cloud and/or how, when and/or to whom they share this data with third parties based upon user's preferred a user's privacy and/or security settings.

Mobile devices or smartphones can think, link and/or sync. Mobile device uses can include Internet access including access to and/or use of real-time, browsing, shopping and/or location-based data. A consumer's mobile device or smart phone according to the invention can be used for data collection and/or analysis relating, inter alia, to browsing activity, interests, and/or shopping habits, providing advertisers, publishers, and/or marketers with data that will allow them to provide target markets for online mobile promotions, optionally including fun-interactive platforms showcasing online deals, messages, coupons, clickable advertisements and/or mobile advertisements related to a location to other users via their mobile devices to their friends, family, business associates, or others, and/or wherein said user is then provided with additional coupons or discounts sent to a consumer's mobile device in real-time wherever they are in the world.

A 2D or 3D mapping system can optionally be used in the present invention, such as, but not limited to, Google Earth™, where users or methods of the invention will provide views of realistic satellite images of varying resolutions of the Earth's surface with satellite and/or aerial photos or icons of places around the world as they shop online for products and/or services. Advertisements and/or coupons optionally can appear on top of satellite and/or icon or advertisement imagery in their exact location on the planet using such location-based technologies according to the present invention.

Brand/or merchants or global brands, as used in the present invention, optionally display their products and/or services according to the present invention, e.g, on Social Earth, as an embodiment of the present invention, by optionally identifying and/or targeting consumers online or via a mobile or wireless device location-based technologies, e.g., which send consumers targeted promotions, social messaging, or offers via their mobile device. Brand/or merchants or global brands will monitor their locations worldwide on Social Earth to see how many consumers are taking advantage of a targeted promotion or offer and/or receive immediate consumer feedback, consumer data, optionally in real-time.

Aggregating Daily Deals, as used in the invention can include daily deal sites or social group buying sites in the U.S. and/or outside the U.S. providing shoppers with daily deals and/or lots of savings, including an aggregating service for daily deals that are relevant to them. Enables shoppers to get help from their friends and/or peers during the buying process.

The present invention can provide an online and/or mobile security of a user's privacy and/or security method of internet or mobile access or system, apparatus, computer readable medium, or system for using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud computing with a mobile, wireless or wired network or system with a combination of collecting, mining, syncing and/or protecting data and/or preventing unauthorized access to a user's, others', or companies' or entities' data, such user's or others' media or communications data, data syncs and/or other information in a social network before storing personal data and/or other information in the cloud for consumer feedback analytics with a combination of location tracking, social media communications tracking, data tracking, identification tracking, traffic analysis, electronic surveillance tracking and/or cloud-based data analytics tracking, data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device and/or encryption with cloud computing and/or data storage encryption technologies for end user devices authentication protocols online or via a mobile or wireless device before accessing the information and/or data in the cloud that has been encrypted to access applications, protect data in motion or at rest, communications data and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device and/or cloud security for internet or mobile access or system between communication interface devices accessing data in the cloud security prevent the unauthorized collecting, tracking and/or analysis of a user's personal data, communications data, identification data, location data and/or other information and/or data by a third party using cloud computing analytics, including cloud data mining, cloud database monitoring or cloud-based application monitoring for location tracking, social media communications tracking, data tracking, identification tracking, traffic analysis, electronic surveillance tracking or cloud-based data analytics tracking and/or for generating relevant advertising, mobile, internet social messaging, internet posted promotions, social messaging or offers using encryption technologies and/or filters to secure cloud security.

Accordingly, it is an object of the present invention to provide a new mechanism for tracking social behavior and/or profiling a user during the multimedia marketing of digital content, by any means known in the art, e.g., as disclosed in U.S. application Ser. No. 09/797,647, filed Mar. 1, 2001, which is entirely incorporated herein by reference. Another object of the invention is to provide cloud-type configuration and/or using cloud services storing and/or handling user or promoter data cross one or multiple applications, platforms, including mobile and/or websites, promotions, social messaging, or offers and/or generating and/or delivering targeted user behavior and/or tracking a user's profile, unique data and/or actions online or via a mobile or wireless device data.

And/or another object of the invention is to provide such a mechanism which operates continuously, whenever user/consumers want and/or without need for the actual physical availability of vendor and/or financial intermediary parties.

BRIEF DESCRIPTION OF THE DRAWINGS

FIG. 5 is a diagrammatic and/or block diagram view of a method or system for mapping display of location-based data social networking preferences, online activities, notifications and/or user's behavior data, location data, sharing links or updates, communications, syncs and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device and/or cloud computing sharing and/or consent sharing of Customized Promotions, Social Messaging, or Offers for Products or Services based on User behavior and/or tracking a user's profile, unique data and/or actions online or via a mobile or wireless device and/or Geographic Location, Social Networking, Encryption Technologies and/or Cloud Computing Security, ("LBCP-PS-UBL-SN-ET-CCS") system, according to an exemplary embodiment;

FIG. 6 is a simplified block diagram showing, in greater detail, a database server portion of the main server system shown in FIG. 1;

FIG. 29 is a flowchart illustrating steps which may be performed according to one or more methods associated with some embodiments of cloud computing security and/or mobile cloud security using encryption technologies and/or filters with a mobile or wireless device for internet or mobile access to the present invention.

FIG. 30 is a flowchart illustrating steps which may be performed according to one or more methods associated with some embodiments of cloud computing security and/or mobile cloud security using encryption with cloud computing and/or data storage encryption technologies for end user devices authentication protocols online or via a mobile or wireless device for internet or mobile access to the present invention.

FIG. 31 is a flowchart illustrating steps which may be performed according to one or more methods associated with some embodiments of cloud computing security and/or mobile cloud security using encryption technologies and/or filters with a mobile or wireless device and/or encryption with cloud computing, decryption and/or verifying blocks of big data analytics or electronic surveillance tracking using cloud computing and/or multiple data centers to process personal data, communications data and/or other information exchange with a mobile, wireless or wired network or system with a combination of collecting, mining, syncing and/or protecting data and/or preventing unauthorized access to a user's, others', or companies' or entities' data, such user's or others' media or communications data, data syncs and/or other information in a social network before storing personal data and/or other information in the cloud for consumer feedback analytics with a combination of location tracking, social media communications tracking, data tracking, identification tracking, traffic analysis, electronic surveillance tracking and/or cloud-based data analytics tracking, data transfers and/or database management systems in the cloud using encryption technologies and/or filters with a mobile or wireless device for internet or mobile access to the present invention.

FIG. 32 is a flowchart illustrating steps which may be performed according to one or more methods associated with some embodiments of cloud computing security and/or mobile cloud security using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated in a public cloud or a private cloud within an enterprise, a social network, big data analytics or electronic surveillance tracking or some mashup of two or more to prevent the unauthorized collecting, tracking and/or analysis of a user's personal data, communications data, identification data, location data and/or other information and/or data by a third party for mobile tracking, location tracking, social media communications tracking, data tracking, identification tracking, traffic analysis, electronic surveillance tracking or cloud-based data analytics tracking and/or for generating relevant advertising, mobile, internet social messaging, internet posted promotions or offers for products and/or services.

FIG. 33 is a flowchart illustrating steps which may be performed according to one or more methods associated with some embodiments of application that scans a mobile or wireless device to detect tracking cookies and/or other tracking technologies to identify who is collecting, tracking and/or analyzing a user's personal data, communications data, identification data, location data and/or other information and/or data for mobile tracking, location tracking, social media communications tracking, data tracking, identification tracking, traffic analysis, electronic surveillance tracking or cloud-based data analytics tracking and/or for generating relevant advertising, mobile, internet social messaging, internet posted promotions or offers for products and/or services.

DETAILED DESCRIPTION

Figure 1:
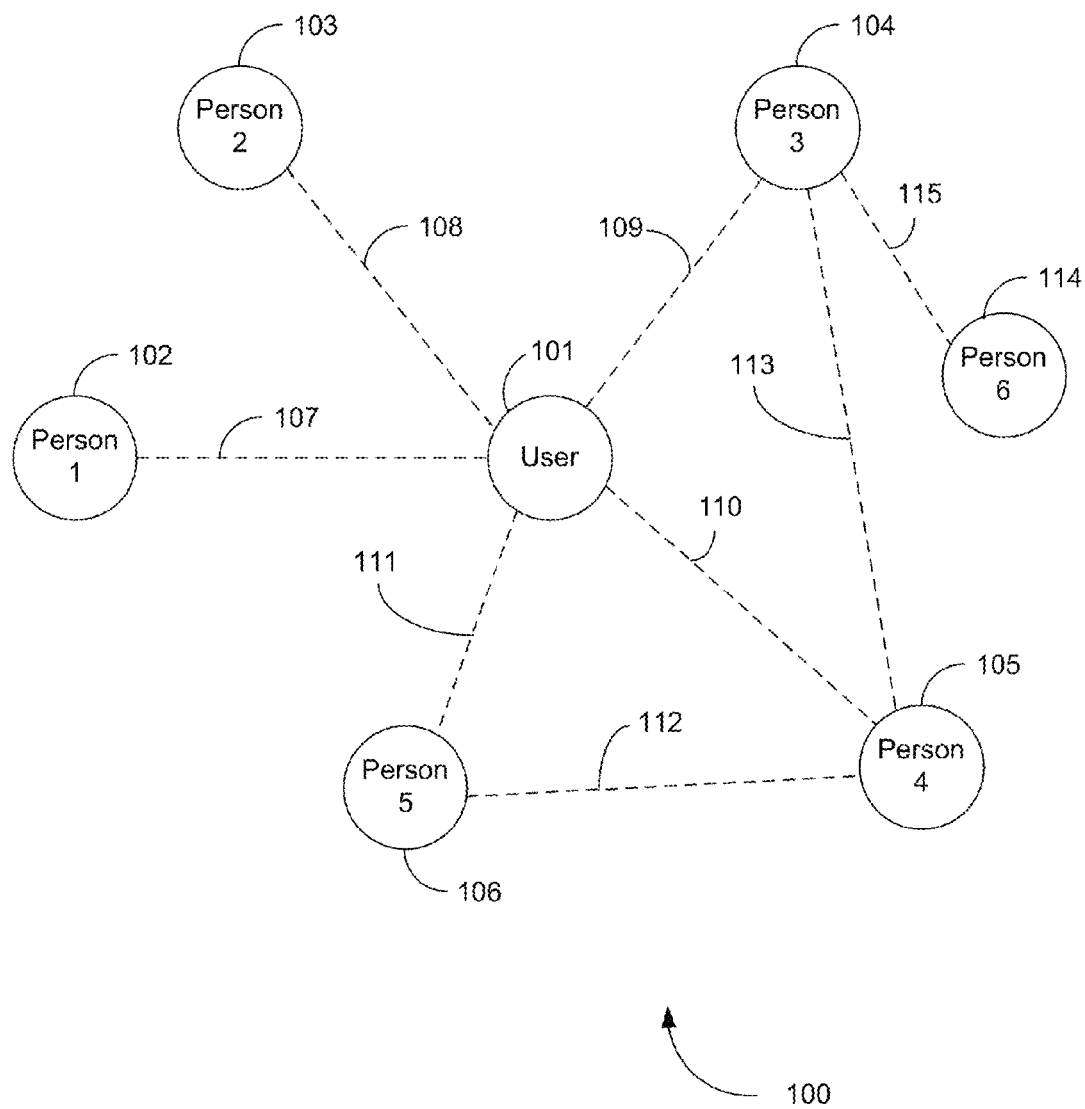
FIG. 1 illustrates an example of a social network for a user.

The invention provides one or more of a method, apparatus, computer readable medium, computer system, wireless or wired network, or system that provides one or more of user controlled online and/or mobile privacy, security and/or encryption technologies allowing users to:

optionally access data, encrypt and/or decrypt data, sync data, secure data storage and/or process data across different networks and/or communications accessed through multiple devices, browsers, operating systems, networks, servers, storage, software, applications or services, integrated with user controlled security settings optionally to prevent the unauthorized collecting, tracking and/or analysis of a user's personal data, communications data, identification data, location data and/or other information by a third party using cloud computing analytics for internet or mobile access or system optionally using encryption technologies and/or filters to provide that personal data, communications data, identification data, location data and/or other information and/or data remains secure.

The method, apparatus, computer readable medium, computer system, wireless or wired network, or system can further provided wherein the data is accessed via a mobile or wireless device and/or encryption with cloud computing, decryption and/or verifying blocks of big data analytics or electronic surveillance tracking using cloud computing and/or multiple data centers optionally to process personal data, communications data and/or other information exchange with a mobile, wireless or wired network or system optionally with a combination of collecting, mining, syncing and/or protecting data and/or preventing unauthorized access to a user's, others', or companies' or entities' data, such as friends', media or communications data, data syncs and/or other information in a social network before storing personal data and/or other information optionally for consumer feedback analytics with a combination of location tracking, social media communications tracking, data tracking, identification tracking, traffic analysis, electronic surveillance tracking and/or cloud-based data analytics tracking, data transfers and/or data management systems for transactional and/or analytical data management using encryption technologies and/or filters optionally to provide that personal data, communications data, identification data, location data and/or other information and/or data remains secure in the cloud while accessing data via a mobile or wireless device and/or encryption with cloud computing and/or data storage encryption technologies for end user devices authentication protocols online or via a mobile or wireless device.

The present invention further provides one or more of a method, apparatus, computer readable medium, computer system, wireless or wired network, or system to optionally provide methods for managing security and/or privacy settings using encryption technologies and/or filters to optionally access data, encrypt and/or decrypt data, sync data, secure data storage and/or process data across many different networks and/or fiber optic communications from an endpoint optionally accessed through multiple devices, browsers, operating systems, networks, servers, storage, software, applications or services integrated with cloud security prevent optionally to prevent the unauthorized collecting, tracking and/or analysis of a user's personal data, communications data, identification data, location data and/or other information and/or data by a third party using cloud computing-analytics are disclosed.

In one embodiment, the method optionally includes communicably coupling a first client to a second client. The method also includes propagating a portion of a plurality of security and/or privacy settings for the first client to the second client. The method further includes, upon receiving at the second client the portion of the plurality of security and/or privacy settings for the first client, incorporating the received portion of the plurality of security and/or privacy settings for the first client into a plurality of security and/or privacy settings for the second client.

The present invention optionally provides one or more of a method, apparatus, computer readable medium, computer system, wireless or wired network, or system to optionally provide online and/or mobile security of a user's internet or mobile access or system, apparatus, computer readable medium, or system for using encryption technologies and/or filters to access data, encrypt and/or decrypt data, sync data, secure data storage and/or process data across many different networks and/or fiber optic communications from an endpoint accessed through multiple devices, browsers, operating systems, networks, servers, storage, software, applications or services integrated with cloud computing optionally for internet or mobile access or system using encryption technologies and/or filters optionally to provide that personal data, communications data, identification data, location data and/or other information and/or data that remains secure in the cloud while accessing data via a mobile, wireless or wired network or system optionally with a combination of collecting, mining, syncing and/or protecting data and/or preventing unauthorized access to a user's, others', or companies' or entities' data, optionally such user's or others' media or communications data, data syncs and/or other information in a social network before storing personal data and/or other information in the cloud for consumer feedback analytics with a combination of location tracking, social media communications tracking, data tracking, identification tracking, traffic analysis, electronic surveillance tracking and/or cloud-based data analytics tracking, data transfers and/or data management systems for transactional data management and/or analytical data management (e.g., NoSQL) in the cloud and/or data storage encryption technologies for end user devices authentication protocols online or via a mobile or wireless device before accessing the information and/or data in the cloud that has been encrypted to access applications, protect data in motion or at rest, communications data and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device, and/or the like.

The present invention provides one or more of a method, apparatus, computer readable medium, computer system, wireless or wired network, or system to provide an online and/or mobile security of a user's privacy and/or security method of cloud security to prevent the unauthorized collecting, tracking and/or analysis of a user's personal data, communications data, identification data, location data and/or other information and/or data by a third party using cloud computing analytics, including cloud data mining, cloud database monitoring or cloud-based application monitoring for location tracking, social media communications tracking, data tracking, identification tracking, traffic analysis, electronic surveillance tracking or cloud-based data analytics tracking and/or for generating relevant advertising, mobile, internet social messaging, internet posted promotions, social messaging or offers in the cloud from an endpoint accessed through multiple devices, browsers, operating systems, networks, servers, storage, software, applications or services with cloud computing integration of cloud-based-applications and/or cloud-based services with multiple devices, browsers, operating systems, networks, fiber optic communications, multichannel platforms and/or multiple data centers, social networks and/or mobile platforms or mapping applications that access, store and/or process data in the cloud including user's identifiable data, user's behavior data, location data, social networking preferences, online activities, notifications, online and/or mobile communications, spatial, social or when a user can provide or send messages, coupons, clickable advertisements, and/or mobile advertisements related to a location to other users via their mobile devices to their friends, family, business associates, or others, interactions or purchases made by friends or peers, user's behavior data, location data, sharing links or updates, communications, syncs and/or data transfers and/or data management systems for transactional data management and/or analytical data management in the cloud and/or how, when and/or to whom they share this data with third parties based upon user's preferred a user's privacy and/or security settings.

The present invention provides one or more of a method, apparatus, computer readable medium, computer system, wireless or wired network, or system to provide an online and/or mobile security of a user's privacy and/or security method of cloud computing for privacy concerns and/or encryption of identifiable data, location data, sharing links or updates, communications, syncs and/or data transfers with cloud computing services integrated with cloud security access applications, protect data in motion or at rest, communications data, storage of data and/or processing of data from the cloud across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device.

The present invention provides one or more of a method, apparatus, computer readable medium, computer system, wireless or wired network, or system to provide an online and/or mobile security of a user's privacy and/or security method of cloud computing mobile technologies for user's controls for management of a user's privacy and/or security settings using encryption technologies and/or filters for cloud security for internet or mobile access or system allowing internet users to protect their private, data security and/or identity across different groups of contacts on multiple social networks with encrypted data, encrypted user identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third-party using cloud computing analytics and/or limit disclosure of a user's or end user' identifying information, user's current location and/or other important information and/or their communications, syncs and/or data transfers in the cloud and/or transmitted using multiple devices, browsers, operating systems, networks, fiber optic communications, multichannel platforms, infrastructures and/or applications such as social networks, mobile networks, mobile ad networks and/or ad servers, routers, processors or sub-processors, payment routers (routing a payment request), data centers, data syncing, data storage, data security, network operators, accessing third party applications or cloud-based applications integration or data in the cloud, securing it at the source and/or allowing a mobile or wireless device to access the user's data in the cloud and/or prevent the unauthorized collecting, tracking and/or analysis of a user's personal data, communications data, identification data, location data and/or other information and/or data by a third party using cloud computing-analytics, including cloud data mining, cloud database monitoring or cloud-based application monitoring for location tracking, social media communications tracking, data tracking, identification tracking, traffic analysis, electronic surveillance tracking or cloud-based data analytics tracking and/or for generating relevant advertising, mobile, internet social messaging, internet posted promotions or offers for products and/or services.

The present invention provides one or more of a method, apparatus, computer readable medium, computer system, wireless or wired network, or system to provide an online and/or mobile security of a user's privacy and/or security method of cloud security for internet or mobile access via a mobile or wireless device for an online payment system for coupons, products or services or combination thereof and/or data files using encryption technologies and/or filters to secure cloud-security using multiple devices, browsers, operating systems, networks, fiber optic communications, multichannel platforms and/or multiple data centers, social networks and/or mobile platforms to prevent the unauthorized collecting, tracking and/or analysis of a user's personal data, communications data, identification data, location data and/or other information and/or data by a third party using cloud computing analytics, including cloud data mining, cloud database monitoring or cloud-based application monitoring for location tracking, social media communications tracking, data tracking, identification tracking, traffic analysis, electronic surveillance tracking or cloud-based data analytics tracking and/or for generating relevant advertising, mobile, internet social messaging, internet posted promotions or offers for, consumer feedback analytics with a combination of location tracking, social media communications tracking, data tracking, identification tracking, traffic analysis, electronic surveillance tracking and/or cloud-based data analytics tracking and/or predictive analytics for sales of, products and/or services.

The method, apparatus, computer readable medium, computer system, wireless or wired network, or system can provide user controlled online and/or mobile privacy, security and/or encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or encryption with cloud computing, decryption and/or verifying blocks of big data analytics or electronic surveillance tracking using cloud computing and/or multiple data centers to process personal data, communications data and/or other information exchange with a mobile, wireless or wired network or system in delivery of computing as a service rather than as a product as categorized, Software as a Service (SaaS), Infrastructure as a Service (IaaS), Platform as a Service (PaaS), Storage as a Service (STaaS), Security as a Service (SECaaS), Data as a Service (DaaS), Test Environment as a Service (TEaaS), Desktop as a Service (DaaS), API as a Service (APIaaS), Backend as a Service (BaaS), Hardware as a Service (HaaS), Storage as a Service in cloud, Service-oriented architecture (SOA).

The method, apparatus, computer readable medium, computer system, wireless or wired network, or system can provide user controlled online and/or mobile privacy, security and/or encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or encryption with cloud computing, decryption and/or verifying blocks of big data analytics or electronic surveillance tracking using cloud computing and/or multiple data centers to process personal data, communications data and/or other information exchange with a mobile, wireless or wired network or system or application with a combination of collecting, mining, syncing and/or protecting data and/or preventing unauthorized access to a user's, others', or companies' or entities' data, such user's or others' media or communications data, data syncs and/or other information in a social network before storing personal data and/or other information in the cloud for consumer feedback analytics with a combination of location tracking, social media communications tracking, data tracking, identification tracking, traffic analysis, electronic surveillance tracking and/or cloud-based data analytics tracking, data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device.

The present invention provides one or more of a method, apparatus, computer readable medium, computer system, wireless or wired network, or system to provide an online and/or mobile security of a user's privacy and/or security method of cloud security for internet or mobile access or system using encryption technologies and/or filters to secure cloud security to prevent the unauthorized collecting, tracking and/or analysis of a user's personal data, communications data, identification data, location data and/or other information and/or data by a third party for mobile tracking, location tracking, social media communications tracking, data tracking, identification tracking, traffic analysis, electronic surveillance tracking or cloud-based data analytics tracking in the cloud using encryption technologies and/or filters to provide that personal data, communications data, identification data, location data and/or other information and/or data remains secure in the cloud while accessing data via a mobile or wireless device and/or cloud security between users of cloud computing service providers, servers, social networks, mobile networks, mobile ad networks and/or, advertisers and/or publishers, brands, global brands for collecting and/or analyzing for the embodiment of a user's privacy and/or security settings using encryption technologies and/or filters for cloud security of information about the individual, based upon user's personal and/or private information such as birthday, address, telephone number and/or more intimate details such as interests, hobbies, favorite books/films/music, relationship status and/or sexual preference.

Embodiments of the disclosure relate generally to the field of data processing systems. For example, embodiments of the disclosure relate to systems and/or methods for managing security and/or privacy settings. Throughout the description, for explanation, numerous specific details are set forth in order to provide a thorough understanding of the present disclosure. It will be apparent, however, to one skilled in the art that the present disclosure may be practiced without some of these specific details. In other instances, well-known structures and/or devices are shown in block diagram form to avoid obscuring the underlying principles of the present disclosure.

DEFINITIONS of terms herein include those well known in the art to those of ordinary skill in the art, and/or those provided in application Ser. No. 13/233,352, filed Sep. 15, 2011; Ser. No. 13/337,271, filed Dec. 26, 2011; Ser. No. 13/337,275, filed Dec. 26, 2011; Ser. No. 13/359,498, filed Jan. 27, 2012; Ser. No. 13/369,244, filed Feb. 8, 2012; Ser. No. 13/430,600, filed Mar. 26, 2012; Ser. No. 13/749,735, filed Apr. 4, 2012; and/or Ser. No. 13/439,761, filed Apr. 4, 2012; Ser. No. 13/135,43871 filed Jul. 8, 2012; Ser. No. 13/135,51556, filed Jul. 17, 2012; Ser. No. 13/594,842 filed Aug. 26, 2012; and/or PCT application PCT/US2012/36896, filed May 8, 2012, each of which applications are entirely incorporated herein by reference.

Asymmetric Key Encryption, as used in the present invention is most commonly used for sending data across trust boundaries, such as one person sending another person an encrypted email.

Authentication Protocols, as used in the present invention (e.g., transfer usernames and/or password via secure connections and/or transfer data securely to and/or from servers and/or encrypt stored data automatically) authentication protocols (e.g., transfer usernames and/or password via secure connections and/or transfer data securely to and/or from servers and/or encrypt stored data automatically) using cloud navigation and/or cloud security for internet or mobile access via online or a mobile device without disclosing a user's or end user's identifying information, user's current location data and/or their communications advertisement. The most effective way to provide users are adequately authenticated when using browsers to access services in cloud computing, is to facilitate an additional authentication factor outside of the browser (in addition to username/ password).

Big Data Analytics, as used in the present invention refers to a collection and/or analysis of data sets (e.g. blogs, tweets, emails, social media communications and/or more, etc.) online or via mobile or wireless devices so large and/or complex that it becomes difficult to process using on-hand/ or data management tools, which includes capture, curation, storage, search, sharing, analysis and/or visualization.

Cloud Computing, as used in the present invention has been widely recognized as the next generation's computing services. The term "cloud computing service" means a service that enables convenient, on-demand/or network access to a shared pool of configurable computing resources (e.g., including networks, servers, storage, software, applications or services, storage, software, applications or services, etc.) that can be rapidly provisioned and/or released with minimal management efforts or interaction by the provider of the service. Cloud computing is the use of computing resources (hardware and/or software) that are delivered as a service over a network. For example, cloud computing entrusts remote services with a processing of data in a public cloud or a private cloud within an enterprise, a social network, big data analytics or electronic surveillance tracking or some mashup of two or more, a user's data including (e.g., friends, events, groups, application users, profile information and/or photos, etc.) on servers at remote locations, software and/or computation. Cloud computing also offers some advantages by allowing users to use infrastructure (e.g., servers, routers, processors or sub-processors, payment routers (routing a payment request), data centers, networks, and/or storages, etc.), platforms (e.g., middleware services and/or operating systems, etc.), and/or software (e.g., application programs, etc.) provided by cloud providers (e.g., Google™ Apps, Amazon™ Web Services, Dropbox™ and/or Salesforce™) at low cost.

Cloud-Intelligent Network (CIN), as used in the present invention refers to security that is built into the network instead of overlay technology.

Cloud Services, as used in the present invention includes storage, managing and/or process a wide variety of data applications and/or other cloud services (e.g., collaborative cloud, custom cloud, data cloud, service cloud, sales cloud, tag clouds and/or other cloud services, etc.) using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated in a public cloud or a private cloud within an enterprise, a social network, big data analytics or electronic surveillance tracking or some mashup of two or more to prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/ or other information and/or data remains secure in the cloud while accessing data via a mobile or wireless device and/or cloud computing in (e.g., public cloud, private cloud, community cloud, regional cloud, social cloud, social cloud storage and/or hybrid cloud services, etc.)

Communications Data, as used in the present invention includes any transfer of electronic communications (e.g., sent through the Internet or fiber optic communications, email and/or communications via a network or service provider, etc.).

Consent, as used in the present invention includes that if the data subject has given his or her unambiguous consent to a data transfer, it may go ahead notwithstanding the lack of adequate protection.

Cross Syncing Channel Mobile Messaging, as used in the present invention allows cloud computing users' to send and/or transmit social media messaging content, share location data contacts, start group chats, send videos or images and/or so much more cross all types of mobile phones and/or multiple channel outlets. Consumers engage in cross syncing channel messaging without even thinking about it. Users post to social networks via text message, track and/or respond to friends' comments through email, upload photos directly from their mobile phone, and/or then chat about it over IM. Users can send text messages, multimedia messaging content like images, videos and/or share their current location cross-syncing channel mobile messaging on all major smartphone platforms and/or some Symbian based devices.

Cryptography, as used in the present invention includes encryption, which is the process of encoding messages (or information) in such a way that eavesdroppers or hackers cannot-read it, but that authorized parties can. There are two basic types of encryption schemes: private-key encryption and/or public-key encryption.

Electronic Surveillance, as used in the present invention includes observation from a distance by means of electronic equipment.

Encryption Technologies, limited examples of encryption techniques include without limitation, (e.g. encryption algorithms, symmetric encryption, public key encryption, cryptography algorithms, mathematic functions, ciphers and/or key exchange mechanisms, etc.) as used in the present invention, include without limitation, RC4, RC6, MARS, AES, DES, 3DES, Two-Fish, Blow-Fish and/or the like. Keychain Services API, provides secure storage for passwords, keys and/or so on. Software Cryptographic Message Syntax, provides (non-streaming) symmetric algorithm for voice encryption, SIP for controlling communications and/or video calls over IP and/or asymmetric encryption and/or decryption. Certificate, Key and/or Trust Services, provides software cryptographic supports services and/or trust validation. Other encryption technologies, include without limitation, Key Agreement Reference, Digital Signature Reference, Symmetric Encryption Reference, Cryptographic Hash Reference, SSL2 Algorithm Reference, SSL3 Algorithm Reference, TLS Algorithm Reference, S/MIME Algorithm Reference, PKCS#5 Algorithm Reference, PKCS#12 Algorithm Reference, Other Characteristics/Technologies. Security Transforms, perform symmetric encryption and/or decryption, asymmetric signing and/or verifying, and/or Base64 encoding and/or decoding in OS X.

Fiber-Optic Communication, as used in the present invention includes a method of transmitting information from one place to another by sending pulses of light through an optical fiber.

Geospatial Predictive Modeling, as used in the present invention is a process for analyzing events through a geographic filter and/or spatially correlating occurrences of historical geospatial locations in order to make statements of likelihood for even occurrence or emergence.

Humanitarian & Charitable Coupons or Sustainable Gifts, as used in the invention can include purchase of humanitarian coupons and/or sustainable gifts from organizations that provide food, water, shelter, medical supplies and/or educational supplies for those in need around the world. Consumers will also be able to contribute funds to humanitarian causes and/or charitable organizations in their Social Earth shopping cart.

Microblogging, as used in the present invention includes a type of blog that lets users publish short text updates.

Mobile Cloud Computing, as used in the present invention includes the usage of cloud computing in combination with at least some of the devices involved are a mobile or wireless device, and/or the like. The data processing and/or data storage happen outside the mobile device, and/or results are displayed through the mobile device screen or speakers. Mobile cloud applications move the computing power and/or data storage outside away from the mobile phones and/or into the cloud, bringing applications and/or mobile computing to not just smartphone users but also a much broader range of mobile subscribers. Mobile devices are connected to the mobile networks via base stations (e.g., base transceiver station (BTS), access point, or satellite) that establish and/or control the connection (air links) and/or functional interfaces between the networks and/or mobile devices. Mobile cloud computing integrates cloud computing into the mobile environment and/or overcomes obstacles related to the performance (e.g., battery life, storage and/or bandwidth), environment (e.g., heterogeneity, scalability and/or availability), and/or security (e.g., reliability and/or privacy). Mobile cloud computing services run on a remote server and/or data center and/or then sent to the user through mobile network operators (MNOs such as Verizon™, Vodafone™, Orange™ and/or AT&T™ and/or the like). The mobile cloud computing blends the feature of location, messaging, subscriber information, content, applications, apps, video and/or games, etc. from each operator.

Mobile Social Data Services, as used in the present invention display allows a mobile app or mobile social app or mobile social web or mobile geo-tagging to gain access to the contents of a map document through a web service. The range of device categories in the mobile world, and/or the array of different screen sizes and/or resolutions within those broad categories complicate matters. Advertisers seeking to reach a wide cross section of the mobile population must develop creative in a variety of sizes and/or formats, and/or work with mobile ad servers, routers, processors or subprocessors, payment routers (routing a payment request), data centers, data syncing, data storage, data security, network operators and/or other peripherals that can deliver the appropriate creative for a given device.

NoSQL, as used in the present invention refers to a variety of caching and/or database technologies associated with data management systems for transactional data management and/or analytical data management when working with a huge quantity of data.

Other Cloud Services, limited examples of other cloud services, include without limitation, the following ways of providing services in the Cloud, such as sharing and/or co-authoring computer files through a Collaboration Cloud, the use of cloud computing, whereby documents are uploaded to a central "cloud" for storage, where they can then be accessed by others. Cloud Backend, as used in the present invention includes integrating with cloud services to process and/or serve content. Custom Cloud, as used in the present invention refers to custom applications or cloud security for Internet or mobile access applications, game applications or business applications on the cloud. Cloud Marketing, as used in the present invention refers to any and/or all marketing efforts that take place on the Internet such as cloud media, paid search, search engine optimization and/or the Cloud provided as a service. Data Cloud, as used in the present invention refers to a collection of computing resources and/or to a set of delivery models. Managed Services, as used in the present invention includes an application from a cloud provider rather than end users such as anti-spam services or an application monitoring service. Sales Cloud, as used in the present invention includes a real-time sales collaborative tool that provides sales representatives with a complete customer profile and/or account history, allows the user to manage marketing campaign spending and/or performance access a variety of channels from a single application, tracks all opportunity-related data including milestones, decision makers, customer communications and/or any other information unique to he company's sales process. Service Cloud, as used in the present invention is a customer service application that provides customers with the ability to track their own cases 24 hours a day, includes a social networking plug-in that enables the user to join the conversations about their company on social networking websites, provides analytical tools and/or other services including email services, chatting tools, search and/or access to customers' entitlement and/or contracts. Service Commerce, as used in the present invention includes cloud solutions as a mix of SaaS and/or managed services. Social Cloud, as used in the present invention enables friends to share resources within the context of social networking. Social Storage Cloud, as used in the present invention is a storage service which provides an interface for users to access virtualized storage. Tag Cloud, as used in the present invention is a visual representation of word frequencies such as text data, which is typically used to depict keyword metadata (tags on websites, or to visualize free form text). Web-Based Cloud Services, as used in the present invention include an API for a service such as one involving payroll or credit card processing. There are many types of public cloud computing such as: Software as a Service (SaaS), Infrastructure as a Service (IaaS), Platform as a Service (PaaS), Storage as a Service (STaaS), Security as a Service (SECaaS), Data as a Service (DaaS), Test Environment as a Service (TEaaS), Desktop as a Service (DaaS), API as a Service (APIaaS), Backend as a Service (BaaS). Infrastructure as a service consists of raw computing power, storage and/or network bandwidth. Platform as a service includes databases, development tools and/or other components required supporting the delivery of custom applications. Software as a service includes applications both general, such as word processing, email and/or spreadsheets; and/or specialized, such as customer relationship management (CRM) and/or enterprise resource management (ERM). The cloud providers manage the infrastructure and/or platforms on which the applications run in the protection of data, protection of unauthorized access and/or infrastructure they provide in storing and/or protection of user's data including (e.g., friends, events, groups, application users, profile information and/or photos, etc.) on servers at remote locations and/or delivering services hosted in the cloud for user's of social networks or mobile networks or wireless networks or cloud security for internet or mobile access, and/or the like.

Predictive Analytics, as used in the present invention encompasses a variety of statistical techniques from modeling, machine learning, data mining algorithms and/or analyzing current and/or historical facts to make predictions about future events. Predictive analytics involves extracting information from data and/or using it to predict future trends and/or behavior patterns. Predictive models analyze past performance to assess how likely a customer is to exhibit a specific behavior in the future in order to improve multimedia marketing effectiveness.

Radio Frequency Identification (RFID), as used in the present invention is the use of a wireless non-contact system that uses radio-frequency electromagnetic fields to transfer data from a tag attached to an object for the purpose of automatic identification and/or tracking.

Session Initiation Protocol (SIP), as used in the present invention, is an IETF-defining signaling protocol widely used for controlling communication sessions such as voice and/or video calls over internet Protocol (IP). The protocol can be used for creating, modifying and/or terminating two-party or multiparty sessions. Sessions may consist of one or several media streams.

Social Media: as used in the present invention can include integrating social media links from, e.g., Facebook™, Twitter™ and/or Skype™, into a website, which creates "stickiness" and/or keeps users and/or consumers coming back to site.

Social Messaging, or sometimes referred to as "OTT messaging," as used in the present invention includes, Apple™ iMessage™, Skype™, Whatsapp™, Viber™, Tango™, Voxer™, Facebook™, PingMe™, Vonage™, Tu Me™, etc. Social messaging is embedded in many applications or cloud security for internet or mobile access applications, websites and/or services, e.g., words with friends, draw something, xbox live, PS network, Comcast.com, etc. Social messaging allows users to stay connected to their family, friends and/or colleagues on popular social networking sites such as Facebook™, Google™, Twitter™ and/or other social networks while on the go. Social messaging allows users to provide or send messages, coupons, clickable advertisements and/or mobile advertisements related to a location to other users via their mobile devices. Social messaging allows users to share social content, context and/or other information, communications, send personal or private messages or post notes, create user generated content, chat, interact with groups, group chat, images or videos, interactive games, media & entertainment, social/collaboration, mobile/location, wherein a user can provide or send messages, coupons, clickable advertisements, and/or mobile advertisements related to a location to other users via their mobile devices. Social Networking Aggregation, as used in the present invention is the process of collecting content from multiple social network services.

Software Cryptographic Session Key or Software Cryptographic Hash Function, as used in the present invention is an algorithm or encapsulating mechanism protecting data or metadata or virtual machine encryption distributed to end users performing a set of operations to protect confidentiality that takes an arbitrary block of data and/or returns a fixed size bit string such that an accidental or intentional change to the data will change the has value. Software cryptographic session key or software cryptographic hash functions have many information security applications or cloud security for Internet or mobile access applications, notably in digital signatures, message authentication protocols, codes (MACs), and/or other forms of protocols.

Spatial Interactions, as used in the present invention is the flow of products, people, services or information amount places, in response to localized supply and/or demand.

Symmetric Encryption, as used in the present invention is most commonly used for data at rest and/or as a session key in a number of encrypted networking schemes.

Transfer, as used in the present invention includes a processing of data from the cloud across many different networks and/or fiber optic communications from an endpoint accessed through multiple devices, browsers, operating systems, networks, servers, storage, software, applications or services.

Transmitting Secure Cloud Communications, as used in the present invention are Internet-based voice and/or data communications where telecommunications applications or cloud security for Internet or mobile access applications, switching and/or storage are hosted by a third-party outside of the organization using them, and/or they are accessed over a public Internet.

User's Personal Data, as used in the present invention includes access to a user's, others', or companies' or entities' data, such user's or others' media or communications data, data syncs and/or other information in a social network before storing personal data and/or other information in the cloud for consumer feedback analytics with a combination of location tracking and/or cloud-based data analytics tracking, data transfers and/or data management systems for transactional data management and/or analytical data management in the cloud and/or data storage, and the like.

Wireless Tracking Technology, as used in the present invention includes a system where wireless 3D markers are used to track position and/or orientation of an object. The user holds a wireless tracking market to specify where the 3D object is located in real-time.

Wireless Web (Wireless Internet/Mobile Web/Mobile Internet), as used in the present invention includes a mobile web a channel for delivery of web content, which offers and/or formats content to users in awareness of the mobile context. The mobile context is characterized by the nature of personal user information needs (e.g., updating your blog, accessing travel information, receiving news updated), constraints of mobile phones (e.g., screen size, keypad input) and/or special capabilities (e.g., location, connection type such as 3G or WLAN).

In managing a user's privacy and/or security settings using encryption technologies and/or filters for cloud security the system uses others' a user's privacy and/or security settings using encryption technologies and/or filters for cloud security in order to configure a user's privacy and/or security settings using encryption technologies and/or filters for cloud security. Hence, settings from other users are propagated and/or compared in order to automatically create a preferred configuration of settings for the user. Automatic creation of a user's privacy and/or security settings using encryption technologies and/or filters for cloud security may occur in various atmospheres between clients. For example, creation may occur between computer systems using security software, internet browsers of various computers, multiple internet browsers on one computer, user profiles in a social networking site, user profiles among a plurality of social networking sites, and/or shopper profiles among one or more internet shopping sites.

For purposes of explanation, embodiments are described in reference to user profiles among one or more social or mobile networking sites. The below description should not be limiting, as it will be apparent to one skilled in the art implementation using any type of website, platform, ASP, network, and/or the like. Additionally in the context of the present invention, the user of network, website and/or the like.

Social Networks and/or Cloud Computing

Most of us use cloud computing in social networks on-a daily basis, even if we don't realize it. For example, we use it when we use social media, when we use email, when we do our banking—cloud applications are everywhere. Social networking marks a huge range of personal cloud computing platforms and/or functions of interaction on the web. Cloud computing uses of a network-based application that handles users data storage. With the increasingly ubiquitous nature of social networks and/or cloud computing, users are starting to explore new ways to interact with, and/or exploit these developing paradigms in the cloud. Cloud services integrate software applications and/or web-based service and/or social networking sites to connect people in one location.

Social websites/networks allow people to create connections to other users. A user creates a profile and/or then connects to other users via his/her profile. Then a first user may send a friend request to a second user who he/she recognizes. If the request is accepted, the second user becomes an identified friend with the first user. The totality of connections for one user's profile creates a system of interactions of human relationships for the user. The social network platform may be used as a platform operating environment by users, allowing almost instantaneous communication between friends, acquaintances, professional colleagues, and/or the like. For example, these platforms allow friends and/or others to share interests, preferences, recommendations, favorites, etc., while allowing the user to perform standard tasks such as playing games (offline or online), sending emails or shopping online. These platforms also allow information from other third sources, including, news feeds, easy access shopping, banking, etc. As a result of the multitude of sources providing information and/or mashups are created for users. A mashup is defined as a web application that combines data from more than one source into an integrated tool. Many mashups of cloud services may be integrated into a social networking platform. Mashups also require some amount of user information. Therefore, whether a mashup has access to a user's information stored in the user profile is determined by a user's privacy and/or security settings using encryption technologies and/or filters for cloud security.

Although there is a level of trust between participants in a social network, this trust may not be sufficient in some situations. In a social cloud users should take into consideration the lack of control over corresponding user's actions and/or attempt to minimize risk of unauthorized access to user personal data and/or communications data in a social or mobile network by third parties.

A User's Privacy and/or Security Settings Using Encryption Technologies and/or Filters for Cloud Security In one embodiment, portions of a social network, websites, network, to be protected through a user's privacy and/or security settings using encryption technologies and/or filters for cloud security may be defined in six broad categories: user profile, user searches, feeds (e.g., news), messages and/or friend requests, applications, and/or external websites. Privacy settings for a user's profile controls what subset of profile information is accessible by whom. For example, in the present invention, users can control the types of information, activity, communications, browser use, and/or the like, that are accessible to external parties (e.g., advertisers and/or publishers, retailers, social networks or mobile networks or application, and/or the like), based on user selected profiles, account, privacy, and/or security settings.

Privacy settings can also optionally include, e.g., feed control of what information may be sent to a user in a feed. For example, the settings may control what type of news stories may be sent to a user via a news feed. E.g., as a non-limiting example, privacy settings control what part of a user profile, activity, communications and/or the like are visible to others or what data is accessible to others. Privacy settings for an Application category control settings for applications connected to a user profile or other settings. For example, the settings may determine if an application is allowed to receive the user's activity information with the social networking site and/or other networks or advertisers and/or publishers. Privacy settings for an External website category control information that may be sent to or received by a user by an external website. For example, the settings may control if an airline's website may forward information regarding a last minute flight deal.

Hence, the a user's privacy and/or security settings using encryption technologies and/or filters for cloud security may be used to control portions of user materials or accesses. For example, applications' user may use the privacy settings for broad or narrow categories to limit access to a user by external websites and/or limit access to programs or applications.

Embodiment for Propagating a User's Privacy and/or Security Settings Using Encryption Technologies and/or Filters for Cloud Computing Alternative or in addition to manually setting all components of privacy settings so that the user is in complete control and/or knowledge of the user's privacy settings, two types of privacy protections exist in current privacy models: (1) an individual's privacy may be protected by hiding the individual in a large collection of other individuals and/or (2) an individual's privacy may be protected by having the individual hide behind a trusted agent. For the second concept, the trusted agent executes tasks on the individual's behalf without divulging information about the individual, based upon user's personal and/or private information such as birthday, address, telephone number and/or more intimate details such as interests, hobbies, favorite books/films/music, relationship status and/or sexual preference. The visibility of this personal information is highly variable. The vast majority of users do not alter their privacy setting, enabling a large number of presumably unknown users to have access to their displayed personal information. The reason social network security and/or privacy lapses exists results from the astronomical amounts of information the sites process each and/or every day that end up making it that much easier to exploit a single flaw in the system. Companies believe that by using data mining technologies they would be able to gather important information that can be used for multimedia marketing and/or advertising. As sharing personal media online becomes easier and/or widely spread, new privacy concerns emerge—especially when the persistent nature of the media and/or associated context reveals details about the physical and/or social context in which the media items were created. The growing amount of online personal content exposes users to a new set of privacy concerns. Digital cameras, and/or lately, a new class of camera phone applications can upload photos or video content increasingly easy. Privacy concerns are especially acute in case of these multimedia-messaging collections, as they could reveal much of the user's personal and/or social environment. There are privacy concerns associated with sharing contextual data in a Social Cloud with location aware software. For example, a user's considerations in making privacy decisions about online content and/or context-based patterns of privacy decisions in an online photo-sharing environment. There are ways in which different people make privacy policy decisions "in the moment" and/or their strategy of dealing with such decisions in mobile settings such as (e.g., user behavior regarding location disclosure and/or systems that maintain, and/or sometimes expose, long-term and/or persistent information about their location, etc.).

Given the identity of a social network user, be it a name or an identity number, certain "public" information can immediately be accessed, along with more personal information depending on source-specific settings. Context aware mobile social networks can rack a user by logging the date and/or time that each mobile or stationary device detects the user's social network ID. By collecting such logs, systems can construct a history of the locations that a user has visited and/or the times of each visit, compromising a user's privacy and/or security settings using encryption technologies and/or filters for cloud security. The invention will allow users to visit web or mobile locations without compromising a user's privacy and/or security.

In order to create a collective, fictitious individuals may need to be added or real individuals deleted, including adding or deleting relationships. One embodiment of the present invention eliminates the need for a collective or trusted agent by automating the task of setting user privacy settings.

FIG. 1 illustrates an example network 100 of a social network for user 101. The network 100 illustrates that the user's 101 social network includes person 1 102, person 3 103, person 4 104, and/or person 5 105 directly connected to user 101 (connections 107-111, respectively). For example, the persons may be work colleagues, friends, or business contacts, or a mixture, who have accepted user 101 as a contact and/or for which user 101 has accepted as a contact. Relationships 112 and/or 113 show that Person 4 105 and/or Person 5 106 are contacts with each other and/or Person 4 105 and/or Person 3 104 are contacts with each other. Person 6 114 is a contact with Person 3 104 (relationship 115), but Person 6 114 is not a contact with User 101. Through associating each user's network and/or linking them together, relationships for the complete social network can be created.

Each of the persons/users in Network 100 is considered a node. In one embodiment, each node has its own privacy settings. The privacy settings for an individual node create a privacy environment for the node. Referring to User 101 in one example, User 101 privacy environment is defined as $E_{user} = \{e_1, e_2, \ldots, e_m\}$ wherein $e_i$ is an indicator to define a privacy environment E and/or m is the number of indicators in a user's 101 social network that defines the privacy environment $E_{user}$. In one embodiment, an indicator e is a tuple of the form {entity, operator, action, artifact}. Entity refers to an object in the social network. Example objects include, but are not limited to, person, network, group, action, application, and/or external website(s) Operator refers to ability or modality of the entity. Example operators include, but are not limited to, can, cannot, and/or can in limited form. Interpretation of an operator is dependent on the context of use and/or the social application or network. Action refers to atomic executable tasks in the social network. Artifact refers to target objects or data for the atomic executable tasks. The syntax and/or semantics of the portions of the indicator may be dependent on the social network being modeled. For example, indicator $e_r = \{X, \text{"can"}, Y, Z\}$, which is "Entity X can perform action Y on artifact Z." Indicators may be interdependent on one another. But for illustration purposes, atomic indicators will be offered as examples.

In one embodiment, privacy settings configure the operators in relation to the entity, action, and/or artifact. Therefore, the privacy settings may be used to determine that for indicator {X, " ", Y, Z}, entity X is not allowed to perform action Y at any time. Therefore, the privacy settings would set the indicator as {X, "cannot", Y, Z}. In reference to conflicts between indicators, the indicators share the same entity, action, and/or artifact, but the operators between the indicators conflict with one another (e.g., "can" versus "cannot") Conflict-free refers to that all conflicts have been resolved when determining the user indicator. In one embodiment, resolving conflicts includes finding the most relevant, restrictive operator in a conflict, discarding all other operators. For example, if three relevant indicators are {A, "can", B, C}, {A, "can in limited form", B, C}, and/or {A, "cannot", B, C}, the most restrictive operator is "cannot." Thus, a conflict-free indicator would be {A, "cannot", B, C}. As shown, the conflict-free indicator is also the most restrictive, hence satisfying the two properties.

In one embodiment, a user's privacy environment changes with respect to any changes in the user's social network. For example, if a person is added to a user's social network, then the person's indicators may be used to update the user's indicators. In another embodiment, certain persons connected to a user may be trusted more than other persons. For example, persons who have been connected to the user for longer periods of time, whose profiles are older, and/or who have been tabbed as trusted by other users may have their indicators given more weight as compared to other persons. For example, user 101 may set person 1 102 as the most trusted person in the network 100. Therefore, person 1's indicators may be relied on above other less trusted indicators, even if the operator of the less trusted indicators is more restrictive.

In one embodiment, a person having a user profile on two separate social networking sites may use privacy settings from one site to set the privacy settings on another site.

Figure 2:
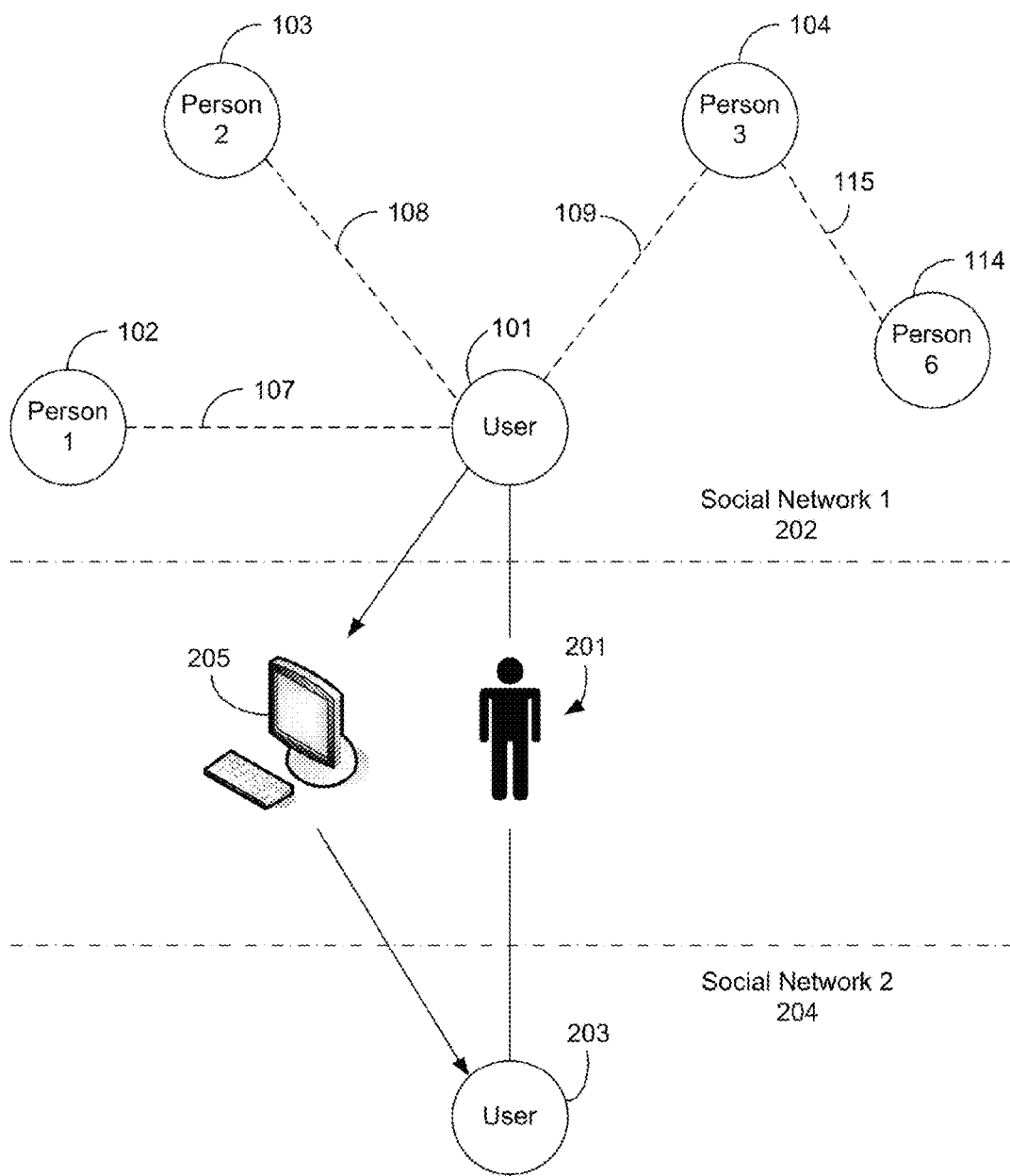
FIG. 2 illustrates a network of a user on client servers having a user profile on a first network and/or a user profile on a FIG. 3 is a flow chart of an example method for propagating security and/or privacy settings between networks by a console.

Thus, indicators would be translated from one site to another. FIG. 2 illustrates a person 201 having a user profile 101 on a first social networking site 202 and/or a user profile 203 on a second social networking site 204. Most social networking sites do not speak to one another. Therefore, in one embodiment, a user console 205 would be used for inter-social-network creation of a privacy environment.

Figure 3:
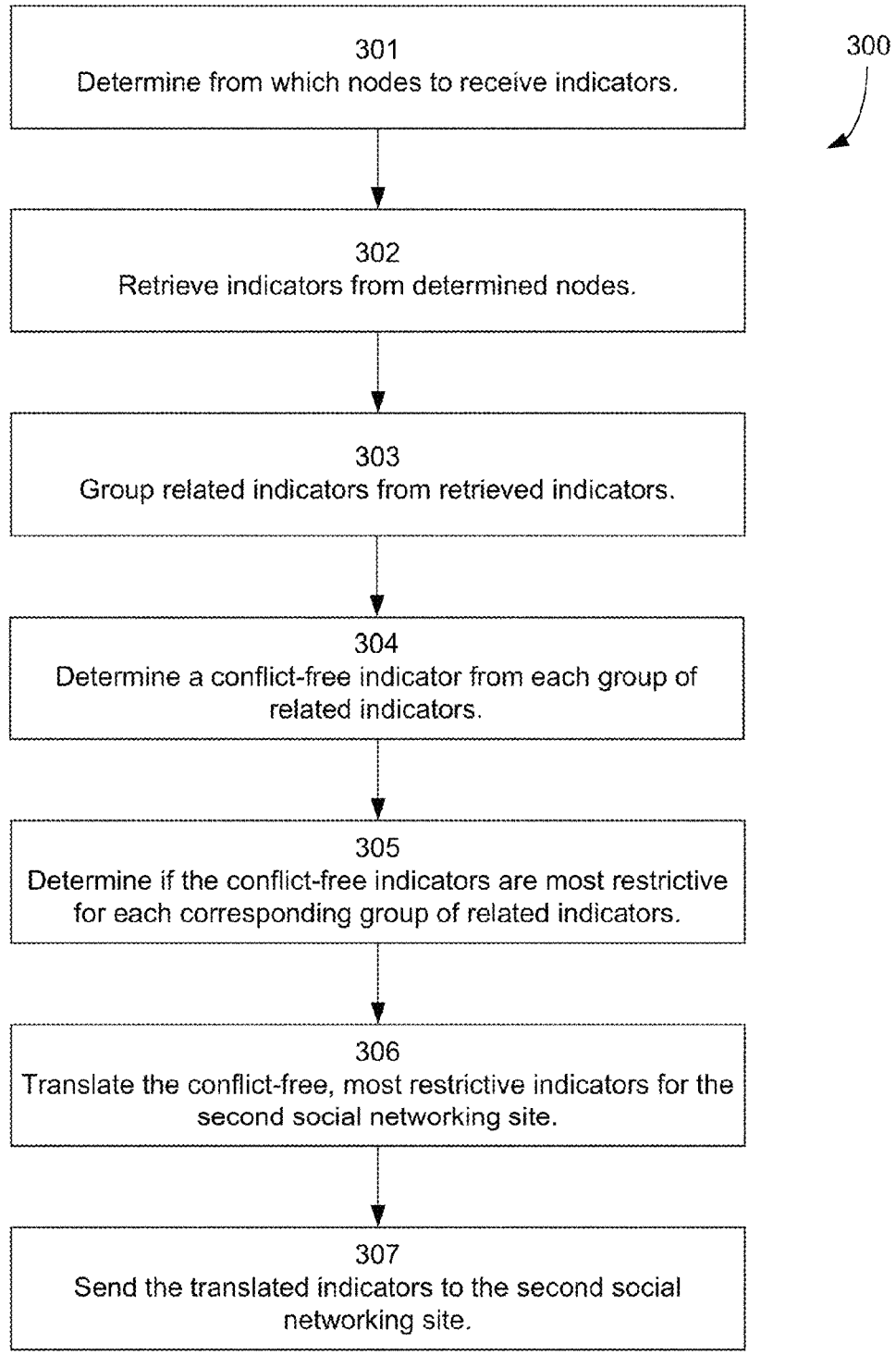

FIG. 3 is a flow chart of an example method 300 for propagating privacy setting between social networks by the console 205. Beginning at 301, the console 205 determines from which node to receive indicators. For example, if the user 203 in FIG. 2 needs privacy settings for an application that exists on both social networks 202 and/or 204, then it is determined which persons connected to user node 101 have an indicator for the application. In one embodiment, the indicator is pulled from the user node 101 indicators, wherein the privacy settings may have already been determined using others' indicators. Thus, to create a privacy environment, the console 205 may determine from which nodes to receive all indicators or those nodes in order to compute a privacy environment. If an indicator does not relate to the social networking site 204 (e.g., a website that is accessed on Networking site 202 cannot be accessed on Networking site 204), then the console 205 may ignore such indicator when received.

Proceeding to 302, the console 205 retrieves the indicators from the determined nodes. As previously stated, all indicators may be retrieved from each node. In another embodiment, only indicators of interest may be retrieved. In yet another embodiment, the system may continually update privacy settings, therefore, updated or new indicators are periodically retrieved in order to update user 203's privacy environment.

Proceeding to 303, the console 205 groups related indicators from the retrieved indicators. For example, if all of the indicators are pulled for each determined node, then the console 205 may determine which indicators are related to the same or similar entity, action, and/or artifact. Proceeding to 304, the console 205 determines from each group of related indicators a conflict-free indicator. The collections of conflict-free indicators are to be used for the user node's 203 privacy environment.

Proceeding to 305, the console 205 determines for each conflict-free indicator if the indicator is the most restrictive for its group of related indicators. If a conflict-free indicator is not most restrictive, then the console 205 may change the indicator a redetermine the indicator. Alternatively, the console 205 may ignore the indicator and/or not include in determining user node's 203 privacy environment. Proceeding to 306, the console 205 translates the conflict-free, most restrictive indicators for the second social networking site. For example, "can in limited form" may be an operator that is interpreted differently by two different social networking sites. In another example, one entity in a first social networking site may be of a different name on a second social networking site. Therefore, the console 205 attempts to map the indicators to the format relevant to the second social networking site 204. Upon translating the indicators, the console 205 sends the indicators to the user node 203 in the second social networking site 204 in 307. The indicators are then set for the user 203 to create its privacy environment for its social-network.

For some social networking sites, pages of user directed questions sets the privacy environment. Some social networking sites have groups of filters and/or user controls to set the privacy environment. Therefore, in one embodiment, answers to the questions, filters, or user settings may be pulled. As such, indicators are created from the pulled information. Furthermore, translating indicators may include determining the answers to the user questions or setting filters and/or user settings for a second social networking site. Therefore, the console 205 (or client on the social networking site) may set the questions or user controls in order to create a user node's privacy settings.

While the above method is illustrated between two-social networking sites, multiple social networks may exist and/or a user on the same social networking site. Therefore, a user node may have different privacy settings depending on the social network. Hence, the method may also be used to propagate privacy settings among social networks on the same social networking site.

In one embodiment, privacy settings may change depending on an event. For example, if an event A occurs, then an indicator may become less restrictive (operator to change from "cannot" to "can in limited form") Therefore, indicators may include subsets of information to account for dependencies. For example, an entity may or may not have a trusted status by the social networking site. Therefore, if an entity is not trusted, then operators regarding the entity may be restrictive (e.g., {Entity A[not trusted], "cannot", B, C}) Upon becoming trusted, indicators may be updated to take such into account (e.g., {A[trusted], "can", B, C}) For example, a trusted person may be able to search for a user's full profile, while an untrusted person may not.

A user's privacy environment may also depend on a user's activity in the social network. For example, a user who divulges more information engages in riskier activity then someone who is not an active user in a social network. Therefore, use may be a subset of information in order to determine what a user's privacy environment should be In one embodiment, a privacy risk score is used to make a user's privacy settings more or less restrictive. Below is described an embodiment for computing a user's privacy risk score.

Exemplary Embodiment for Computing a User Privacy Risk Score

For a social-network user j, a privacy risk score may be computed as a summation of the privacy risks caused to j by each one of his profile items. The contribution of each profile item in the total privacy risk depends on the sensitivity of the item and/or the visibility it gets due to j's privacy settings and/or j's position in the network. In one embodiment, all N users specify their privacy settings for the same n profile items. These settings are stored in an n.times.N response matrix R. The profile setting of user j for item i, R(i,j), is an integer value that determines how willing j is to disclose information about i; the higher the value the more willing j is to disclose information about item i.

In general, large values in R imply higher visibility. On the other hand, small values in the privacy settings of an item are an indication of high sensitivity; it is the highly-sensitive items that most people try to protect. Therefore, the privacy settings of users for their profile items, stored in the response matrix R have valuable information about users' privacy behavior. Hence, a first embodiment uses the information to compute the privacy risk of users by employing notions that the position of every user in the social network also affects his privacy risk and/or the visibility setting of the profile items is enhanced (or silenced) depending on the user's role in the network. In privacy-risk computation, the social-network structure and/or use models and/or algorithm or encryption keys (only people with those keys can access data) or symmetric algorithm for voice encryption, SIP for controlling communications and/or video calls over IP and/ or asymmetric key encryption to encrypt and/or decrypt data or encapsulating mechanism protecting data or metadata or virtual machine encryption distributed to end users performing a set of operations to protect confidentialities from information-propagation and/or viral multimedia marketing studies are taken into account.

In one embodiment, a social-network G that consists of N nodes, every node j in $\{1, \ldots, N\}$ being associated with a user of the network. Users are connected through links that correspond to the edges of G. In principle, the links are unweighted and/or undirected. However, for generality, G is directed and/or undirected networks are converted into directed ones by adding two directed edges (j→j') and/or (j'→j) for every input undirected edge (j, j') Every user has a profile consisting of n profile items. For each profile item, users set a privacy level that determines their willingness to disclose information associated with his item. The privacy levels picked by all N users for the n profile items are stored in an n.times.N response matrix R. The rows of R correspond to profile items and/or the columns correspond to users. R(i,j) refers to the entry in the i-th row and/or j-th column of R; R(i,j) refers to the privacy setting of user j for item i. If the entries of the response matrix R are restricted to take values in $\{0, 1\}$, R is a dichotomous response matrix. Else, if entries in R take any non-negative integer values in $\{0, 1, \ldots, 1\}$, matrix R is a polytomous response matrix. In a dichotomous response matrix R, R(i,j)=1 means that user j has made the information associated with profile item i publicly available. If user j has kept information related to item i private, then R(i,j)=0. The interpretation of values appearing in polytomous response matrices is similar: R(i, j)=0 means that user j keeps profile-item i private; R(i,j)=1 means that j discloses information regarding item i only to his immediate friends. In general, R(i,j)=k (with k within $\{0, 1, \ldots, 1\}$) means that j discloses information related to item i to users that are at most k links away in G. In general, R(i, j)_R(i', j) means that j has more conservative privacy settings for item i' than item i. The i-th row of R, denoted by Ri, represents the settings of all users for profile item i. Similarly, the j-th column of R, denoted by Rj, represents the profile settings of user j.

Users' settings for different profile items may often be considered random variables described by a probability distribution. In such cases, the observed response matrix R is a sample of responses that follow this probability distribution. For dichotomous response matrices, P(i,j) denotes the probability that user j selects R(i,j)=1. That is, P(i,j) =Prob_R(i,j)=1. In the polytomous case, P(i,j,k) denotes the probability that user j sets R(i,j)=k. That is, P(i,j,k)=Prob_R (i,j)=k.

Privacy Risk in Dichotomous Settings

The privacy risk of a user is a score that measures the protection of his privacy. The higher the privacy risk of a user, the higher the threat to his privacy. The privacy risk of a user depends on the privacy level he picks for his profile items.

The basic premises of the definition of privacy-risk are the following:

The more sensitive information a user reveals, the higher his privacy risk.

The more people know some piece of information about a user, the higher his privacy risk.

The following two examples illustrate these two premises.

Example 1

Assume user j and/or two profile items, i={mobile-phone number} and/or i'={hobbies}. R(i,j)=1 is a much more risky setting for j than R(i',j)=1; even if a large group of people knows j's hobbies this cannot be as an intrusive scenario as the one where the same set of people knows j's mobile-phone number.

Example 2

Assume again user j and/or let i={mobile phone number} be a single profile item. Naturally, setting R(i, j)=1 is a more risky behavior than setting R(i,j)=0; making j's mobile phone publicly available increases j's privacy risk. In one embodiment, the privacy risk of user j is defined to be a monotonically increasing function of two parameters: the sensitivity of the profile items and/or the visibility these items receive. Sensitivity of a profile item: Examples 1 and/or 2 illustrate that the sensitivity of an item depends on the item itself. Therefore, sensitivity of an item is defined as follows.

Definition 1

The sensitivity of item i in $\{1, \ldots, n\}$ is denoted by $.beta.i$ and/or depends on the nature of the item i. Some profile items are, by nature, more sensitive than others. In Example 1, the {mobile-phone number} is considered more sensitive than {hobbies} for the same privacy level. Visibility of a profile item: The visibility of a profile item i due to j captures how known j's value for i becomes in the network; the more it spreads, the higher the item's visibility. Visibility, denoted by V(i,j), depends on the value R(i,j), as well as on the particular user j and/or his position in the social network G. The simplest possible definition of visibility is V(i,j)=I(R (ij)=1), where I(condition) is an indicator variable that becomes 1 when "condition" is true. This is the observed visibility for item i and/or user j. In general, one can assume that R is a sample from a probability distribution over all possible response matrices. Then, the visibility is computed based on this assumption.

Definition 2

If P(ij)=Prob_R(i,j)=1, then the visibility is V(i,j)=P(i,j) times.1+(1−P(i,j))times.0=P(i,j) Probability P(i,j) depends both on the item i and/or the user j. The observed visibility is an instance of visibility where P(i,j)=I(R(i,j)=1) Privacy risk of a user: The privacy risk of individual j due to item i, denoted by Pr(i,j), can be any combination of collecting, mining, processing and/or storing social media, mobile and/or cloud data transmitted in the cloud service providers, servers, social networks or mobile networks including sensitivity and/or visibility. That is, Pr(i, j)=.beta.i N V(i,j) Operator N is used to represent any arbitrary combination function that respects that Pr(i,j) is monotonically increasing with both sensitivity and/or visibility.

In order to evaluate the overall privacy risk of user j, denoted by Pr(j), the privacy risk of j can be combined due to different items. Again, any combination function can be employed to combine the per-item privacy risks. In one embodiment, the privacy risk of individual j is computed as follows: Pr(j)=Summation from i=1 to n of Pr(i, j)=Summation from i=1 to n of .beta.i.times.V(i,j)=Summation from i=1 to n of .beta.i.times.P(i,j) Again, the observed privacy risk is the one where V(i,j) is replaced by the observed visibility.

NAIVE COMPUTATION OF PRIVACY RISKS IN DICHOTOMOUS SETTINGS One embodiment of computing the privacy risk score is the Naive Computation of Privacy Risks. Naive computation of sensitivity: The sensitivity of item i, .beta.i, intuitively captures how difficult it is for users to make information related to the i-th profile item publicly available. If |Ri| denotes the number of users that set R(i,j)=1, then for the Naive computation of sensitivity, the proportion of users that are reluctant to disclose item i is computed. That is, .beta.i=(N−|Ri|/N. The sensitivity, as computed in the equation takes values in [0, 1]; the higher the value of .beta.i, the more sensitive item i. Naive computation of visibility: The computation of visibility (see Definition 2) requires an estimate of the probability P(i,j)=Prob_R(i,j)=1. Assuming independence between items and/or individuals, P(i,j) is computed to be the product of the probability of a 1 in row Ri times the probability of a 1 in column Rj. That is, if |Rj| is the number of items for which j sets R(i,j)=1, then P(i,j)=|Ri|/N.times.|Rj|/n=(1−.beta.i)times.|Rj|/n. Probability P(i,j) is higher for less sensitive items and/or for users that have the tendency to disclose many of their profile items. The privacy-risk score computed in this way is the Pr Naive score.

IRT-BASED COMPUTATION OF PRIVACY RISK IN DICHOTOMOUS SETTINGS Another embodiment of computing a privacy risk score is a privacy risk of users using concepts from Item Response Theory (IRT) In one embodiment, the two-parameter IRT model may be used. In this model, every examinee j is characterized by his ability level .theta.j, .theta.j within (−1,1) Every question qi is characterized by a pair of parameters .xi.i=(.alpha.i, .beta.i) Parameter .beta.i, .beta.i within (−1,1), represents the difficulty of qi. Parameter .alpha.i, .alpha.i within (−1,1), quantifies the discrimination ability of qi. The basic random variable of the model is the response of examinee j to a particular question qi. If this response is marked as either "correct" or "wrong" (dichotomous response), then in the two-parameter model the probability that j answers correctly is given by P(i,j)=1/(1+e (−.alpha.i(.theta.j−.beta.i))) Thus, P(i,j) is a function of parameters .theta.j and/or .xi.i=(.alpha.i, .beta.i) For a given question qi with parameters .xi.i=(.alpha.i, .beta.i), the plot of the above equation as a function of .theta.j is called the Item Characteristic Curve (ICC).

Parameter .beta.i, the item difficulty, indicates the point at which P(i,j)=0.5, which means that the item's difficulty is a property of the item itself, not of the people that responded to the item. Moreover, IRT places .beta.i and/or .theta.j on the same scale so that they can be compared. If an examinee's ability is higher than the difficulty of the question, then he has higher probability to get the right answer, and/or vice versa. Parameter .alpha.i, the item discrimination, is proportional to the slope of P(i,j)=Pi (.theta.j) at the point where P(i,j)=0.5; the steeper the slope, the higher the discriminatory power of a question, meaning that this question can well differentiate among examinees whose abilities are below and/or above the difficulty of this question.

In our IRT-based computation of the privacy risk, the probability Prob R(i,j)=11 is estimated using the above equation, using users and/or profile items. The mapping is such that each examinee is mapped to a user and/or each question is mapped to a profile item. The ability of an examinee can be used to quantify the attitude of a user: for user j, his attitude .theta.j quantifies how concerned j is about his privacy; low values of .theta.j indicate a conservative user, while high values of .theta.j indicate a careless user. The difficulty parameter .beta.i is used to quantify the sensitivity of profile item i. Items with high sensitivity value .beta.i are more difficult to disclose. In general, parameter .beta.i can take any value within (−1,1) In order to maintain the monotonicity of the privacy risk with respect to items' sensitivity it is guaranteed that .beta.i is greater than or equal to 0 for all I within {1, . . . , n}. This can be handled by shifting all items' sensitivity values by .bet-a.min= argmin. sub.i.epsilon.{1, . . . , n} .beta.i. In the above mapping, parameter .alpha.i is ignored.

For computing the privacy risk, the sensitivity .beta.i for all items i in {1, . . . , n} and/or the probabilities P(i,j)=Prob R(i,j)=1 is computed. For the latter computation, all the parameters .xi.i=(.alpha.i, .beta.i) for 1 less than or equal to i less than or equal to n and/or .theta.j for 1 less than or equal to j less than or equal to N is determined.

Three independence assumptions are inherent in IRT models: (a) independence between items, (b) independence between users, and/or (c) independence between users and/or items. The privacy-risk score computed using these methods is the Pr IRT score.

IRT-BASED COMPUTATION OF SENSITIVITY In computing the sensitivity .beta.i of a particular item i, the value of .alpha.i, for the same item, is obtained as a byproduct. Since items are independent, the computation of parameters .xi.i=(.alpha.i, .beta.i) is done separately for every item. Below is shown how to compute .xi.i assuming that the attitudes of the N individuals about .theta.=(.theta. sub. 1, . . . , .theta.sub.N) are given as part of the input. Such computations are known in the art, e.g., as presented in US application 2010/0306834, entirely incorporated herein by reference.

METHODS FOR USER INTERNET OR MOBILE SECURITY: The present invention can provide user control for any known type of Internet or mobile access or system, as known in the art or as described herein.

Types of security: Network layer security: TCP/IP can be made secure with the help of software cryptographic methods and/or protocols that have been developed for securing communications on the Internet. These protocols include SSL and/or TLS for web traffic, PGP for email, and/or IPsec for the network layer security.

IPsec Protocol: This protocol is designed to protect communication in a secure manner using TCP/IP. It is a set of security extensions developed by IETF, and/or it provides security and/or authentication protocols at the IP layer by using cryptography. To protect the content, the data is transformed using encryption techniques. There are two main types of transformation that form the basis of IPsec: the Authentication protocols Header (AH) and/or Encapsulating Security Payload (ESP) These two protocols provide data integrity, data origin authentication protocols, and/or anti-replay service. These protocols can be used alone or in combination to provide the desired set of security services for the Internet Protocol (IP) layer.

The basic components of the IPsec security architecture are described in terms of the following functionalities: Security protocols for AH and/or ESP; Security association for policy management and/or traffic processing; Manual and/or automatic key management for the internet key exchange (IKE); and/or Algorithm or encryption keys (only people with those keys can access data) or symmetric algorithm for voice encryption, SIP for controlling communications and/or video calls over IP and/or asymmetric key encryption to encrypt and/or decrypt data or encapsulating mechanism protecting data or metadata or virtual machine encryption distributed to end users performing a set of operations to protect confidentialities for authentication protocols and/or encryption.

The set of security services provided at the IP layer includes access control, data origin integrity, protection against replays, and/or confidentiality. The algorithm or encryption keys (only people with those keys can access data) or symmetric algorithm for voice encryption, SIP for controlling communications and/or video calls over IP and/or asymmetric key encryption to encrypt and/or decrypt data or encapsulating mechanism protecting data or metadata or virtual machine encryption distributed to end users performing a set of operations to protect confidentiality allows these sets to work independently without affecting other parts of the implementation. The IPsec implementation is operated in a host or security gateway environment giving protection to IP traffic.

Security token: Some online sites offer customers the ability to use a six-digit code, which randomly changes every 30-60 seconds on a security token. The key on the security token have mathematical computations built-in and/or manipulate numbers based on the current time built into the device. This means that every thirty seconds there's only a certain possible array of numbers, which would be correct to validate access to the online account. The website that the user is logging into would be made aware of that devices' serial number and/or therefore would know the computation and/or correct time built into the device to verify that the number given is in deed one of the handful of six-digit numbers that would work in that given 30-60 second cycle. After the 30-60 seconds the device will present a new random six-digit number which can log into the website.

Electronic mail security (E-mail): Email messages are composed, delivered, and/or stored in a multiple step process, which starts with the message's composition. When the user finishes composing the message and/or sends it, the message is transformed into a standard format: an RFC 2822 formatted message. Afterwards, the message can be transmitted. Using a network connection, the mail client, referred to as a mail user agent (MUA), connects to a mail transfer agent (MTA) operating on the mail server. The mail client then provides the sender's identity to the server. Next, using the mail server commands, the client sends the recipient list to the mail server. The client then supplies the message. Once the mail server receives and/or processes the message, several events occur: recipient server identification, connection establishment, and/or message transmission. Using Domain Name System (DNS) services, the sender's mail server determines the mail server(s) for the recipient(s) Then, the server opens up a connection(s) to the recipient mail server(s) and/or sends the message employing a process similar to that used by the originating client, delivering the message to the recipient(s).

Pretty Good Privacy (PGP): PGP provides confidentiality by encrypting messages to be transmitted via cloud computing or data files using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud security be stored using an encryption algorithm or encryption keys (only people with those keys can access data) or symmetric algorithm for voice encryption, SIP for controlling communications and/or video calls over IP and/or asymmetric key encryption to encrypt and/or decrypt data or encapsulating mechanism protecting data or metadata or virtual machine encryption distributed to end users performing a set of operations to protect confidentiality such 3DES or CAST-128. Email messages can be protected by using cryptography in various ways, such as the following: Signing an email message to provide its integrity and/or confirm the identity of its sender; Encrypting the body of an email message to provide its confidentiality; Encrypting the communications between mail servers to protect the confidentiality of both the message body and/or message header.

The first two methods, message signing and/or message body encryption, are often used together; however, encrypting the transmissions between mail servers is typically used only when two organizations want to protect emails regularly sent between each other. For example, the organizations could establish a virtual private network (VPN) to encrypt the communications between their mail servers over the Internet. Unlike methods that can only encrypt a message body, a VPN can encrypt entire messages, including email header information such as senders, recipients, and/or subjects. In some cases, organizations may need to protect header information. However, a VPN solution alone cannot provide a message signing mechanism, nor can it protection for email messages along the entire route from sender to recipient.

Multipurpose Internet Mail Extensions (MIME): MIME transforms non-ASCII data at the sender's site to Network Virtual Terminal (NVT) ASCII data and/or delivers it to client's Simple Mail Transfer Protocol (SMTP) to be sent through the Internet. The server SMTP at the receiver's side receives the NVT ASCII data and/or delivers it to MIME to be transformed back to the original non-ASCII data.

Secure/Multipurpose Internet Mail Extensions (S/MIME): S/MIME provides a consistent means to securely send and/or receive MIME data. S/MIME is not only limited to email but can be used with any transport mechanism that carries MIME data, such Hypertext Transfer Protocol (HTTP).

Message Authentication protocols Code: A Message Authentication protocols Code is a cryptography method that uses a secret key to encrypt a message. This method outputs a MAC value that can be decrypted by the receiver, using the same secret key used by the sender. The Message Authentication protocols Code protects both a message's data integrity as well as its authenticity.

Firewalls: A firewall controls access between networks. It generally consists of gateways and/or filters, which vary from one firewall to another. Firewalls also screen network traffic and/or are able to block traffic that is dangerous. Firewalls act as the intermediate server between SMTP and/or HTTP connections.

Role of firewalls in Internet security and/or web security: Firewalls impose restrictions on incoming and/or outgoing packets to and/or from private networks. All the traffic, whether incoming or outgoing, must pass through the firewall; only authorized traffic is allowed to pass through it. Firewalls create checkpoints between an internal private network and/or a public Internet, also known as choke points. Firewalls can create choke points based on IP source and/or TCP port number. They can also serve as the platform for IPsec. Using tunnel mode capability, firewall can be used to implement VPNs. Firewalls can also limit network exposure by hiding the internal network system and/or information from a public Internet.

Types of firewalls: Packet filters: Packet filters are one of several different types of firewalls that process network traffic on a packet-by-packet basis. Their main job is to filter traffic from a remote IP host, so a router is needed to connect the internal network to the Internet. The router is known as a screening router, which screens packets leaving and/or entering the network. Circuit-level gateways: The circuit-level gateway is a proxy server that statically defines what traffic will be allowed. Circuit proxies' always forward packets containing a given port number, provided the port number is permitted by the rules set. This gateway operates at the network level of an OSI model. The main advantage of a proxy server is its ability to provide Network Address Translation (NAT), which can hide the user's IP address from the Internet, effectively protecting all internal information from the Internet. Application-level gateways: An application-level gateway is a proxy server operating at the TCP/IP application level. A packet is forwarded only if a connection is established using a known protocol. Application-level gateways are notable for analyzing entire messages rather than individual packets of data when the data are being sent or received.

INTERNET OR MOBILE PRIVACY: The present invention can provide user control for any known type of Internet or mobile access privacy, as known in the art or as described herein. Internet users may protect their privacy through controlled disclosure of personally-identifiable information (P.I.I.) of the Internet user. An HTTP cookies, HTML browsers, is data stored on a user's computer that assists in automated access to websites or web features, or other state information required in complex web sites. It may also be used for user-tracking by storing special usage history data in a cookie, and/or such cookies are called tracking cookies. Tracking cookies and/or especially third-party tracking cookies are commonly used as ways to compile long-term records of individuals' browsing histories. The process of profiling (also known as "tracking") assembles and/or analyzes several events, each attributable to a single originating entity, in order to gain information (especially patterns of activity) relating to the originating entity. Some organizations engage in the profiling of people's web browsing, collecting the URLs of sites visited. The resulting profiles can potentially link with information that personally identifies the individual who did the browsing.

Some web-oriented multimedia marketing-research organizations may use this practice legitimately, for example: in order to construct profiles of "typical Internet users". Such profiles, which describe average trends of large groups of Internet users rather than of actual individuals, can then prove useful for market analysis. Although the aggregate data does not constitute a privacy violation, some people believe that the initial profiling does. Profiling becomes a more contentious privacy issue when data-matching associates the profile of an individual with personally-identifiable information of the individual.

Flash cookies, also known as Local Shared Objects, work the same ways as normal cookies and/or are used by the Adobe Flash Player to store information at the user's computer. They exhibit a similar privacy risk as normal cookies, but are not as easily blocked, meaning that the option in most browsers to not accept cookies does not affect Flash cookies. One way to view and/or control them is with browser extensions or add-ons. Flash cookies are unlike-HTTP cookies, HTML browsers in a sense that they are not transferred from the client back to the server. Web browsers read and/or write these cookies and/or can track any data by web usage.

Although browsers such as Internet Explorer 8 and/or Firefox 3 have added a 'Privacy Browsing' setting, they still allow Flash cookies to track the user and/or operate fully. However, the Flash player browser plugin can be disabled or uninstalled, and/or Flash cookies can be disabled on a per-site or global basis. Adobe's Flash and/or (PDF) Reader are not the only browser plugins whose past security defects have allowed spyware or malware to be installed: there have also been problems with Oracle's Java.

Evercookies: Evercookies are JavaScript-based applications which produce cookies in a web browser that actively "resist" deletion by redundantly copying themselves in different forms on the user's machine (e.g., Flash Local Shared Objects, various HTML5 storage mechanisms window, name caching, etc.), and/or resurrecting copies that are missing or expired. Evercookie accomplishes this by storing the cookie data in several types of storage mechanisms that are available on the local browser. It has the ability to store cookies in over ten types of storage mechanisms so that once they are on your computer they will never be gone. Additionally, if evercookie has found the user has removed any of the types of cookies in question, it recreates them using each mechanism available. Evercookies are one type of zombie cookie. However, modern browsers and/or anti-malware software can now block or detect and/or remove such cookies.

Advertising uses: Cookies store unique identifiers on a person's computer that are used to predict what you want. Many advertisement companies can use this technology to track what their customers are looking at online.

Device fingerprinting: Device fingerprinting is a fairly new technology that is useful in fraud prevention and/or safeguarding any information from your computer. Device fingerprinting uses data from the device and/or browser sessions to determine the risk of conducting business with the person using the device. This technology allows companies to better assess the risks when business is conducted through sites that include, wherein a user can provide or send messages, coupons, clickable advertisements, and/or mobile advertisements related to a location to other users via their mobile devices to their friends, family, business associates, or others, sites, social networking and/or online dating sites and/or banks and/or other financial institutions.

Advanced Detection Analysis & Predator Tracking (A.D.A.P.T.): Sentinel is an Internet security program that focuses on safety in social communications online. Advanced Detection Analysis & Predator Tracking (A.D.A.P.T.) is one of their device fingerprinting technologies. This technology differentiates between legitimate and/or unsafe devices that are on a website at any given time. A.D.A.P.T. differentiates between legitimate and/or illegitimate devices by using device-fingerprinting technology. This way, even if someone is logging on to the website from the same account, if they are using a separate device, A.D.A.P.T. assigns a different fingerprint to that device. A.D.A.P.T. uses only HTTP and/or JavaScript to identify the device. It makes an accurate "fingerprint" of the device by using many different pieces of information including, operating system, browser, and/or PC characteristics. A.D.A.P.T. is concealed in that the user of the device has no idea that they are being "fingerprinted." A.D.A.P.T. is a surveillance system so there is no actually tagging of the device.

Search engines have the ability to track a user's searches. Personal information can be revealed through searches including search items used, the time of the search, and/or more. Search engines have claimed a necessity to retain such information in order to provide better services, protect against security pressure, and/or protect against fraud. A search engine takes all of its users and/or assigns each one a specific ID number. Search engines also are able to retain user information such as geographic location the time spent using the search engine for up to ninety days. Most of the data retained by operators of the search engines use the data to get a sense of where needs must be met in certain areas of their field. People working in the legal field are also allowed to use information collected from these search engine websites. The Google search engine is given as an example to a search engine that retains the information entered for a period of three fourths of year before it becomes obsolete for public usage. Yahoo!follows in the footsteps of Google in the sense that it also deletes user information after a period of ninety days. Other search engines such as Ask!search engine has promoted a tool of "AskEraser" which essentially takes away personal information when requested. Some changes made to Internet search engines included that of Google's search engine. Beginning in 2009, Google began to run a new system where the Google search became personalized. The item that is searched and/or the results that are shown remembers previous information that pertains to the individual. Google search engine not only seeks what is searched, but also strives to allow the user to feel like the search engine recognizes their interests. This is achieved by using online advertising. A system that Google uses to filter advertisements and/or search results that might interest the user is by having a ranking system that tests relevancy that include observation of the behavior users exude while searching on Google. Another function of search engines is the predictability of location. Search engines are able to predict where your location is currently by locating IP Addresses and/or geographical locations.

Some solutions to being able to protect user-privacy on the Internet can include programs such as "Rapleaf" which is a website that has a search engine that allows users to make all your search information and/or personal information private. Other websites that also give this option to their users are Facebook™ and/or Amazon™. Other search engines such as DuckDuckGo don't store personal information. Scroogle anonymized Google searches from 2002-2012.

Privacy issues of social networking sites: The advent of the Web 2.0 has caused social profiling. Web 2.0 is the system that facilitates participatory information sharing and/or collaboration on the Internet, in social networking media websites like Facebook™ and/or MySpace™. These social networks keep track of all interactions or browsing the content of a social network or mobile network or other application used on their sites and/or save them for later use. Issues include cyberstalking, location disclosure, social profiling, 3rd party personal information disclosure, and/or government information collection without the need for a search warrant.

Internet service providers: Internet users obtain Internet access through an Internet service provider (ISP) All data transmitted to and/or from users must pass through the ISP. Thus, an ISP has the potential to observe users' online activities, notifications, online and/or mobile communications, spatial, social or when a user can provide or send messages, coupons, clickable advertisements, and/or mobile advertisements related to a location to other users via their mobile devices to their friends, family, business associates, or others, interactions or purchases made by friends or peers, user's behavior data on the Internet. Normally ISPs do collect at least some information about the consumers using their services. An ISP cannot know the contents of properly-encrypted identity information and/or user's authentication protocols online or via a mobile or wireless device using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services with cloud security prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications data passing between its consumers and/or the Internet. For encrypting web traffic, https has become the most popular and/or best-supported standard. Even if users encrypt the data, the ISP still knows the IP addresses of the sender and/or of the recipient. An Anonymizer such as I2P—The Anonymous Network or Tor can be used for accessing web services that can be mapped to particular users through a social network identification, allowing interactions between users them knowing your IP address and/or without your ISP knowing what the services are that you access.

Other potential Internet privacy risks: Malware is a term short for "malicious software" and/or is used to describe software to cause damage to a single computer, server, or computer network whether that is through the use of a virus, trojan horse, spyware, etc. Spyware is a piece of software that obtains information from a user's computer without that user's consent. A web bug is an object embedded into a web page or email and/or is usually invisible to the user of the website or reader of the email. It allows checking to see if a person has looked at a particular website or read a specific email message. Phishing is a criminally fraudulent process of trying to obtain sensitive information such as user names, passwords, credit card or bank information. Phishing is an Internet crime in which someone masquerades as a trustworthy entity in some form of electronic communication.

Pharming is a hacker's attempt to redirect traffic from a legitimate website to a completely different Internet address. Pharming can be conducted by changing the hosts' file on a victim's computer or by exploiting vulnerability on the DNS server.

Exemplary Computer Architecture for Implementation of Systems and/or Methods

Figure 4:
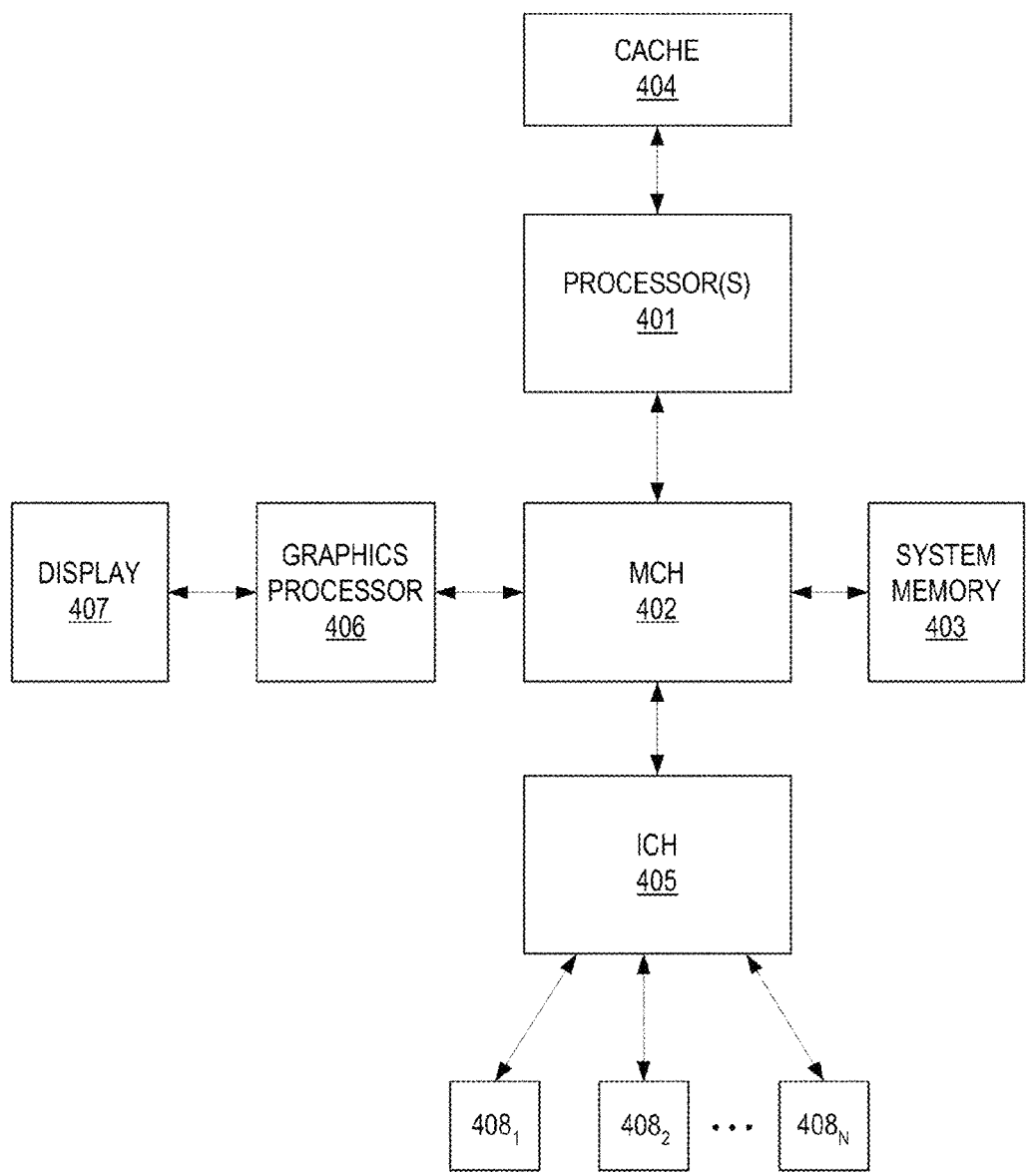
FIG. 4 illustrates an example of computer architecture for implementing a user's privacy and/or security settings using encryption technologies and/or filters for cloud security and/or a user's privacy and/or security environment

FIG. 4 illustrates an example computer architecture for implementing a computing of privacy settings and/or a privacy environment. In one embodiment, the computer architecture is an example of the console 205 in FIG. 2. The exemplary computing system of FIG. 4 includes: 1) one or more processors 401; 2) a memory control hub (MCH) 402; 3) a system memory 403 (of which different types exist such as DDR RAM, EDO RAM, etc.); 4) a cache 404; 5) an I/O control hub (ICH) 405; 6) a graphics processor 406; 7) a display/screen 407 (of which different types exist such as Cathode-Ray Tube (CRT), Thin-Film Transistor (TFT), Liquid Crystal Display (LCD), DPL, etc.); and/or 8) one or more I/O devices 408.

Any mobile device can be used such as smartphone devices or tablet, (e.g., iPhone, Android, Nokia, Palm Pre, Blackberry, Dell, HTC, Google, Sony, Intel, Motorola, Samsung, LG, and/or the like), using any known operating system or software or network for internet access or mobile messaging, e.g., iOS1.0-6.0, Android 1.0-5.0, Palm OS, Windows Mobile OS, Windows 8, Linux (e.g., MeeGo, Mer), Symbian, Microsoft, software defined radio (e.g., channel modulation waveforms), Ultra-Wideband/or (UWB), WiFi, WiFi operator, Mobile-Fi operator, LTE, WiMax/MBWA, MIPI, WCDMA networks, UMTS/WCDMA-networks, GSM/GPRS/EDGE/UMTS, Rich Communication Suite (RCS), Internet Protocol (IP), Transport Control Protocol (TCP), Network File System (NFS), Network Information Service (NIS), Dynamic Host Configuration Protocol (DHCP), Internet Message Access Protocol (IMAP), Post Office Protocol (POP), Digital Video Transport System (DVTS), Server Message Block (SMB), webOS, Bada OS, Windows Phone OS, Maemo OS, Windows CE, Open Handset Alliance (OHA), HTC Dream, Blackberry OS, Tablet OS, Grid OS, LiMo 4, Nokia OS, Symbian OS, Brew (Qualcomm™), and/or the like.

The future of messaging bridges two traditionally separate, landscapes: the rich user experience (offered by OTT applications and/or service providers) and/or ubiquity and/or security (offered by telecom operators) The combination of collecting, mining, processing and/or storing social media, mobile and/or cloud data transmitted in the cloud service providers, servers, social networks or mobile networks including these two landscapes has generated a new suite of service referred to as rich communication. The focus of Rich Communication Suite (RSC) is that a message is a message, and/or users should be able to communicate without having to figure out which technology to use (MMS, SMS, MMS or IM) Instead, they simply select a person to communicate with, verify that communication is possible, and/or then begin communicating. With its ubiquity, reach and/or secure ecosystem, RSC will become the preferred messaging stack for developers; entrepreneur communication will evolve to extend beyond the walled gardens that now exit; communities will begin to interconnect in new and/or innovative ways; gaming experiences will be enriched so that they transcend device and/or community borders; social networks will be transformed; new cross-community connections will be possible; and/or even machine-to-machine (M2M) communication will be enriched by a set of services and/or deployed in an ecosystem originally intended for human communication.

Operators can continue to play an important role in providing communication services on account of their unique ability to: close the functionally gap between traditional and/or OTT messaging services by introducing RCS-e functionality; provide global reach through the flawless interworking of SMS, MMS, OTT messaging; and/or promote the service so that it becomes the preferred stack for app developers.

RSC includes: R1:OMA Presence for RCS social presence; OMA SIMPLE IM for one-to-one chat, group chat and/or file transfer; OMA DS for the network address book; GSMA IR.79 for image-sharing; and/or GSMA IR.74 for video-sharing; R2: users can connect with RCS mobile clients or a broadband-access client. R3: broadband-access devices can also be designated as a user's primary device; content-sharing improvements (GSMA IR.84); services such as "Who can I invite?"; and/or network value-added services (NVAS); R4: OMA CPM: social-network-integration; OMA network APIs; first phase of VoLTE alignment; RCS-e: based on RCS R3, but adds store-and-forward functionality and/or delivery/display notifications for one-to-one chat (similar to OTT services); and/or R5: alignment with GSMA IR.92/IR.58 for VoLTE/VoHSPA, IR.94 for Video Call, IR.65 for MMTel/RCS PS interconnect and/or roaming; OMA CPM with a commitment to bring store-and-forward functionality for chat, group chat, and/or file transfer back into OMA CPM.

Any computing system can be used according to the present invention for accessing the internet, messaging, social networking, location or mapping information, promotions, and/or the like, using any operating system or browser, as known in the art. Non limiting examples can include, but are not limited to, PCs (e.g., desktop, server, laptop, netbook, tablet, internet accessing computer, and/or the like), mini computers (e.g., Raspberry Pi™) Apple computers using any Apple™ operating system, any operating system, e.g., but not limited to, network, disk, web, generic, embedded (e.g., PDAs, digital media players, standard mobile phones or smart phones, routers, and/or the like, e.g., Any operating system can be used according to the present invention for accessing the internet, messaging, social networking, location or mapping information, promotions, and/or the like. According to the present invention for accessing the internet, messaging, social networking, location or mapping information, promotions, and/or the like, e.g., Proprietary: e.g., Mac OS 8; Mac OS 9; Unix-like operating systems; Mac OS X Server; Mac OS X v10.0 (aka "Cheetah"); Mac OS X v10.1 (aka "Puma"); Mac OS X v10.2 (aka "Jaguar"); Mac OS X v10.3 (aka "Panther"); For PowerPC and/or Intel CPUs; Mac OS X; Mac OS X v10.4 (aka "Tiger"); Mac OS X v10.5 (aka "Leopard"); For Intel CPUs; Mac OS X; Mac OS X v10.6 (aka "Snow Leopard"); Mac OS X v10.7 (aka "Lion"); OS X v10.8 (aka "Mountain Lion") Mac OS X Server; For iPhone/iPod Touch/iPad/Apple TV; iOS; For iPod Classic/iPod Nano/iPod Mini/iPod Shuffle; iPod software; Atari; Atari DOS; Atari TOS; Atari MultiTOS; Unix, Unix System III; Unix System IV; Unix System V; Google Android 2.0, 3.0, 4.0.1, 5.0; Google Chrome OS; Chromium OS; OpenSolaris; Windows-2000 (NT 5.0); XP (NT 5.1); Server 2003 (NT 5.2); Vista (NT 6.0); Azure (Vista) Home Server; Server 2008; Windows 7 (NT 6.1); Server 2008 R2; Home Server 2011; Windows 8; Windows 8 Server; Windows CE (OS for handhelds, embedded devices, and/or real-time applications); Windows Mobile; Windows Phone; Xbox and/or Xbox 3600S; Novell Open Enterprise Server; Free and/or open source Unix-like; Ubuntu; BSD; FreeBSD; DragonFlyBSD; Darwin; NetBSD; OpenBSD; GNU; Linux; OpenSolaris; Solaris 11 Express; OpenIndiana; Nexenta OS; Jaris OS; RTEMS; Web operating systems; Chrome OS; GEOS (popular windowing GUI for PC, Commodore, Apple computers); JavaOS; JNode; JX Java; Personal digital-assistants (PDAs); Symbian OS; iOS (a subset of Mac OS-X); Embedded Linux; Maemo based on Debian; Internet Tablets; MeeGo merger of Moblin and/or Maemo; webOS from Palm, Inc; OpenZaurus; Angstrom distribution; Familiar Linux; Android; Palm OS; Palm-Source; Windows CE, Pocket PC; Windows Mobile; Windows Phone; DIP DOS on Atari Portfolio; HP; iOS; iPod software.

The one or more processors 401 execute instructions in order to perform whatever software routines the computing system implements. For example, the processors 401 may perform the operations of determining and/or translating indicators or determining a privacy risk score. The instructions frequently involve some sort of operation performed upon data. Both data and/or instructions are stored in system-memory 403 and/or cache 404. Data may include indicators. Cache 404 is typically designed to have shorter latency times than system memory 403. For example, cache 404 might be integrated onto the same silicon chip(s) as the processor(s) and/or constructed with faster SRAM cells whilst system memory 403 might be constructed with slower DRAM cells. By tending to store more frequently used instructions and/or data in the cache 404 as opposed to the system memory 403, the overall performance efficiency of the computing system improves.

System memory 403 is deliberately made available to other components within the computing system. For example, the data received from various interfaces to the computing system (e.g., keyboard and/or mouse, printer port, LAN port, modem port, etc.) or retrieved from an internal storage element of the computing system (e.g., hard disk drive) are often temporarily queued into system memory 403 prior to their being operated upon by the one or more processor(s) 401 in the implementation of a software program. Similarly, data that a software program determines should be sent from the computing system to an outside entity through one of the computing system interfaces, or stored into an internal storage element, is often temporarily queued in system memory 403 prior to its being transmitted or stored.

The ICH 405 is responsible for ensuring that such data is properly passed between the system memory 403 and/or its appropriate corresponding computing-system interface (and/or internal storage device if the computing system is so designed) The MCH 402 is responsible for managing the various contending requests for system memory 403 access amongst the processor(s) 401, interfaces and/or internal storage elements that may proximately arise in time with respect to one another.

One or more I/O devices 408 are also implemented in a typical computing system. I/O devices generally are responsible for transferring data to and/or from the computing system (e.g., a networking adapter); or, for large scale non-volatile storage within the computing system (e.g., hard disk drive) ICH 405 has bi-directional point-to-point links between itself and/or the observed I/O devices 408. In one embodiment, I/O devices send and/or receive information from the social networking sites in order to determine privacy settings for a user.

Modules of the different embodiments of a claimed system may include software, hardware, firmware, or any combination thereof. The modules may be software programs available to a public or special or general purpose processors running proprietary or public software. The software may also be specialized programs written specifically for signature creation and/or organization and/or recompilation management. For example, storage of the system may include, but is not limited to, hardware (such as floppy diskettes, optical disks, CD-ROMs, and/or magneto-optical disks, ROMs, RAMs, EPROMs, EEPROMs, flash, magnetic or optical cards, propagation media or other type of media/ machine-readable medium), software (such as instructions to require storage of information on a hardware storage unit, or any combination thereof.

In addition, elements of the present invention may also be provided as a machine-readable medium for storing the machine-executable instructions. The machine-readable medium may include, but is not limited to, floppy diskettes, optical disks, CD-ROMs, and/or magneto-optical disks, ROMs, RAMs, EPROMs, EEPROMs, flash, magnetic or optical cards, propagation media or other type of media/ machine-readable medium suitable for storing electronic instructions.

Such promotions, social messaging, or offers can be provided in combination with 2D and/or 3D mapping data, e.g., but not limited to: geospatial, web mapping, 2D and/or 3D mapping, GPS and/or GIS tracking technologies, location mapping, social mapping, digital mapping, 3D holographic projection, 3D holographic mapping, 3D mobile mapping, interactive 3D graphic objects, and/or the like.

Other information or behavior data that can be used in the invention can include, but is not limited to, one or more of user, member, target market, demographic group or publisher (e.g., product or service provider) data, authentic user identity, user demographics, (e.g., but not limited to, name, age, geographic-location, employment, gender, relationship status, country and/or city, educational history, interests & topics, and/or the like), profiles, or lifestyle preferences, user's social media communications online or mobile with social media content available in a social networking environment, user's or publisher's geographic location objects, their friends and/or other criteria for user tracking technologies and/or generate multimedia marketing and/or mapping relationships between users or members of a social network or website, their friends, businesses and/or other points of interest impressions, friends' impressions, buying patterns impressions or behavior impressions, user/consumer interest and/or purchase decision impressions, shopping ad impressions, promoted trend impressions, social media impressions, capturing, processing, analyzing and/or filtering relevance, social content multimedia marketing, social contextual ads and/or connections among users or members, their friends, family and/or others, (e.g., acquaintances, close friends, family, peer groups, classmates, business associates and/or others, etc.), user-contributed information, mood recording impressions & updating, friend communications and/or micro blog impressions and/or focused multimedia marketing. Such behavior information and/or social interactions or browsing the content of a social network or mobile network or other application can be used to select targeted location-based and/or customized promotions, social messaging, or offers for the user, member, target market, or demographic group.

Location-based promotions, location-based offers, location-based coupons, promotions, social messaging, or offers in connection with online or mobile ads, mobile messages, mobile coupons, mobile promotions, mobile offers feed for products and/or services, operating through credit cards or other payment services, can optionally provide users discounts on their purchases at participating merchants (the merchants also have access to data on when customers purchase their goods and/or their personal information) and/or the like, and/or connecting them with the brand/or or advertiser based upon location-based information, data, location context, map and/or specific interests impressions, demographic factors, sharing life experiences, information and/or real-time data relation to the user's position in geographical space, connecting users as user/consumers, their friends and/or family with their geographic location map with advertisers and/or publishers and/or brands and/or user's friends and/or family and/or other connections and/or follower data, user's friends' connections with a particular brand, advertiser or business, places and/or geographic data, media, search, video, mobile, cross-media and/or wherein a user can provide or send messages, coupons, clickable advertisements, and/or mobile advertisements related to a location to other users via their mobile devices to their friends, family, business associates, or others, impressions, click-through ad impressions, mobile location data, mobile location-based advertising and/or promotions' or offers' impressions associated with maps or location, mobile multimedia marketing and/or advertising markets, impressions, wi-fi network impressions, feature phone impressions, and/or the like.

Hologram promotions, social messaging or offers can include but are not limited to, hologram advertising, hologram mobile multimedia marketing and/or advertising, social media hologram ad impressions, interactive hologram communications, hologram video ad impressions, 3D holographic projections, virtual keyboard and/or holographic display, mobile holographic display ads, and/or the like.

Promotions value, revenue or cost analysis or optimization can optionally include, but is not limited to, COST PER MILLE ("CPM"), COST PER DAY ("CPD"), COST PER CLICK ("CPC"), inventory optimization, campaign optimization, yield optimization, friendly campaign manager, mobile conversations, conversion tracking, engagement mapping, custom targeting, revenue or revenue sharing, mobile ad network use, mobile ad server use, smartphone, mobile banner, semantic web, contextual targeting, behavior targeting, audience segmentation.

Referring now to the drawings wherein like reference numerals are used to identify identical components in the various ad view impressions, FIG. 5 shows an example of a diagram for a method or system for Mapping Display of Location-Based Data Social networking preferences, online activities, notifications and/or User's behavior data, Location data, sharing links or updates, communications, syncs and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device and/or cloud computing sharing and/or consent sharing, Customized Promotions, Social Messaging, or Offers for Products or Services based on User-Behavior and/or Tracking a user's profile, unique-data and/or actions online or via a mobile or wireless device and/or Geographic Location, Social Networking, and/or Cloud Computing Security, ("LBCP-PS-UBL-SN-ET-CCS") system 10 in accordance with an exemplary embodiment combined online Product or Service in Geospatial Mapping/Web Mapping/2D Mapping/3D Mapping/GPS/Location Mapping/Social Mapping/Digital Mapping/3D Holographic Projection/3D Holographic Mapping/Mobile Mapping with Encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud security between communication interface devices accessing data in the cloud Computing/Company-Local Information/and/or Social Networking/Impressions/Location Data/Communities distribution system 10 includes a main server system 12 and/or a client system 14 that is remote from main server system 12, connected together by a distributed computer network, such as the Internet 16, (network, or mobile device access system)

Main server system 12 is configured to be connected to, and/or otherwise receive, location-based advertisements, location-based deals and/or offers location-based services, in real time, geo-targeted or geo-tagged advertisements or geospatial advertisements or mobile geo-tagged Internet posted promotions or offers and/or location-based promotions, location-based offers, location-based coupons, promotions, social messaging, or offers based user's or member's profile preferences and/or preferred locations, interests, preferences or networking interests or connections or channels or platforms. Although not shown, this function can be performed by a direct electronic connection with a sponsor system, and/or can involve loading data from a physically transportable data storage-medium, (e.g., diskette, tape, CD-ROM, USB drive, cloud storage, etc.) The coupon sponsor may, and/or in most cases will, issue in connection with the coupon an associated set of instructions that define how the coupon is to be distributed. For example, such instructions can include restrictions as to the number of coupons that any one user can print out for redemption, the state and/or zip code associated with a user for such user to have access to the coupon, the expiration date, the item and/or discount amount, etc. Main server system 12 is further configured to be connected to, and/or otherwise receive, advertising information from an advertising sponsor, or purchasing system, e.g., Amazon, or company purchase website or mobile app, or through-mobile banking system. Although not shown, this function can be performed by direct electronic connection with the ad sponsors system, and/or can involve loading data from a physically transportable data storage medium, (i.e., diskette, tape, CD-ROM, cloud storage, etc.) The advertising impressions are displayed on client system 14, as described in greater detail below.

Main server system 12 can include a website server 18, a front-end server 20, a handler 22, a database server 24, and/or an FTP server 26. Website server 18 is configured to provide "web pages," mobile app, wherein a user can provide or send messages, coupons, clickable advertisements, and/or mobile advertisements related to a location to other users via their mobile devices to their friends, family, business associates, or others, or electronic or mobile device, mobile banking and/or mobile wallet services, customer loyalty cards, discounts and/or promotions, social messaging, or offers and/or online or mobile payment system for coupons, location based promotions, location-based offers, location-based coupons, promotions, social messaging, or offers in connection with online or mobile ads, mobile messages, mobile coupons, mobile promotions, mobile offers feed and/or online or mobile coupons and/or promotions, social messaging, or offers for products and/or services to user/consumers, (including possible users or members of electronic coupon distribution system 10) with Internet access. Internet 16, more particularly, the world wide web portion thereof. Access to Internet 16 can be made by various methods; typically, however, a non-institutional user obtains access from one of a plurality of Internet Service Providers, (ISPs), which in turn obtain authorized access to Internet 16. Navigation the WWW portion of Internet 16 involves-knowledge of a directory structure of various-nodes of the Internet, (i.e., an "address" to each given resource on Internet 16). Such an address is generally referred to as a Uniform Resource Locator, (URL), which typically starts with a protocol name followed by a domain name, for example: http://www.valuepass.com. Website server 18 is configured to provide, among other things, an interface for affecting a download of client software that a user/consumer can download and/or execute to establish a client system 14 on his and/or her computer system. In this way the user/consumer can become an authorized user, ("user") of electronic coupon distribution system 10. In particular, website server 18 can refer an Internet user/consumer to FTP server 26 for the client installation file.

Front-end server 20 provides multiple interface and/or location/direction features for electronic coupon distribution system 10. Front-end-server 20 is the entity that is initially contacted by client system 14 at the start of each new session of a method or system for Mapping Display of Location-Based Data, Social networking preferences, online activities, notifications and/or User's behavior data, Location data, sharing links or updates, communications, syncs and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device and/or cloud computing sharing and/or consent sharing, Customized Promotions, Social Messaging, or Offers for Products or Services based on User Behavior and/or Tracking a user's profile, unique data and/or actions online or via a mobile or wireless device and/or Geographic Location, Social Networking, and/or Cloud Computing Security, ("LBCP-PS-UBL-SN-ET-CCS") distribution system 10, and/or when automatic coupon updates occur. Handler 22 is configured to interface with database server 24. After a user establishes a new session, all subsequent requests by client system 14 can be directed to and/or are "handled" by handler 22. As a result, handler 22 can thereafter issue a request and/or a command/or to database server 24, and/or directly respond to client system, (if configured to do so). Database server 24 can comprise a plurality of physical, individual general purpose digital computers configured as database servers, which can be further configured in a cluster-arrangement. Database server 24, in one embodiment, can be configured to operate using SQL server software, such as, but not limited to, Microsoft SQL Server Version 7, commercially available from, for example, Microsoft Corporation, Redmond, Wash., U.S.A.

FTP server 26 can be configured to operate in cooperation with geospatial, website server 18 to provide, for example, installation and/or setup programs. The installation program(s) are downloaded to a general-purpose computer, (e.g., PC and/or a MAC) for installation of the client software in accordance with the present disclosure. Client system 14 includes client application software 28, Device ID data 30, (ID) data 30, user preference data 32, user history data 34, LBCP-PS-UBL-SN-ET-CCS information data 36, and/or advertising data 38. In addition, client system 14 can comprise a general purpose computing apparatus configured to operate in accordance with an operating system having a graphical user interface such as, for example, Windows 95/98/NT 4.0/2000/Vista/7, and/or Apple Computer, Inc. MAC OS Operating System for Macintosh platforms. Client system 14 can further include standard peripherals such as a display device 40, a keyboard 42, a pointing device, such as a mouse 44, and/or an output device, such as a printer 46, for producing a "hard copy" of LBCP-PS-UBL-SN-ET-CCS 48. Device ID data 30 can be stored on main server system 12, according to an exemplary embodiment. In exemplary embodiments, one, a few, a plurality and/or all Device ID data 30 can be stored on main server system 12.

Client application software 28 comprises software compatible with and/or executing on client system 14 configured to implement the present disclosure as described herein. Client application software 28 performs various functions including, but not limited to, collecting user information, including preferences, consumer feedback data for products or services, location data and/or social media content communicating with main server system 12 via Internet 16, and/or providing an interface for the user or member of a social network for browsing through, and/or selecting, LBCP-PS-UBL-SN-ET-CCS information for printout. Device ID data 30 can comprise a multi-digit number that is assigned by main server system 12, more particularly, database server 24, when a user registers with LBCP-PS-UBL-SN-ET-CCS information distribution system 10. Device ID data 30 can have a format, such as XXXXXXXX, where X is a digit between 0-9. Device ID data 30, however, does not specifically identify the user personally, but rather, more accurately associates a physical machine defining client system 14 with user or member profile information obtained during registration. Device ID data 30 is stored on client system 14, main server system 12, and/or both as a part of a User Info object. If the Device ID data 30 is stored on client system 14, then Device ID data 30 is provided to main server system 12 when making requests, for example, for new LBCP-PS-UBL-SN-ET-CCS information data. If a client system 14 operates multiple independent operating systems, (e.g., a Mac operating system, (a product of Apple Computer, Inc.) and/or a Windows operating system, (a product of Microsoft Corp.), then there can be a separate Device ID data 30 for each operating system assigned to that client system 14. Main server system 12 can correlate the provided Device-ID data 30 with user information stored in a profile database. The user information can then be used in identifying LBCP-PS-UBL-SN-ET-CCS information suitable for the user or member of a social network. In this embodiment, however, the user is not personally identified nor is it even possible, (e.g., through the "hacking" of main server system 12) to identify the user personally, as such information is not even collected from the user. Accordingly, the approach described herein maintains privacy of the user of LBCP-PS-UBL-SN-ET-CCS information distribution system 10.

The User Info object further includes user information collected from the user of client system 14 indicative of one and/or more demographic characteristics of the user. In this embodiment, the user information is insufficient to specifically identify the user. In a constructed embodiment, such information comprises a postal zip code associated with the user, and/or a state in which the user resides. Client application software 28 allows the user to update this information after initial registration. In addition, the User Info object includes the mode in which the Internet is accessed, for example, through use of a modem, (e.g., dial-up), through use of a Local Area Network, (LAN), and/or use of a proxy server. The User Info object can further include the version number of the client application software 28. User preference data 32 comprises two main groups. The first group of information contained in user preference data 32 includes information defining how often the main server system 12 is checked for new LBCP-PS-UBL-SN-ET-CCS information. In a constructed embodiment, the options include one hour, two hours, four hours, (the default), twice a day, and/or once a day. The first group of information contained in user preference data 32 can also include a miscellaneous item of information indicating whether the user prefers that certain LBCP-PS-UBL-SN-ET-CCS information be automatically printed, (this can be selected and/or deselected by the user). The second main group of information included in user preference data 32 includes a comprehensive listing of main categories of LBCP-PS-UBL-SN-ET-CCS information selected by the user that the user wishes to receive. While the particular main LBCP-PS-UBL-SN-ET-CCS information category descriptions can be changed on-main server system 12 and/or downloaded to client system 14 at any time, exemplary categories include "Apparel," "Athletics," "Automotive," and/or "Internet Electronics," among others. A user can deselect a category, in which case LBCP-PS-UBL-SN-ET-CCS information pertaining to that category cannot be sent from main server system 12 to client system 14.

User history data 34 comprises data corresponding to events occurring at the remote client system 14, as well as other items pertaining to the operation of client system 14. All these items are stored in a user history file. For example, when a user is browsing through available LBCP-PS-UBL-SN-ET-CCS information each LBCP-PS-UBL-SN-ET-CCS information that is selected for viewing is noted in the user history file. Likewise, when LBCP-PS-UBL-SN-ET-CCS information is selected for printing, that action is also recorded in the user history file. Other examples include when LBCP-PS-UBL-SN-ET-CCS information is actually printed, and/or when an advertising impression, (described in further detail below) is displayed on display device 40. The information contained in the user history data 34 is encrypted identity information and/or user's authentication protocols online or via a mobile or wireless device using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services with cloud security prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications by client application software 28 in accordance with a client system encryption strategy to protect the integrity of the data contained therein.

LBCP-PS-UBL-SN-ET-CCS information data 36 includes information corresponding to the LBCP-PS-UBL-SN-ET-CCS information available, (e.g., for browsing) on client system 14. Each LBCP-PS-UBL-SN-ET-CCS information, such as LBCP-PS-UBL-SN-ET-CCS information 48, includes a plurality of items of information associated therewith.

In addition, when LBCP-PS-UBL-SN-ET-CCS information 48 is actually printed out, additional information can be printed out on the "hard copy" of the LBCP-PS-UBL-SN-ET-CCS information. These additional items can include the Device ID data 30, portions of the demographic data such as the postal zip code, one and/or more items of the user information contained in user preference data 32, the date and/or time, and/or optionally various Internet URLs. Coupon sponsors have found some of the information appearing on printed LBCP-PS-UBL-SN-ET-CCS information 48 desirable. That is, when the user-redeems LBCP-PS-UBL-SN-ET-CCS information 48, for example, at a retail store, information appearing on LBCP-PS-UBL-SN-ET-CCS information 48, (which is eventually returned by the retailer to the LBCP-PS-UBL-SN-ET-CCS information issuer and/or sponsor) is available to the LBCP-PS-UBL-SN-ET-CCS information sponsor. This information can thereafter be used in analyzing and/or assessing the efficacy of various advertising/promotional strategies. LBCP-PS-UBL-SN-ET-CCS information data 36 can be stored on a hard drive and/or the like associated with client system 14, and/or is preferably stored in an encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications form. In particular, and/or in accordance with the present disclosure, LBCP-PS-UBL-SN-ET-CCS information data 36 corresponding to LBCP-PS-UBL-SN-ET-CCS information is encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications by main server system 12 in accordance with a server system encryption strategy.

The encrypted identity information and/or user's authentication protocols online or via a mobile or wireless device using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services with cloud security prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications LBCP-PS-UBL-SN-ET-CCS information data is then transmitted to client system 14. Client system 14 further encrypts the once-encrypted identity information and/or user's authentication protocols online or via a mobile or wireless device using encryption technologies and/or filters to secure cloud security to prevent the unauthorized collecting, tracking and/or analysis of a user's-personal data, communications data, identification data, location data and/or other information and/or data by a third party using cloud computing analytics and/or limit disclosure of a user's or end user' identifying information, user's current location data and/or their communications LBCP-PS-UBL-SN-ET-CCS information data in accordance with a client system encryption strategy to thereby generate doubly encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications LBCP-PS-UBL-SN-ET-CCS information data. The doubly encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications LBCP-PS-UBL-SN-ET-CCS information data 36 can then be stored on the client system 14. The foregoing encryption steps substantially minimize the occurrence of fraud in the distribution of LBCP-PS-UBL-SN-ET-CCS information compared to known systems. A user, for example, can therefore not easily defeat the LBCP-PS-UBL-SN-ET-CCS information counting scheme that limits the number of printouts by, for example, exploring the client systems hard drive, identifying LBCP-PS-UBL-SN-ET-CCS information data, and/or thereafter producing printed copies of the LBCP-PS-UBL-SN-ET-CCS information. Use of the environment established by client application software 28 is therefore practically the only means for the user or member of a social network to obtain usable LBCP-PS-UBL-SN-ET-CCS information 48. Advertising data 38 comprises a plurality of advertising impressions wherein each impression can include a predetermined combination of collecting, mining, processing and/or storing social media, mobile and/or cloud data transmitted in the cloud service providers, servers, social networks or mobile networks including text and/or images. Advertising data 38 is also stored on client system 14 in an encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications form. Display device 40, keyboard 42, mouse 44, and/or printer 46 can comprise an apparatus known to those of ordinary skill in the art.

FIG. 6 shows, in greater detail, database server 24 of main server system 12. As described above, database server 24 can comprise a plurality of physical database servers arranged in a cluster. Further physical machines can be added to provide for load balancing, (i.e., scalability, and/or the ability to quickly add additional hardware as load and/or responsiveness criteria require). Database server 24 can include LBCP-PS-UBL-SN-ET-CCS information database 50, an advertising database 52, a master category list master category list database 54, a plugin database 56, a brand/or logo database 58, and/or a user transaction history database 60.

LBCP-PS-UBL-SN-ET-CCS information database 50 includes LBCP-PS-UBL-SN-ET-CCS information data similar to that described in connection with LBCP-PS-UBL-SN-ET-CCS information data 36, but is more in the nature of a master LBCP-PS-UBL-SN-ET-CCS information database including the entire universe and/or a larger set of LBCP-PS-UBL-SN-ET-CCS information available on LBCP-PS-UBL-SN-ET-CCS information distribution system 10. Advertising database 52 includes a plurality of ad impressions, which can be a combination of collecting, mining, processing and/or storing social media, mobile and/or cloud data transmitted in the cloud service providers, servers, social networks or mobile networks including text and/or images. Again, advertising database 52 is in the nature of a master advertising database including all of the advertising impressions included in main server system 12.

Master category list database 54 includes the main LBCP-PS-UBL-SN-ET-CCS information category names presently established on LBCP-PS-UBL-SN-ET-CCS information distribution system 10. In addition, display characteristics; such as the color of a main LBCP-PS-UBL-SN-ET-CCS information category button can also be stored in database 54.

Plugin database 56 includes information as to available plugins for use in connection with client application software 28 of client system 14. Plugin database 56 includes a plurality of plugins. The particular plugins that are selected for use in connection with client application software 28 depends on what added functionality has been configured in client system 14. For example, plugins can be configured to provide Zodiac information, recipe information, and/or stock quote information to the user. Additionally, a plugin can be configured to provide a new LBCP-PS-UBL-SN-ET-CCS information style for the user or member of a social network. In this way, client system 14 can be updated remotely with new functionality.

Brand/or logo database 58 includes information as to how the user interface of client system 14 is "branded." The default "branding" of the user interface involves the display of a company logo of the assignee of the present disclosure. Also, a corresponding Internet URL for "click through" purposes is associated with the brand/or image. However, in alternate embodiments, other companies can arrange, (e.g., through a referral of potential new users or members of LBCP-PS-UBL-SN-ET-CCS information distribution system 10) to have the user interface of client application software 28 "branded" with the referring company's logo, (and/or Internet URL for "click through")

User transaction history database 60 includes information contained in user history data 34 uploaded from client system 14. User transaction history database 60 therefore contains information corresponding to actions and/or events taken by and/or involving the user of client system 14. User transaction history database 60 therefore includes a record for each LBCP-PS-UBL-SN-ET-CCS information that has been downloaded and/or otherwise provided to client system 14. As each LBCP-PS-UBL-SN-ET-CCS information is displayed, and/or printed by the user, for example, the corresponding record in user transaction history database 60 is updated.

Figure 7:
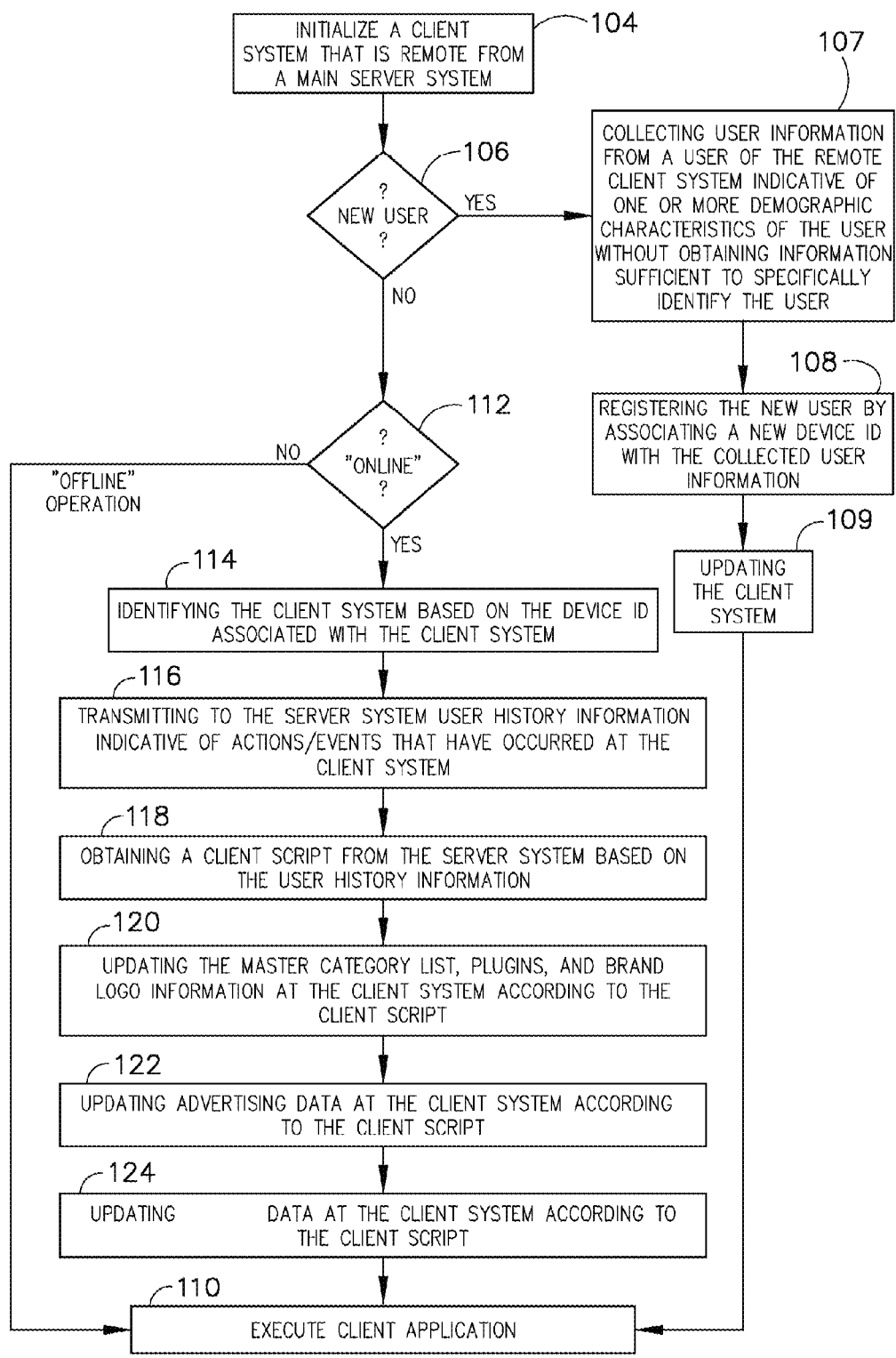
FIG. 7 is a simplified flowchart diagram view illustrating interactions or browsing the content of a social network or mobile network or application between the client system, and/or the main server system, according to an exemplary embodiment.

Referring now to FIG. 7, (with reference to components referenced in FIGS. 5 and/or 6), a brief description of the operation of LBCP-PS-UBL-SN-ET-CCS information distribution system 10, particularly the main interactions between client system 14 and/or main server system 12, can now be set forth. Each time a new session is commenced, the basic steps set forth in FIG. 7 are performed.

In step 104, client system 14, by way of execution of client application software 28, is initialized. In step 106, client application software 28 determines whether there is an identified user device for client system 14, and/or whether the present user is a "new" user device. Client application software 28 can make this determination based on the existence and/or absence of particular files on client system 14, (e.g., a file containing a Device ID data 30) indicative of whether and/or not this is a "new" user device. If "NO," then the method branches to step 112. Otherwise, if the answer to step 106 is "YES," then the method branches to step 107.

In step 107, client application software 28 obtains user information from the user. In particular, client application software 28 is configured to collect user information from a user of client system 14 indicative of one and/or more demographic characteristics of the user without obtaining information sufficient to specifically identify the user. In a constructed embodiment, the information obtained comprises a postal zip code associated with the user, and/or a State where the user resides. Personal information such as the users or members name, e-mail address, residence address, social security number, telephone number, and/or the like is not obtained in step 107. In accordance with the present disclosure, the foregoing step provides useful information to main server system 12 in the selection of LBCP-PS-UBL-SN-ET-CCS information appropriate for the user or member of a social network, (e.g., geographic area) LBCP-PS-UBL-SN-ET-CCS information from merchants located geographically proximate the users or members residence can be more easily redeemed by the user, thus increasing the efficacy of the LBCP-PS-UBL-SN-ET-CCS information offer. Other information, such as the type of Internet connection, (e.g., modem), can also be obtained from the user in step 107.

In step 108, main server system 12 registers the "new" user device. Main server system 12 determines whether the user of remote client system 14 is a "new" user device based on the presence and/or absence of Device ID data 30 in a message from client system 14 to main server system 12. The "new" user device is then registered on main server system 12. Main server system 12 is configured to register the new user by performing, among other things, the steps of allocating a new Device ID data 30, and/or associating the new Device ID data 30 with the user information obtained in step 107. Through the foregoing, remote client system 14 can always be identified by its Device ID data 30. In step 109, client system 14 and/or main server system 12 communicate so as to update the master category list, plugins, brand/or logo information, advertising data and/or LBCP-PS-UBL-SN-ET-CCS information data at the remote client system 14. This is done, for the first time client application software 28 is executed, by searching the main server system 12 for new information that has come into being between the time the installation and/or setup program that the user used to install client system 14 was populated with such data, (the "sync" date), and/or the present time, (the server date) The identified information is downloaded to thereby update client system 14. This step provides that the user of client system 14 has the most up-to-date information in these categories. The method then proceeds to step 110 wherein main client application software 28 is executed.

When the answer to step 106 is "NO," then the method branches to step 112. In step 112, client application determines whether client system 14 is "online." Client system 14 is "online" when the user is connected to the Internet such that client system 14 can communicate with main server system 12. Client system 14, in an exemplary embodiment, cannot force a connection to Internet 16. Rather, if there is no "online" connection, the user of client system 14 can have access to LBCP-PS-UBL-SN-ET-CCS information in an "offline" mode of operation. Thus, if the answer to step 112 is "NO," then the method branches to step 110. Otherwise, when the answer step 112 is "YES," then the method branches to step 114.

In step 114, main server system 12 identifies the remote client system 14 based on a Device ID data 30 provided by client system 14. In this way, main server system 12 can utilize the information "on file," such as state and/or zip code, for a variety of purposes. In a constructed embodiment, the state and/or zip code data are included in a request by front-end server 20 to database server 24 to select a server that can service this user for this session. The response to the request is a virtual IP address to a particular handler 22, and/or a selected database "name" of a selected database server 24.

In step 116, main server system 12, particularly the assigned handler 22 and/or database server 24, is updated with any information contained in user history data 34 that has not yet been uploaded and/or processed. The user history file contains information indicative of actions taken by, or, events occurring in response to actions taken by, the user of remote client system 14. As described above, user history data 34 contains information such as the identity of LBCP-PS-UBL-SN-ET-CCS information selected, LBCP-PS-UBL-SN-ET-CCS information printed, advertising impressions and/or displayed in advertising pane 72, etc. The assigned handler 22 in conjunction with database server 24 uses the user history file in at least two ways: (i) to produce data from which a user script can be built by the remote client system 14 and, (ii) to update the user transaction history database 60, which can then be queried to prepare reports that are provided as feedback to the various advertising sponsors, LBCP-PS-UBL-SN-ET-CCS information issuers, and/or LBCP-PS-UBL-SN-ET-CCS information referral agents.

Step 118 involves obtaining a client script for execution by client system 14. Step 118 includes the substep of identifying LBCP-PS-UBL-SN-ET-CCS information at main server system 12 suitable for the user or member of a social network. What is suitable for any particular user can be based on Device ID data 30, the user information associated with Device ID data 30, and/or the main LBCP-PS-UBL-SN-ET-CCS information categories selected by the user, the OS platform, (e.g., MAC OS vs. Windows), the version of client application software 28, the cobrand/or ID, and/or the promotional code, if any. Use of these criteria can be either inclusive and/or exclusive. Client system 14 can be sent lists of undownloaded LBCP-PS-UBL-SN-ET-CCS information, undownloaded ads, etc. The lists can only identify, for example, the LBCP-PS-UBL-SN-ET-CCS information to be downloaded, (not the LBCP-PS-UBL-SN-ET-CCS information itself) Steps 120, 122, and/or 124 involve obtaining the actual LBCP-PS-UBL-SN-ET-CCS information data, ad data, etc.

In step 120, the master category list, plugins, and/or brand/or logo information is updated, based on execution of the client script by client system 14. Particularly, client system 14 works through the list of needed items.

In step 122, advertising data comprising advertising impressions from advertising database 52 are updated at the remote client system 14. This step provides that the user has the most up-to-date advertising available. Again, client system 14 works through a list of needed ads, sequentially making requests from database server 24. In step 124, LBCP-PS-UBL-SN-ET-CCS information data from LBCP-PS-UBL-SN-ET-CCS information database 50 is updated at remote client system 14. Updating of the LBCP-PS-UBL-SN-ET-CCS information data includes retrieving LBCP-PS-UBL-SN-ET-CCS information data corresponding to the identified LBCP-PS-UBL-SN-ET-CCS information, (i.e., the list provided as part of the client script)

Figure 8:
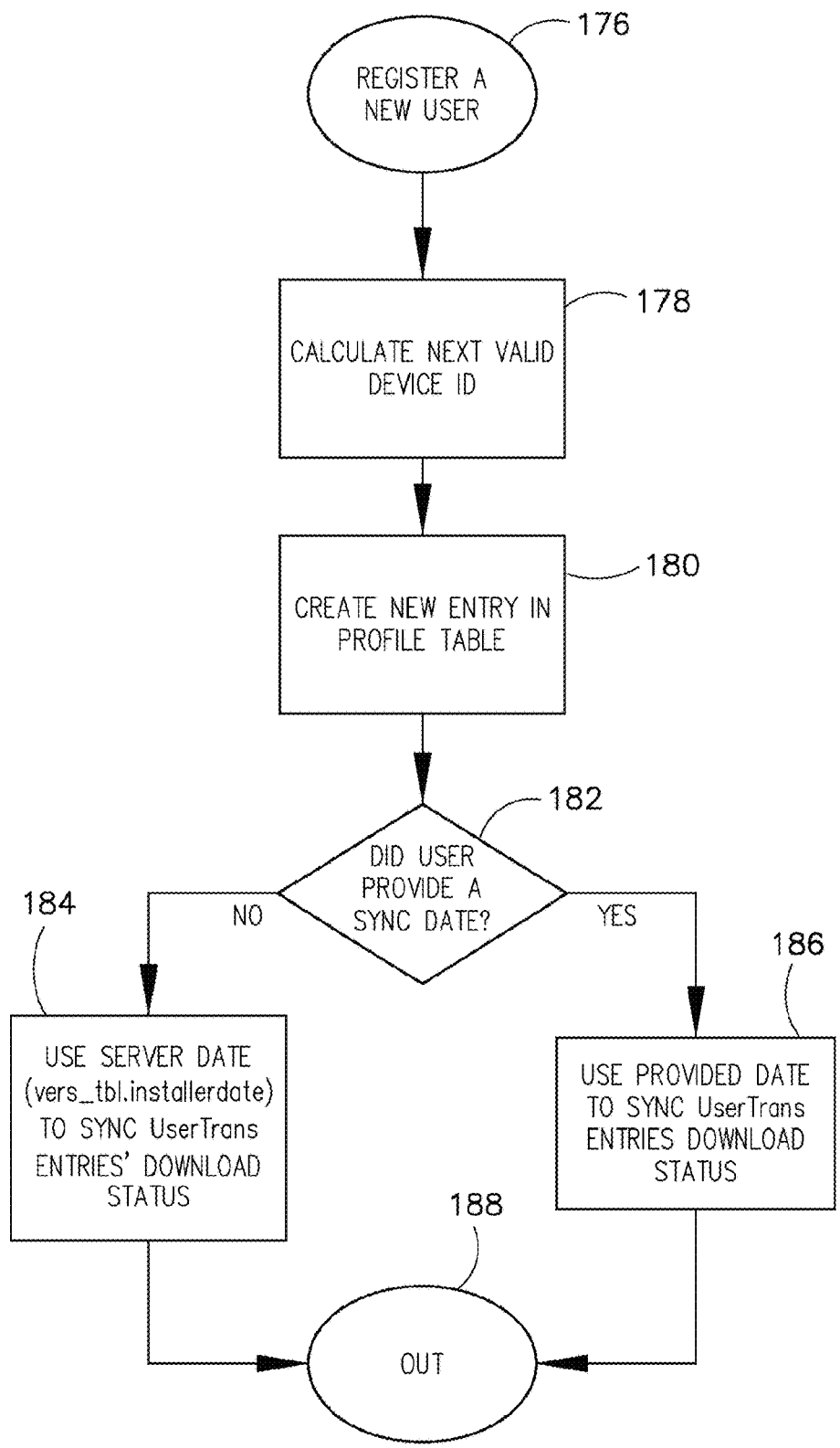
FIG. 8 is a simplified flowchart diagram view showing the steps for registration of a new user on the main server system, according to an exemplary embodiment.

FIG. 8, (also referring to FIGS. 5, 6) shows the steps performed on main server system 12 to register a new user device. The process begins in step 176 with commencement of the registration routine. In step 178, a new Device ID data 30 is calculated by database server 24. In step 180, a new entry and/or record is created in a user or member profile table. The profile entry can associate Device ID data 30 with the user information collected from the user. The method then proceeds to step 182.

In step 182, database server 24 determines whether a "sync date" was provided from client system 14. This is a date that describes how "up-to-date" client system 14 is, particularly the LBCP-PS-UBL-SN-ET-CCS information and/or advertising information portions thereof. The "sync date" is automatically provided from client system 14 to database server 24 via the assigned handler 22. If a "sync date" was not provided by client system 14, then the method branches to step 184 where a nominal sync date based on the version of the software installed on the client system is used for downloading and/or updating purposes. Alternatively, if the answer to step 182 is "YES," then the method branches to step 186.

In step 186, the date provided by client system 14 is used as the "sync date" to synchronize the data on client system 14 relative to the master data on main server system 12. It should be emphasized that the "sync date" is not a date that client application software 28 solicits from the user, but rather, is simply a date available within client application software 28 relating to how "current" the data is, (i.e., LBCP-PS-UBL-SN-ET-CCS information/advertising data, etc.) In either case, the method proceeds to and/or ends at step 188.

Figure 9:
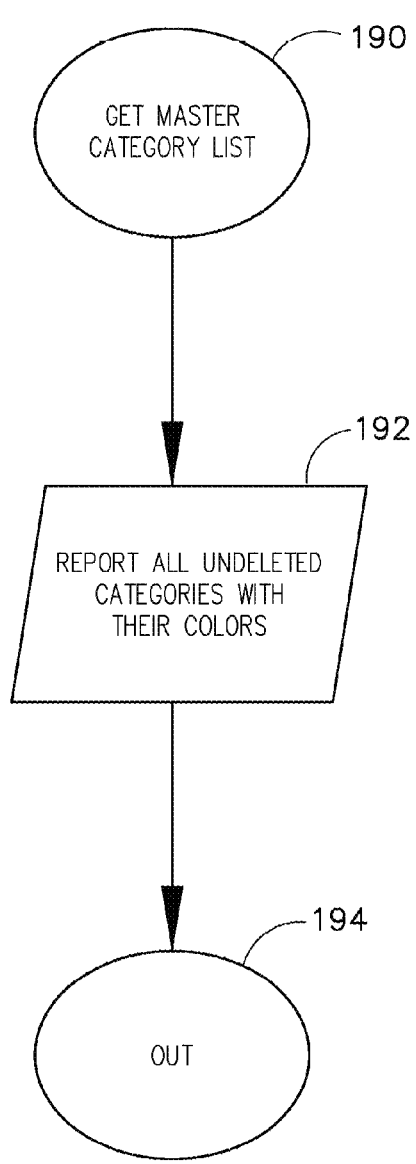
FIGS. 9-10 provide each a simplified flowchart diagram view showing, in greater detail, the steps of updating the master category list, plugins, and/or brand/or logo information, respectively, that are shown in block diagram form in FIG. 4, according to an exemplary embodiment.

FIG. 9 shows step 120, (FIG. 7) in greater detail. Referring to FIG. 9, step 190 represents a request to obtain a master category list, (i.e., the up-to-date list) This request is made from client system 14, (FIG. 5) to the selected database server 24 via handler 22. Such a request is directed to the selected "virtual" IP address as described above. The master LBCP-PS-UBL-SN-ET-CCS information category list, (e.g., "Athletics," "Automotive," "Internet Electronics," etc.) can be updated on main server system 12, particularly database server 24. That is, categories can be added, and/or categories can be deleted. In either case, such a change is reflected in user interface 62 of the respective client systems 14 when the next session is invoked by a user.

In step 192, all undeleted master LBCP-PS-UBL-SN-ET-CCS information categories, along with their display color, (as displayed on display device 40 of client system 14) are reported out to client system 14 for use by client application software 28. Step 194 ends the master LBCP-PS-UBL-SN-ET-CCS information category list updating process.

Figure 10:
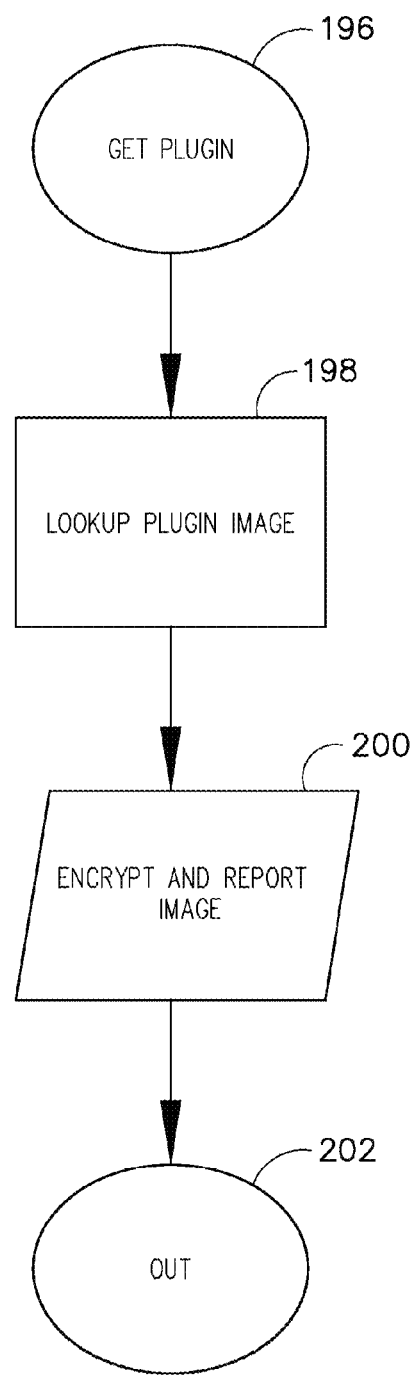

Referring now to FIG. 10, step 196 represents a request from client system 14 to database server 24 via handler 22 to obtain a new and/or an up-to-date plugin(s). It should be understood that for an existing user, client system 14 can be executing a client script that includes a list containing needed plugins. The process outlined in FIG. 10 would be executed for each plugin on the list.

In step 198, database server 24 performs a look-up of the needed plugin to locate the corresponding plugin file, (or image)

In step 200, an "image" and/or copy of the file of the sought after plugin is encrypted identity information and/or user's authentication protocols online or via a mobile or wireless device using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services with cloud security prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications in accordance with a server system encryption strategy, and/or is reported and/or transmitted via Internet 16 to client system 14. In step 202, the plugin update process is completed.

Figure 11:
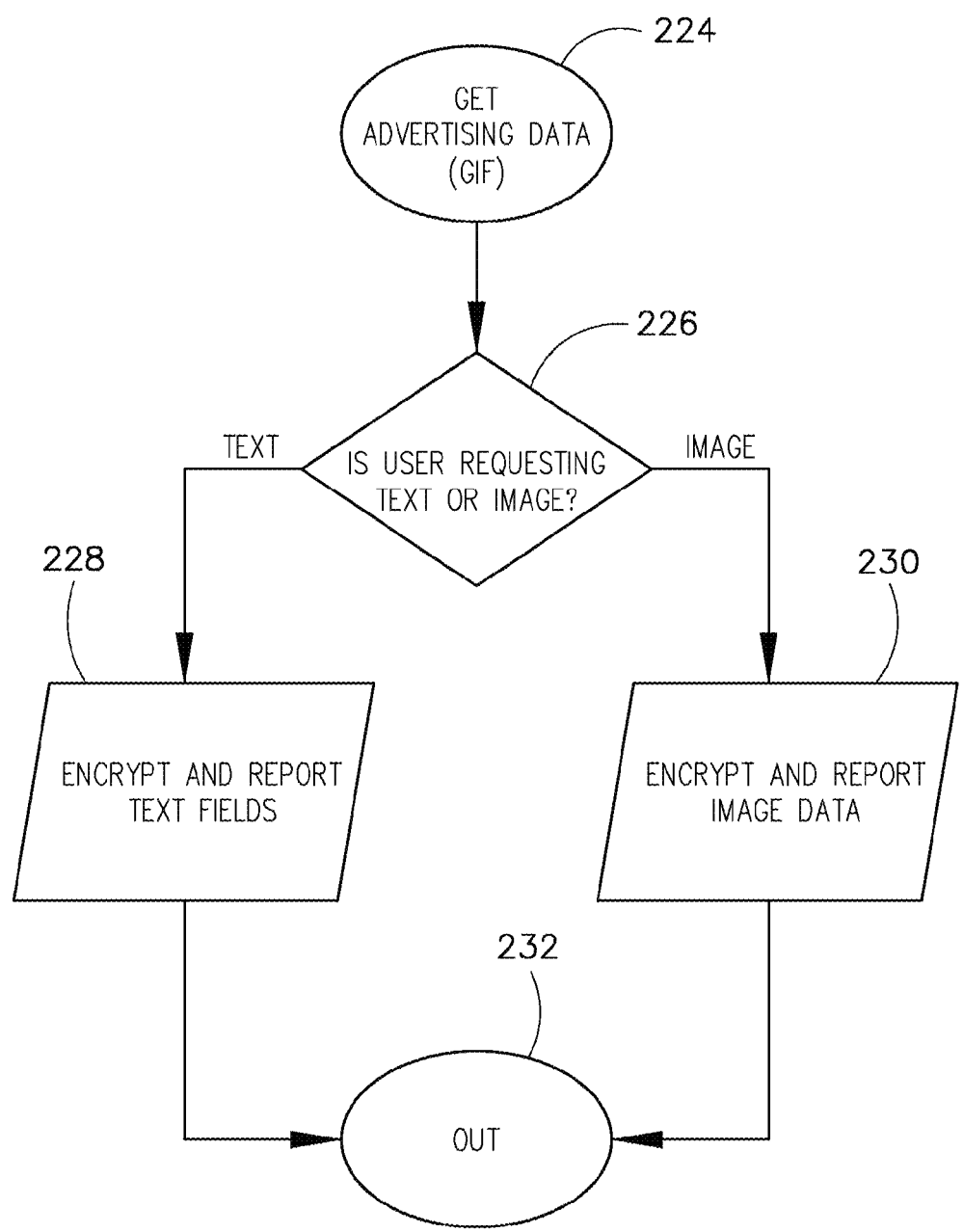
FIG. 11 is a simplified flowchart diagram view showing, in greater detail, the step of updating advertising data that is shown in block diagram form in FIG. 4, according to an exemplary embodiment.

FIG. 11 shows step 122, ("updating advertising data") of FIG. 7 in greater detail. In particular, steps 224-232 illustrate, in accordance with the present disclosure, that advertising text, and/or images are encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications to thereby provide secure transmission to client-system 14. It should be understood that for an existing user device, client system 14 can be executing a client script that includes a list containing needed advertising impressions. The process outlined in FIG. 11 would be executed for each advertising impression the list. Step 224 marks the beginning of the advertising update method.

In step 226, main server system 12 determines whether the user, more particularly client system 14, is requesting "text" and/or "image" advertising data. If the answer is "text," then the method proceeds to step 228.

In step 228, main server system 12, particularly database server 24, encrypts the text of the advertising data, and/or reports out the resulting encrypted identity information and/or user's authentication protocols online or via a mobile or wireless device using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services with cloud security prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications advertising data. It should be understood this encryption occurs in accordance with a server system encryption strategy.

Otherwise, the method proceeds to step 230 when the advertising data requested is "image" data. In step 230, the advertising data, ("image" data) is encrypted identity information and/or user's authentication protocols online or via a mobile or wireless device using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services with cloud security prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications by main server system 12 according to a main server system encryption strategy, resulting in encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications advertising image data. The encrypted identity information and/or user's authentication protocols online or via a mobile or wireless device using encryption technologies and/or filters to secure cloud security to prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications ad image data is then reported out to client system 14. Step 232 defines the end of the advertising update process.

Figure 12:
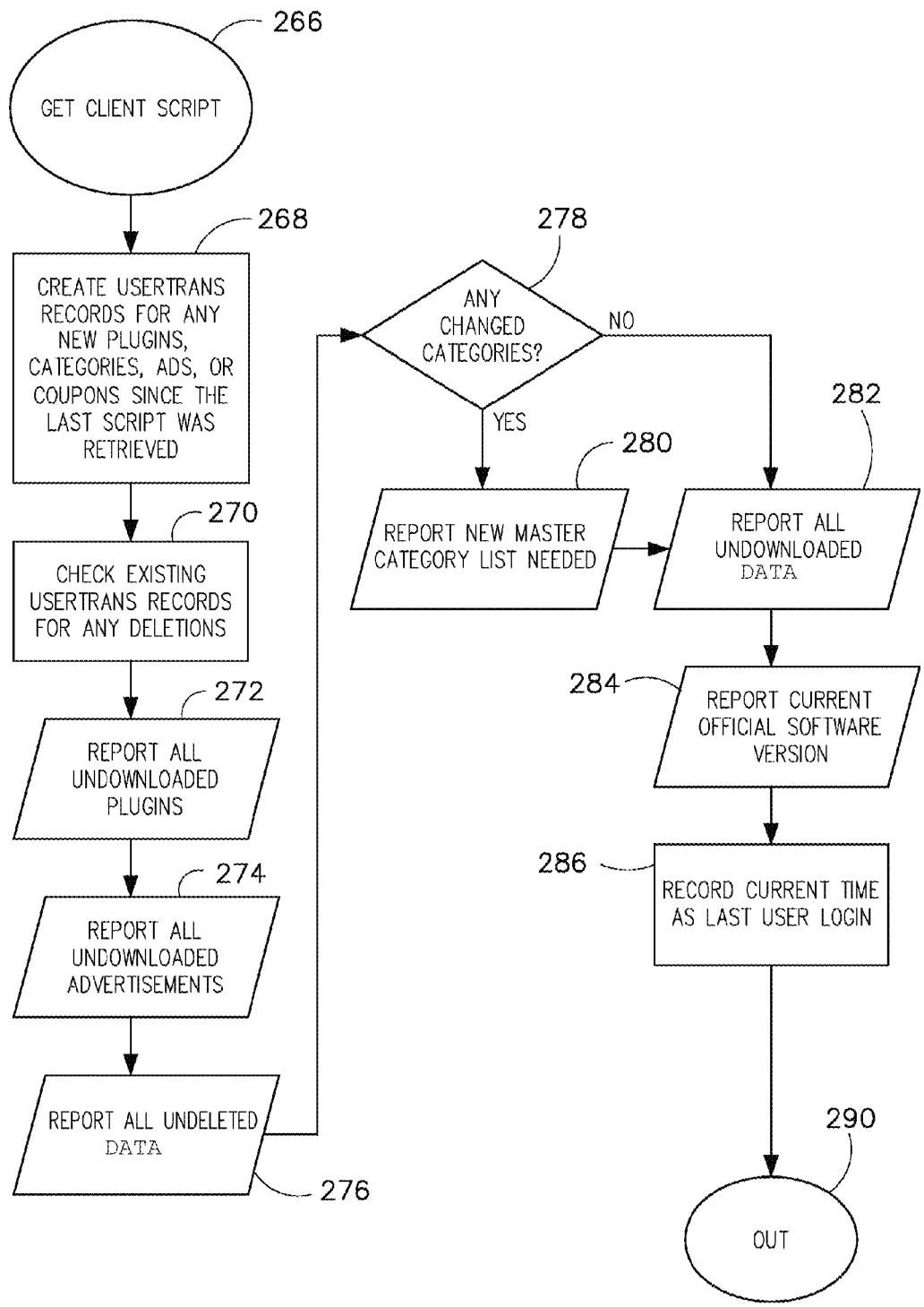
FIG. 12 is a simplified flowchart diagram view showing the steps involved in obtaining a client script, according to an exemplary embodiment.

Referring now to FIG. 12, after the user history codes from user history data 34 have been extracted and/or decoded, a "client script" is built by client system 14 based on information, (e.g., lists) from handler 22 in cooperation with database server 24. The client script provides instructions for main server system 12 to execute. In step 266, client system 14 issues a request to handler 22 to obtain the "user" and/or "client" script. The client script is then returned to client system 14. Step 268 show the execution of the client script by client system 14, which issues the commands shown in the steps 268-290. In step 268, client system 14 issues commands via handler 22 to database server 24 to create user transaction records for any new plugins, main LBCP-PS-UBL-SN-ET-CCS information categories, advertising data, and/or LBCP-PS-UBL-SN-ET-CCS information data received by client system 14 since the last client script was retrieved. In step 270, client system 14 issues commands via handler 22 to database server 24 to check existing user transaction records for any deletions. Any deletions are processed whereby the affected user transaction record is modified to indicate that the client LBCP-PS-UBL-SN-ET-CCS information has been deleted. In step 272, client system 14, in execution of the client script, issues a command/or via handler 22 to database server 24 to report all undownloaded plugins. Database server 24, through handler 22, returns a message containing a listing of all undownloaded plugins. This list is processed by client system 14 after the client script has been completed. In step 274, client system 14, in execution of the client script, issues a command/or via handler 22 to database server 24 to report all undownloaded advertising impressions. Database server 24 returns a list of all undownloaded ad impressions. In step 276, client system 14, in execution of the client script, issues a command/or via handler 22 to database server 24 to report all undeleted LBCP-PS-UBL-SN-ET-CCS information. In step 278, client system 14, in execution of the client script, issues a command/or via handler 22 to database server 24 to determine whether any of the main LBCP-PS-UBL-SN-ET-CCS information categories have been changed. If the answer to this inquiry is "YES," then flow of the process continues at step 280, wherein the database server 24 reports to client system 14 that a new master category list is needed. Flow then proceeds to step 282.

If the answer to the inquiry in step 278 is "NO," then flow of the process proceeds to step 282. In step 282, client system 14, in execution of the client script, issues a command/or via handler 22 to database server 24 to report all undownloaded LBCP-PS-UBL-SN-ET-CCS information. Database server 24 returns a listing of all undownloaded LBCP-PS-UBL-SN-ET-CCS information. In step 284, client system 14, in execution of the client script, issues a command/or via handler 22 to database server 24 to report the current official software version. Database server 24 returns the latest version number. In step 286, database server 24 is requested to record the current time as the last user login. Flow of the process then continues to step 290, which marks the end of the client script execution.

Figure 13:
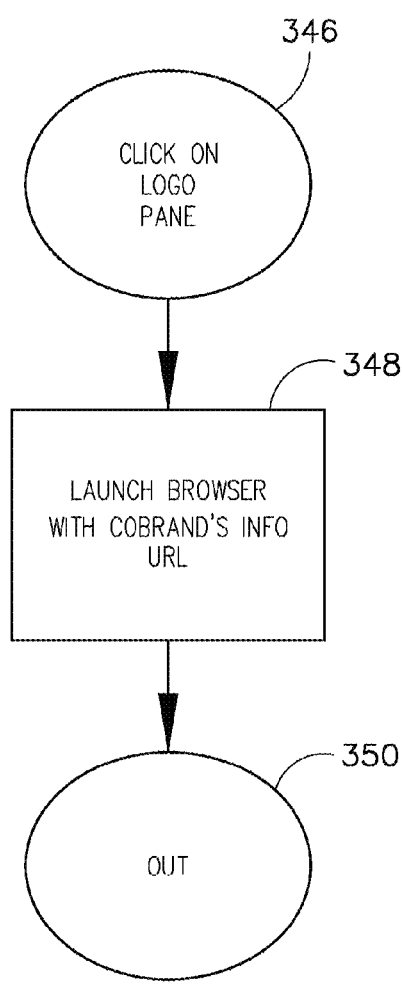
FIGS. 13-14 are simplified flowchart diagram views showing alternate actions taken by the client system in response to selection by the user of a logo pane and/or an advertising pane, respectively, according to exemplary embodiments.

In FIG. 13, steps 346-350 illustrate the response of client application software 28 when a user "ad click impressions" and/or otherwise selects logo pane 74 of user interface 62. Step 346 marks the beginning of the routine. Step 346 is entered when client application software 28, (via the OS) detects that the user has "clicked" on and/or otherwise selected a portion of logo pane 74.

In step 348, client application software 28 invokes an Internet browser registered with the operating system of client system 14 as the default browser and/or passes thereto a URL. The Internet browser then connects to a website server resource corresponding to the specified URL. This "click" action, therefore, takes the user to the website of the company displayed in logo pane 74. Step 350 marks the end of this routine.

Figure 14:
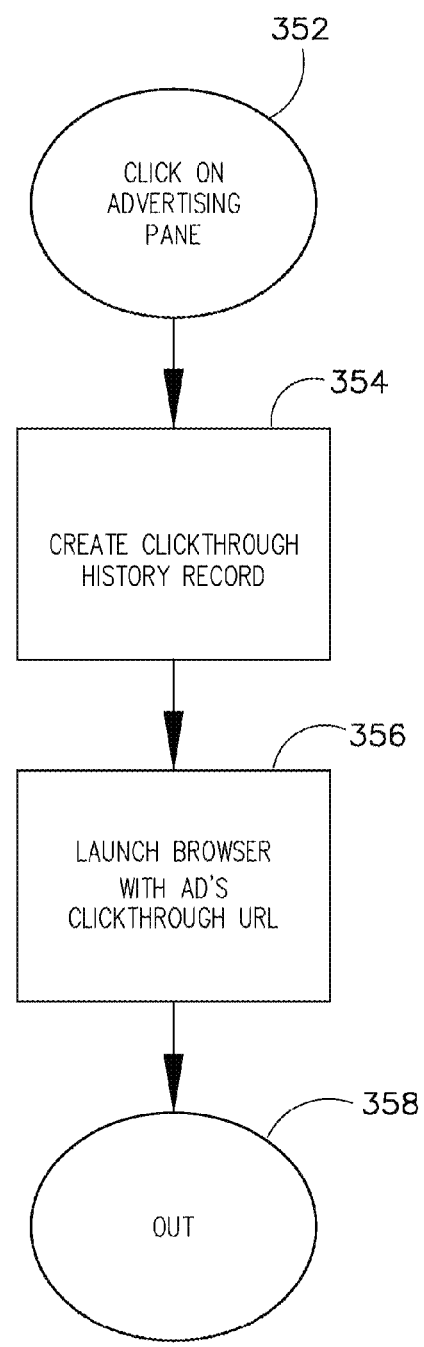

FIG. 14 shows the response of client application software 28 when a user "ad click impressions" on and/or otherwise selects a portion of advertising pane 72. Step 352 marks the beginning of the routine. In step 354, client application software 28 creates a click-through history record indicative of the fact that the user has "clicked" and/or otherwise selected the advertiser displayed in advertising pane 72. This is included in user history data 34, which can thereafter be encrypted identity information and/or user's authentication protocols online or via a mobile or wireless device using encryption technologies and/or filters to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services with cloud security prevent the unauthorized collecting, tracking and/or analysis of a user's personal data, communications data, identification data, location data and/or other information and/or data by a third party using cloud computing analytics and/or limit disclosure of a user's or end user' identifying information, user's current location data and/or their communications and/or transmitted to main server system 12 for processing.

In step 356, the client application software 28 launches an Internet browser registered with the operating system of client system 14, and/or passes thereto a URL corresponding to the advertiser displayed in advertising pane 72. When the Internet browser executes, it connects to a website server resource defined by the URL. In effect, the foregoing actions take the user to the advertisers and/or publishers website specified in the URL. Step 358 marks the end of this routine.

Figure 15:
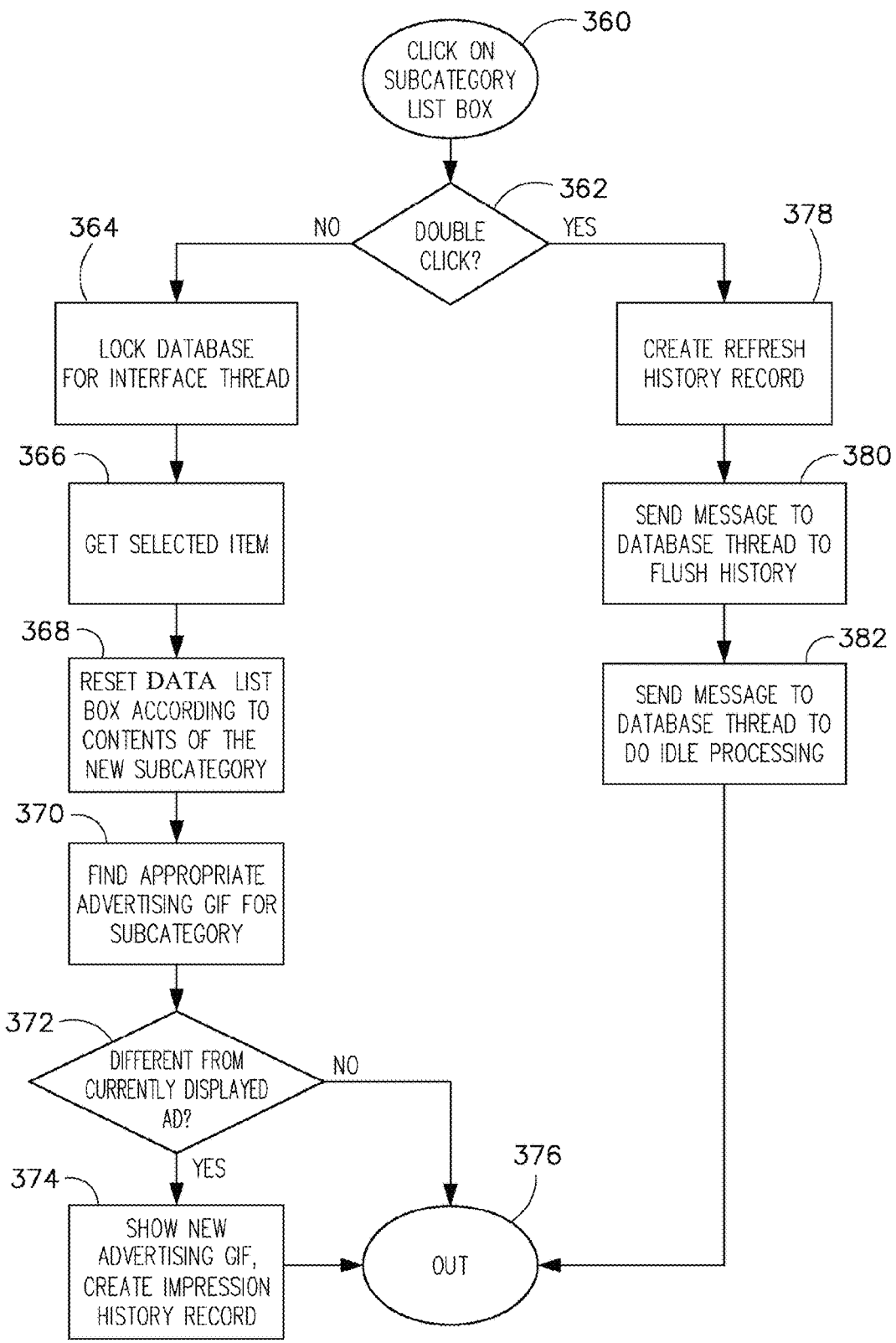
FIG. 15 is a simplified flowchart diagram view showing the steps executed by the client system when a user selects an item from LBCP-PS-UBL-SN-ET-CCS information and/or data subcategory list, according to an exemplary embodiment.

FIG. 15 illustrates a response taken by client application software 28 when a user "ad click impressions" on and/or otherwise selects an item appearing in LBCP-PS-UBL-SN-ET-CCS information subcategory list 68. Step 360 marks the beginning of the process. Step 360 is entered when client application software 28, (via the OS) determines that an item in LBCP-PS-UBL-SN-ET-CCS information subcategory list 68 has been "clicked" on. In step 362, client application software 28 determines whether the selection was a "click" and/or a "double-click." Depending on which of these events occurred, client application software 28 can take alternative courses of action. If the action is a single-click, then the method branches to step 364.

In step 364, the local LBCP-PS-UBL-SN-ET-CCS information database is locked by client application software 28. The process proceeds to step 366. In step 366, the selected subcategory item is retrieved from the local database on client system 14. In step 368, the content of LBCP-PS-UBL-SN-ET-CCS information list 70 is reset by client application software 28 according to the content of the new subcategory. For example, if the new subcategory pertains to LBCP-PS-UBL-SN-ET-CCS information, then the new LBCP-PS-UBL-SN-ET-CCS information associated with the new selected subcategory is displayed in LBCP-PS-UBL-SN-ET-CCS information list 70. In step 370, client application software 28 determines and/or otherwise selects an advertising impression to be displayed in advertising pane 72 in accordance with a predetermined advertising impression selection strategy. In the illustrated embodiment, the selection criteria include the identity of the selected LBCP-PS-UBL-SN-ET-CCS information subcategory. In step 372, a test is performed by client application software 28 to determine whether the newly selected advertising impression is different from the advertising impression currently being displayed. If the answer is "YES," then the process branches to step 374, where the new advertising impression is displayed in advertising pane 72, and/or an advertising impression history record is created for inclusion in the user history data 34. The method proceeds to step 376.

If the answer to step 372 is "NO," however, then the process branches to step 376, which is an exit step. If the action evaluated in step 362 is determined to be a "double click," then the process branches to step 378. "Double clicking" LBCP-PS-UBL-SN-ET-CCS information subcategory is a user request to refresh the content of that subcategory. In step 378, client application software 28 creates a refresh history event for that subcategory. In step 380, client application software 28 sends to the database thread a request to flush the current history. The content of that subcategory are then downloaded, (available on display device 40) as if they were new. In step 382, a message is sent to the database thread to do idle processing.

Figure 16A:
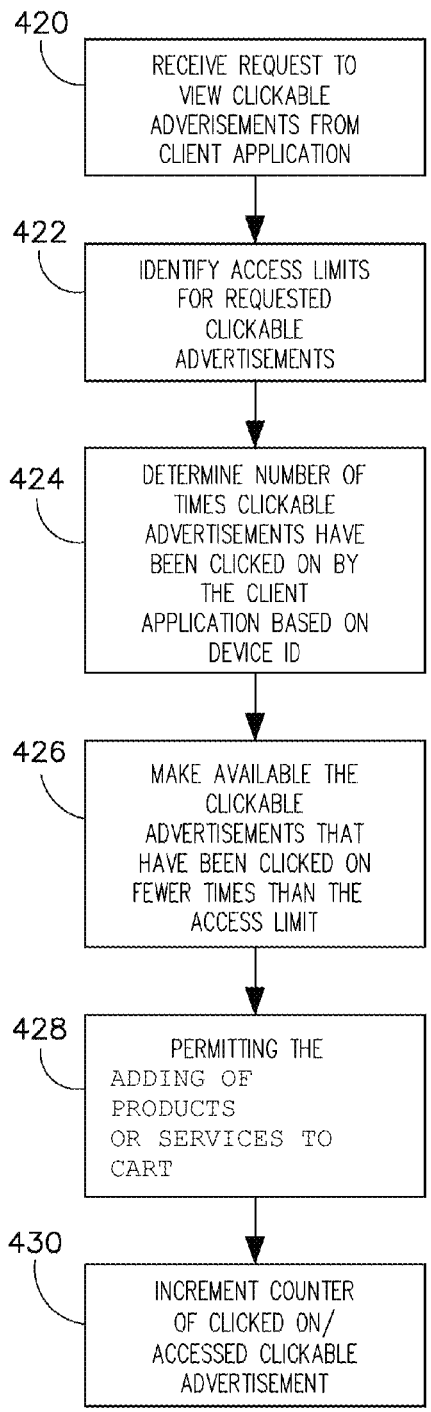
FIGS. 16A/B are flow diagrams of processes for controlling the number of clicks to a clickable advertisement or online coupon, according to exemplary embodiments.

FIGS. 16A and/or 16B are flow diagrams of processes for controlling the number of ad click impressions to a clickable advertisement. As shown in FIG. 16A, in step 420, a request is received from client application software 28 of a particular client system 14 to view clickable geo-targeted or geo-tagged advertisements or geospatial advertisements or mobile geo-tagged Internet posted promotions or offers and/or location-based promotions, location-based coupons, promotions, social messaging, or offers in connection with online or mobile ads, mobile messages, mobile coupons, mobile promotions, mobile offers feed. The request preferably includes Device ID data 30, which is a unique identifier assigned to the client system 14 that uniquely identifies client system 14 making the request. The request can be made in response to linking and/or accessing a particular website and/or by submitting the request through user interface 62.

In step 422, an access limit is identified for each of the clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed that are responsive to the received request. Based on the received request, main server system 12 can identify an appropriate handler 22 and/or database server 24 for servicing the request. Handler 22 accesses database server 24, which can includes a list of available clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed to identify the clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed, (including LBCP-PS-UBL-SN-ET-CCS information) responsive to the request and/or to identify the access limits associated with those clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed.

In step 424, for each of the clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed responsive to the request, it is determined how many times each clickable advertisement has been clicked on by client application software 28 and/or client system 14 based on the associated Device ID data 30. This information can be determined by checking the values of the counters held in database server 24 for each clickable advertisement corresponding to Device ID data 30 provided in the request.

In step 426, clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed are made available to the requesting client system 14 that have been accessed, (i.e., clicked on) by client system 14 fewer times than the access limit. To determine if a clickable advertisement should be made available, main server system 12 compares the identified access limit to the determined number of accesses set in the corresponding counter. If the access limit is greater than the determined number of accesses set in the corresponding counter, then the clickable advertisement is made available to the requesting client system 14. On the other hand/or if the access limit is equal to, (or less than) the determined number of accesses set in the corresponding counter, then the clickable advertisement is not made available to the requesting client system 14. The clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed made available to the client system 14 can be viewed, for example, in advertising pane 72 and/or logo pane 74. Each of the clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed made available to client system 14 can be accessed, i.e., clicked on, by the user at client system 14.

In step 428, in addition to making the clickable advertisement available to be clicked on by the user at client system 14, if the clickable advertisement is LBCP-PS-UBL-SN-ET-CCS information, then the user is permitted to print LBCP-PS-UBL-SN-ET-CCS information as well. To print LBCP-PS-UBL-SN-ET-CCS information, the user can select the "Print Now" button 80, which prints the LBCP-PS-UBL-SN-ET-CCS information currently being viewed on printer 46.

In step 430, in response to the click of the clickable advertisement, the counter associated with that clickable advertisement and/or corresponding to Device ID data 30 of client application software 28 and/or client system 14 is incremented. More specifically, client application software 28 can generate a signal to main server system 12 indicating that the clickable advertisement has been clicked on, and/or based on that signal the server increments the applicable counter in database server 24. The signal can include information identifying the clickable advertisement, as well as Device ID data 30 of client system 14. Accordingly, each time a clickable advertisement is clicked on, the counter associated with the clickable advertisement is incremented, and/or once the count in the counter reaches the access limit, the user at that client system 14 is no longer permitted to click on that clickable advertisement. It should be noted that client system 14 can be a client computer.

The method for controlling access to advertisement in a network can include assigning a unique identifier to a client computer and/or receiving a request from client application software 28 operating on the client computer to access the advertisement. The request can include the identifier assigned to the client computer. The method can further include transmitting an advertisement access report to a remote server. The method can further include the identifier being assigned to the client computer by the client application. The method can also include that the identifier being assigned to the client computer is not one of a Device ID data 30 and/or an Internet protocol address.

Figure 16B:
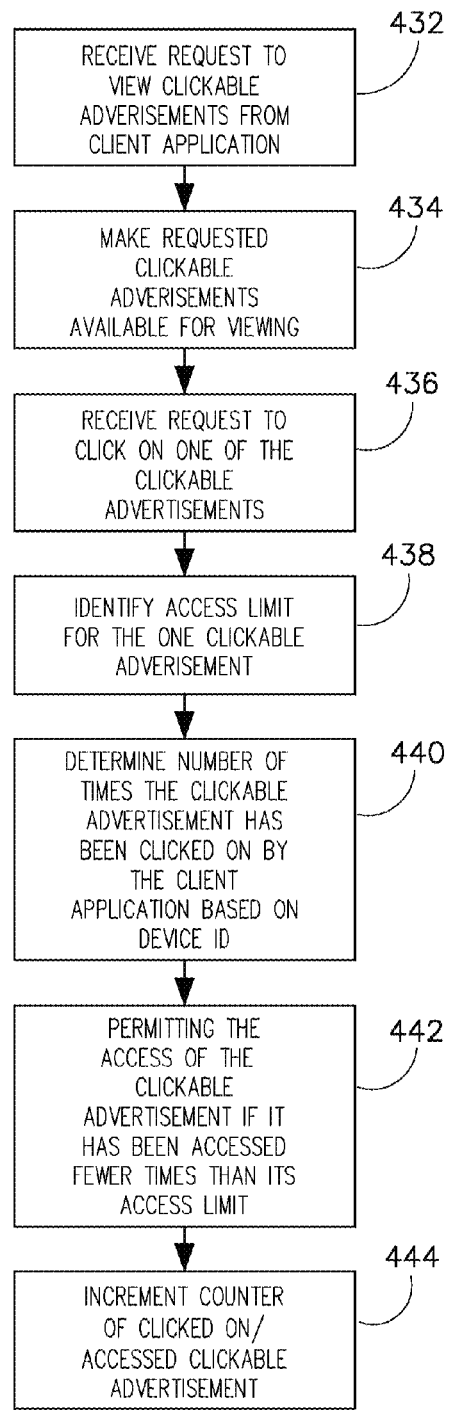

FIG. 16B illustrates a process similar to the one in FIG. 16A. Like the process of FIG. 16A, in step 432 of FIG. 16B, a request is received from the client application software 28 to view clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed at the request including Device ID data 30 that uniquely identifies client system 14 making the request. However, instead of checking the access limit of responsive clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed, all clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed that are responsive to the request are made available to the requesting client system 14 in step 434. To determine which clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed are responsive, main server system 12 can identify an appropriate handler 22 and/or database server 24 for servicing the request. Handler 22 can access database server 24 to identify the clickable geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed responsive to the request. The user at client system 14 can try to click on any of the clickable advertisement made available to client system 14.

In step 436, in response to clicking on a selected clickable advertisement, a request is received by main server system 12 for access to that clickable advertisement. The request can include information identifying the selected clickable advertisement, as well as Device ID data 30 of the requesting client system 14. In step 438, in response to the received request, an access limit is identified for the selected clickable advertisement. More particularly, main server system 12 can identify an appropriate handler 22 to access database server 24 and/or identify the access limits associated with the selected clickable advertisement. In step 440, it is determined how many times the selected clickable advertisement has been clicked on by client application software 28 and/or client system 14 based on the associated Device ID data 30. This information can be determined by checking the values of the counter held in database server 24 for the selected clickable advertisement corresponding to Device ID data 30 provided in the request.

In step 442, the user is permitted to click on and/or access the selected clickable advertisement if it is determined that the clickable advertisement has been accessed by client system 14 fewer times than the access limit. To determine if a clickable advertisement should be made available, main server system 12 compares the identified access limit to the determined number of accesses, (i.e., ad click) set in the corresponding counter. If the access limit is greater than the determined number of accesses set in the corresponding counter, then the user is permitted to click on and/or access the clickable advertisement at the requesting client system 14. On the other hand/or if the access limit is equal to, (or less than) the determined number of accesses set in the corresponding counter, then the user is not permitted to click on and/or access the clickable advertisement at client system 14. If permitted to click on and/or access the clickable advertisement, and/or the clickable advertisement is LBCP-PS-UBL-SN-ET-CCS information, then the user can print or add to a cart the LBCP-PS-UBL-SN-ET-CCS information, for example, by selecting the "Print Now" button 80, which prints the LBCP-PS-UBL-SN-ET-CCS information currently being viewed on printer 46.

In step 444, in response to the click of a clickable advertisement, the counter associated with that clickable advertisement and/or corresponding to Device ID data 30 of client application software 28 and/or client system 14 is incremented. More specifically, client application software 28 can generate a signal to main server system 12 indicating that the accessed clickable advertisement has been clicked on, and/or based on that signal main server system 12 increments the applicable counter in database server 24. The signal can include information identifying the clickable advertisement, as well as Device ID data 30 of client system 14.

Figure 17:
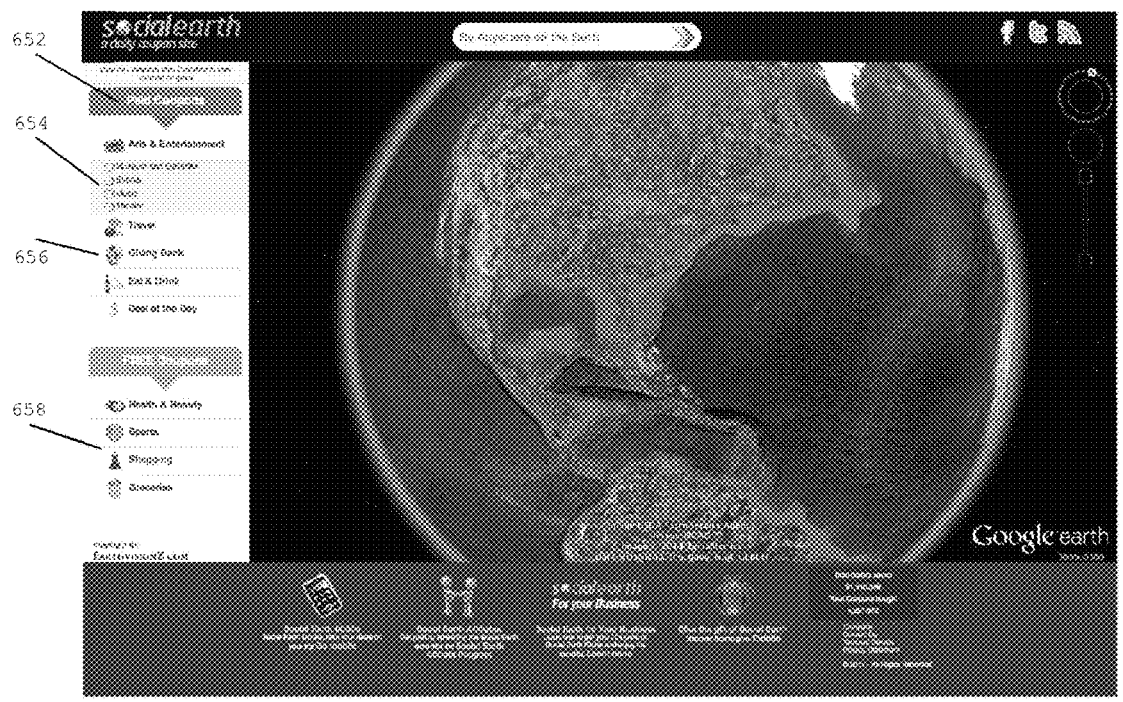
FIG. 17 illustrates a screen display defining an interface associated with a client system portion, according to an exemplary embodiment.

Referring to FIG. 17, illustrations of a screen display defining an interface associated with a client system portion are shown, according to exemplary embodiments, e.g., as Social Earth. FIG. 17 provides the added feature of being able to utilize a pull down menus 652, 654, 656, and/or 658 to retrieve LBCP-PS-UBL-SN-ET-CCS information data. It is to be understood that the above description is merely exemplary rather than limiting in nature, the disclosure being limited only by the appended claims. Various modifications and/or changes can be made thereto by one of ordinary skill in the art, which embody the principles of the disclosure and/or fall within the spirit and/or scope thereof. For example, one and/or more steps described herein as being performed by client system 14 and/or main server system 12 can be performed by the other of client system 14 and/or main server system 12, and/or by both.

For example, a thin client can be operable on client system 14 to interface with main server system 12. A thin client is a client computer and/or client software in client-server architecture networks, which depends primarily on the central server for processing online activities, notifications, online and/or mobile communications, spatial, social or when a user can provide or send messages, coupons, clickable advertisements, and/or mobile advertisements related to a location to other users via their mobile devices to their friends, family, business associates, or others, interactions or purchases made by friends or peers, user's behavior data, and/or mainly focuses on conveying input and/or output between the user and/or the remote-server. In contrast, a thick and/or fat client does as much processing as possible and/or passes only data for communications and/or storage to the server. Many thin client devices run only web browsers and/or remote virtual desktop, virtual keyboards or keypads, a screen or a touchless screen software, meaning that all significant processing occurs on the server.

A Geographic Information System, (GIS), (Also Called Geographic Mapping and/or "GM") is a computer technology that provides an analytical framework for managing and/or integrating data, solving problems, and/or understanding past, present, and/or future situations. A GIS can link information and/or attributes to location data, sharing links or updates, communications, syncs and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device and/or encryption with cloud computing (hereinafter referred to as a "feature"), for example, people to addresses, buildings to parcels, and/or streets within a network. GIS and/or GM can further layer such information to present a better and/or clearer understanding of how many different variables interrelate and/or work together. Layers can be in the form of colored and/or textured overlays, graphics, icons, graphs, and/or other visual indicators of data in context with a geographic location associated with the data. GIS and/or geospatial technologies are used in the present invention in all fields such as, but not limited to, business and/or multimedia marketing, emergency management, environmental planning, geo-intelligence and/or security, risk assessment, urban planning and/or utilities management, as well as industries such as telecommunications of data and/or file sharing, including videos and/or IP-based social messaging, utilities, transportation, education related and/or services and/or scientific research constitute some of the largest user/consumers of this technology, and/or through its application in numerous daily tasks, as well as logistics companies using it to plan optimal delivery routes, insurance industry to assess risk and/or vulnerability with geospatial data, the retail sector to understand/or its customer base to provide more efficient services, while in the communications realm, location-specific applications such as Foursquare™, Microsoft™ GeoLife™ and/or Google Buzz™ on cell phones or social media websites help diffuse this technology to the general public. The invention also includes future growth in the geospatial technologies industry including building capacity and/or developing broad citizen access to the technology, constructing innovative value-added applications to help businesses make informed decisions, capturing and/or sharing reliable geospatial data, and/or training a capable work force, as well as the Internet and/or advances in information and/or communications technologies also can be included in its expansion. The invention also can include the purchase and/or use of place-based GIS-generated products without necessarily being familiar with the technology itself, such the use of GPS or Internet-based maps to locate a particular business outlet, while user access and/or awareness can stimulate a greater demand/or for new applications of this technology, which can fuel innovation, and/or a domino effect can help the industry expand/or into new markets. User access to geospatial technologies and/or data are slowly revolutionizing how we view the world. GIS has restored the importance of understanding people place, interactions or browsing the content of a social network or mobile network or other application in an array of online activities, notifications, online and/or mobile communications, spatial, social or when a user can provide or send messages, coupons, clickable advertisements, and/or mobile advertisements related to a location to other users via their mobile devices to their friends, family, business associates, or others, integrations or purchases made by friends or peers, user's behavior data, decision-making processes. With such value and/or possibility, leaders and/or users or members of this technology should promote its application as broadly as possible.

A GIS and/or GM is most often associated with maps formed within a framework of a common coordinate-system, such as the World Geodetic System 1984, (WGS84) Reference locations within the framework can be specified by and/or translated to and/or from locations defined within a common coordinate system, so as to allow integration of disparate data and/or functionality with a geospatial browser. A map, however, is only one way a user can work with geographic data in a GIS and/or GM and/or is only one type of output generated by a GIS and/or GM. Furthermore, a GIS and/or GM can provide many more problem-solving capabilities than using a simple mapping program and/or adding data to an online mapping tool, (e.g., in a "mash-up")

Generally, a GIS and/or GM can be viewed in at least three ways, (1) as a database; (2) as a map; and/or, (3) as a model. As a database, a GIS provides a unique kind of database relating to the Earth and/or other mapped region, such as a geographic database and/or geo-database. Fundamentally, a GM is based on a structured database that describes the mapped region in geographic terms. GM maps can be either two and/or three-dimensional images in presentation. GM maps are generally constructed of "tiles" that are unit areas of a geographic region. Tiles can be identified in the database by coordinate boundaries and/or individual reference identifications allocated to each tile. The number of tiles covering a particular geographic region can vary depending upon the resolution of the map requested; a high-resolution map, (e.g., 1 m) of a geographic area can have substantially more tiles than a lower resolution map of the same area. Maps combining the underlying geographic information with overlays of associated data can be constructed and/or used as "windows into the database" to support queries, analysis, and/or editing of the information in a process called "geo-visualization." As a model, a GM is a set of information transformation and/or "geo-processing" tools that derive new geographic data from existing data. This geo-processing functionality can take information from existing data, apply analytic functions, and/or write results into new derived data that show features and/or feature relationships with the mapped region and/or present the results to a user.

A GM allows mapping of locations and/or things and/or identification of places with requested features. GIS mapping can provide information about individual feature and/or present a distribution of features on a map to identify patterns. GM and/or GIS mapping can be based upon and/or filtered by quantities, for example, locations of most and/or least of a feature. GM and/or GIS mapping can also find and/or establish relationships between places, features, conditions, and/or events and/or determine where certain criteria are met and/or not met. GM and/or GIS mapping can also present densities to view concentrations. A density map allows measurement of a number of features using a uniform area unit, such as acres and/or square miles, to clearly present the distribution. This functionality provides an additional level of information beyond simply mapping the locations of features.

GM and/or GIS can be used to map changes to anticipate future needs. GM and/or GIS mapping can also be used to map conditions before and/or after an action and/or event to see the impact. For example, a retail analyst might map the change in store sales before and/or after a regional ad campaign to see where the ads were most effective.

Figure 18:
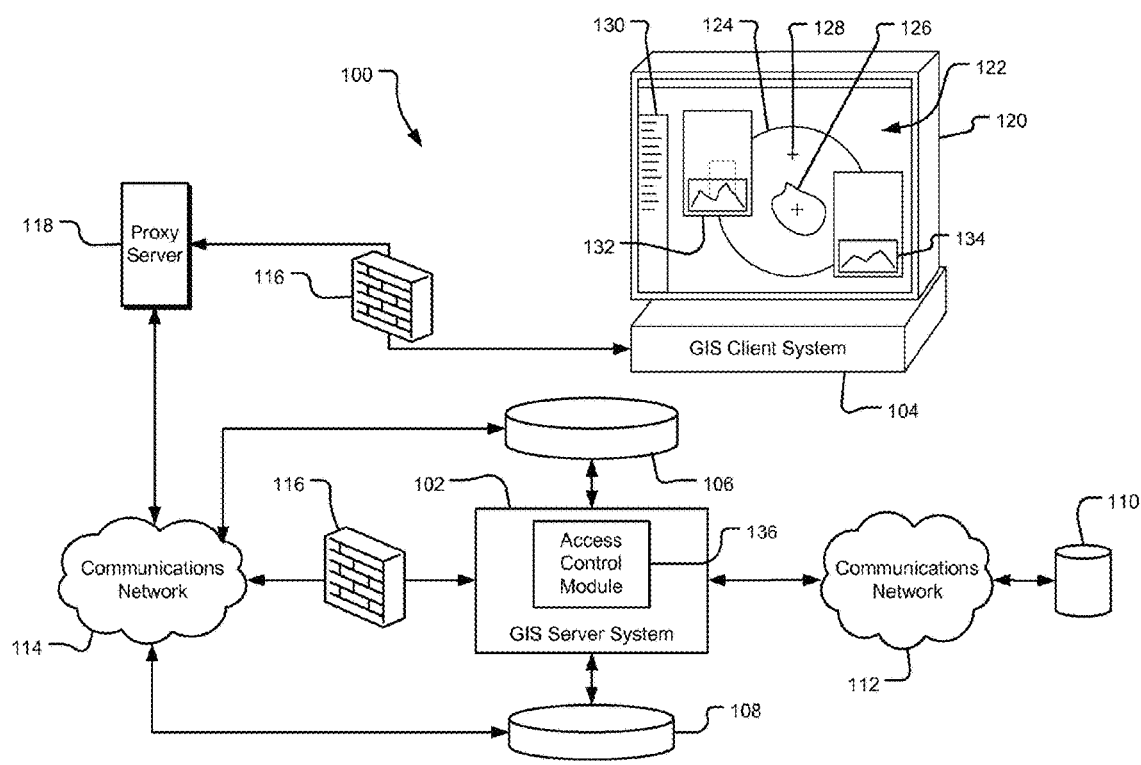
FIG. 18 is a schematic diagram of an exemplary implementation of a geospatial decision management system for implementing a geographic information system over a network.

A GM and/or GIS can be implemented in a geospatial decision management system, (GDMS) 100, shown in FIG. 18 to provide the geo-processing power and/or infrastructure to process the data and/or render geo-visualizations of the data in a user interface. The GDMS 100 of FIG. 18 can be implemented in a combination of collecting, mining, processing and/or storing social media, mobile and/or cloud data transmitted in the cloud service providers, servers, social networks or mobile networks including a server computer system 102, one and/or more client computer systems 104, and/or various data sources 106, 108, and/or 110. GDMS data can be saved in the GDMS server system 102 and/or in a datastore 106, 108, and/or 110 at a local and/or remote location. The data sources 106 and/or 108 are depicted as local to the server system 102, whereas the data source 110 is depicted as coupled remotely to the server system 102 via a communications network 112. GDMS data can also be cached in a proxy server.

The client system 104 can be coupled remotely to the server system 102 via a communication network 114, (or alternatively, the same communications network 112), although a local connection between the client system 104 and/or the server system 102 can be employed. It should be understood that multiple client systems can be coupled with the server system 102 concurrently. It should also be understood that the client system 104 and/or server system 102 can be implemented in an integrated system. The network connection 114, such as an Internet connection, can be used by GDMS client systems 104 to access the data, (e.g., data defining layers and/or providing financial information, chemical concentrations, test results, project state reports, etc.) at the remote data sources 106, 108, 110, directly and/or through an intermediate computing system, (e.g., a proxy server and/or GDMS server)

The client computer 104 can be coupled to an intermediate server, such as a proxy server 118. The proxy server 118 can be positioned between the client computer 104 and/or the server system 102. The proxy server 118 intercepts all requests to the server system 102 to see if it can fulfill the requests itself with cached data from prior requests. If not, the proxy server 118 forwards the request to the server system 102 to be fulfilled. The proxy server 204 can also be coupled to the communications network 114 and/or accessed by the client computer 104 and/or the server system 102 via the network 114. Firewalls 116 can also be implemented between the server system 102 and/or the client computer 104 and/or the network 114 for an added layer of security.

The connection can be established as a secure connection between the client system 104 and/or the server 102 and/or the remote data sources 106, 108 and/or 110. The secure connection can be accomplished by a variety of different methods including, but not limited to, authentication protocols codes and/or passwords, secure user management tools, firewalls, user authentication protocols, secure user management tools, user pathway mapping and/or encryption, etc. In another example, the server system 102 can include an administrative website that can allow authorized users or members to manipulate and/or assign user rights, (e.g., an administrative tier) The server system 102 can also include a security feature, for example, an access control module 136 to establish, control, and/or monitor access by client computers 104 to certain data stored within and/or accessible within the GDMS 100. Access control can be governed by an administrator and/or it can be an automated function of the access control module 136 based upon attributes of the data requested and/or permissions held by the user as further described below.

The server system 102 can represent one and/or more hardware and/or software servers providing multiple server functions. In addition, one and/or more of the server system 102, the client system 104, and/or the databases 106, 108 and/or 110 can form an N-tier system. The server system 102 can also include a web server application subsystem, whereby world wide web-enabled applications can provide various aspects of functionality of the GDMS 100. For example, the server system 102 can provide a website where content creators and/or generators can upload geospatially-related data that can be transformed into features referenced to locations within a map of the GDMS 100 for access through the client system 104 connected to the GDMS 100 for geo-visualization of the information. In an alternative implementation, the client system 104 can be implemented as a "thick" client and/or execute client installed software for some and/or all of the functionality of the GDMS 100.

A monitor 120, coupled to the client system 104, presents a GDMS interface 122 constructed from data and/or functionality received through the server system 102. When a user is working within a GDMS 100, s/he is said to be in a GDMS session. The GDMS interface 122 can be generated by a GDMS application executing on the client system 104 and/or alternatively through a server-executed GDMS application that provides the interface components over the network to a dumb terminal and/or a browser application running on the client system 104. The GDMS interface 122 can be a geospatial browser window including a map 124, (e.g., a globe in this illustration), a geo-visualization of data as a layer 126 and/or individual features 128 on the map 124, a layer manager 130 for selecting data and/or other features from the databases 106, 108, 110. The GDMS view can also include tool palettes 132 and/or 134, which can be distinct features of the browser interface browser plug-ins, and/or separate utilities and/or applications.

In one implementation, the GDMS interface 122 can be in the form of a geospatial browser window and/or one and/or more geospatially-referenced tools. Access to the data and/or functionality is provided by geospatially-referenced tools, (e.g., tool palettes 132 and/or 134) that are associated with and/or triggered in relation to a specific location in a common coordinate system, (e.g., WGS84 and/or some other shared coordinate system) shared by the tools and/or the geospatial browser. For example, a tool can provide chemical analysis results pertaining to soil samples taken from the location over time. In another example, a tool can retrieve and/or analyze financial data pertaining to a construction project on a specified region the map, (e.g., a location) The data available to such tools is provided from a variety of data sources and/or associated with each location within the common coordinate system of the GDMS system 100, such as through specified coordinates, (e.g., longitude and/or latitude), other geographic constraints, and/or organizational constraints, (e.g., a project identifier of a project having a specific geographic location/or constraint, a feature identifier of a feature having a specific geographic location/or constraint, etc.) In this manner, the user can view a location through the geospatial browser and/or access data and/or functionality associated with a location or a map or a social message that is accessible through the tools in the browser. These locations can be the same geographic location/or distinct locations.

Figure 19:
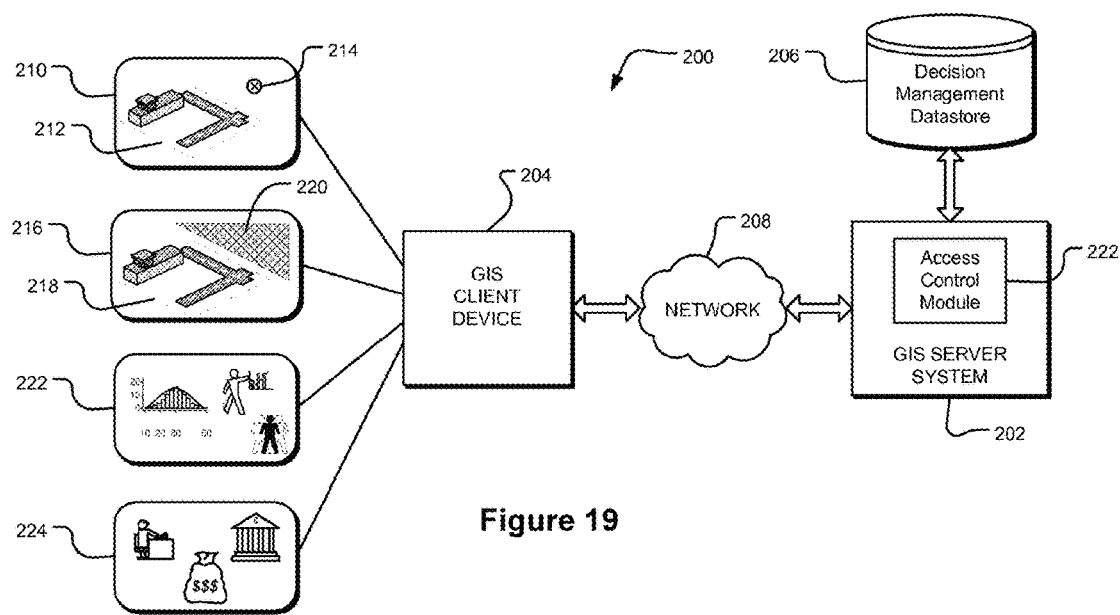
FIG. 19 is a schematic diagram of a geospatial decision management system depicting exemplary implementations of technical and/or management interface tools available to a client user.

FIG. 19 further illustrates an example of a GDMS 200 for accessing specific data and/or information within a database based on the association of the information with geospatial coordinates. Again, the GDMS 200 can be implemented by a GM and/or GIS server system 202 in communication with a GM and/or GIS client computer 204 over a communication network 208, e.g., the Internet. The GM and/or GIS client computer 204 can be used access information and/or real-time data a decision management datastore, (DMD) 206 connected with the GM and/or GIS server system 202. The communication network 208 ideally provides the GM and/or GIS client computer 204 with high-speed access to indexed data on the DMD 206.

The GM and/or GIS server system 202 can also include a security feature, for example, an access control module 222 to establish, control, and/or monitor access by GM and/or GIS client computers 204 to certain data stored within and/or accessible via the DMD 206. Access control can be governed by an administrator and/or it can be an automated function based upon attributes of the data requested and/or permissions held by the user as further described below The data retrieved from the DMD 206 can be presented in a user interface 210, 216, 222, and/or 224, (of which four exemplary configurations are presented in FIG. 19 at the GM and/or GIS client computer 204. A feature presented in the user interface 210, (e.g., a geospatial coordinate and/or geographic location) on the client computer 204 can be used access information and/or real-time datadexed by features using the DMD 206.

The GM and/or GIS client computer 204 can access the indexed data in the DMD 206 by using applications and/or plug-ins, such as technical interface 210, 216 and/or management interface 222, 224. The technical interface 210, 216 can be used to access technical data associated with particular features. In exemplary implementations such technical data might be biochemical, geochemical, hydro-geological, and/or other physical data on analytes. The management interface 118, 120 can be used to access business management data. In exemplary implementations such management data might be business and/or organizational documents and/or data associated with particular features. Several examples of the use of such tools to interface with the DMD 206 and/or extract the data are presented below.

As shown in the first technical interface 210 in FIG. 19, if the GM and/or GIS client computer 204 requests information about a particular feature, such as a ground water well located near an airport 212, the GM and/or GIS client computer 204 can select the feature 214, i.e., the ground water well, to receive information related to that feature 214. The first technical interface 210 can include a concentric area data tool that can provide technical data related to the ground water well feature 214, for example, latitude and/or longitude, physical inspection data, water level information, and/or water contamination information, in a the form of information windows and/or visual geographic information overlays on a base location map. In an alternate implementation shown in the second technical interface 216, technical data concerning an area of land/or 220 around, adjacent, and/or near the airport 218 at the location of the feature 214, for example, landscaping, slope, soil composition, and/or grading information can be presented.

In a further implementation shown in a first management interface 222, a contract management concentric data tool can provide management data based upon the selected feature 214, for example, information construction and/or work in progress, zoning and/or easement information, and/or information any contracts applicable to the feature 214. In a further implementation shown in a second management interface 224, a finance management concentric data tool 120 can also provide management data relating to financial information applying to the feature 214 selected, for example, costs of past repairs and/or current maintenance fees. In some implementations the management interface 222, 224 can further comprise a real time link to a video camera providing a view of the selected feature 214 and/or any construction and/or activity occurring at the selected feature 214.

Figure 20:
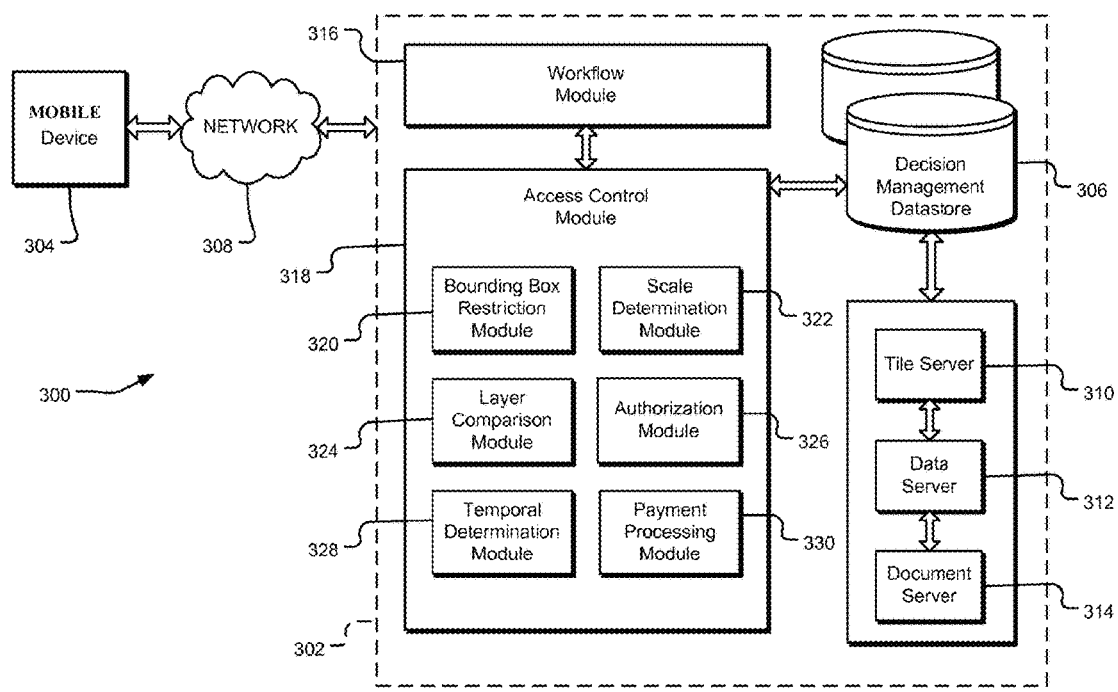
FIG. 20 is a schematic diagram of additional components of a geospatial decision management system for implementing access control to presentation of geospatial attributes within a network.

The GDMS shown in FIG. 20 is an innovative, GM and/or GIS-based management decision support tool that optimizes the geo-processing and/or geo-visualization of available GM and/or GIS data, for example, natural resources, building resources, time-management resources, personnel resources, financial resources, and/or information resources, and/or others. The GDMS can enable a GM and/or GIS client to easily visualize and/or interpret large, multifaceted, and/or complex information sets in order to make comparative analyses of alternatives, identify potential liabilities and/or opportunities, and/or optimize program strategies.

The GDMS provides full convergence, and/or integration, of multiple, (essentially limitless) disparate data within a single virtual three-dimensional, (geospatial) model. The disparate data, and/or even sub-data within them, can be organized by association with relevant features on the model. For example, groundwater analytical data can be associated with a given groundwater well; building data can be associated with a given building; installation information can be associated with the installation; and/or command/or information can be associated with the command. The GDMS full data convergence allows data to be accessed relative to position, scale, resolution, time, and/or other geospatial attributes and/or serves as an extremely intuitive and/or efficient way to organize and/or access essentially limitless quantities of information.

The GDMS allows-queries, filters, and/or comparisons of data to be completed at the GM and/or GIS server system and/or then visually represented in three dimensions in near real time at the GM and/or GIS client device. The three-dimensional representation of data helps users or members gain a better understanding of the meaning contained within the data more rapidly than using traditional tabular and/or two-dimensional representations of data. The GDMS thus allows the meaning represented in the three-dimensional data to be rapidly communicated to users or members.

The GDMS improves on traditional closed and/or organization-specific GM and/or GIS by affording live connections or channels or platforms to multiple databases. As the databases are updated, the representations afforded by GDMS can thus be current. This allows a fourth dimension, time, to be factored into resource management decisions. Time is an important additional data factor because previous "ad view" of the data can be compared to current "ad view" of the data, in order to gain an understanding of the rates of change, (or dynamics) of the real system. In other words, the GDMS allows for differences between time states to be understood and/or factored into a decision process.

In FIG. 18 a GDMS 100 can be used to provide access to specific sections within documents, which are associated with a particular geographic coordinate, e.g., User/consumer, wherein a user can provide or send messages, coupons, clickable advertisements, and/or mobile advertisements related to a location to other users via their mobile devices to their friends, family, business associates, or others, Retail, Media & Entertainment, Business, Government, Sports, or Education related and/or Services Online or mobile coupons and/or promotions, social messaging, or offers for Products, Goods, Gambling, Auctions, Real Estate, Shopping, Sports, Travel & Hospitality, Social Gaming, Autos & Vehicles, Pets & Animals, Online Communities, Education related and/or Services in cloud type configuration and/or using cloud services with/Geospatial Mapping/Web Mapping/2D Mapping/3D Mapping/GPS/Location Mapping/Social Mapping/Digital Mapping/3D Holographic Projection/3D Holographic Mapping/Geographic Mapping/User Behavior Mapping/Mobile Mapping with Encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud security between communication interface devices accessing data in the cloud Computing/Local Information or Global/and/or/Social Networking/Impressions/Location Data/Communities, (PSR-GM-C/L-SN) information. More specifically, a GDMS 100 user, (or GM and/or GIS client) can select a specific geographic-location/or 'feature' on a map and/or be directed to advertising search impressions for location-based promotions, location-based offers, location-based coupons, promotions, social messaging, or offers for Products, Goods, Gambling, Auctions, Real Estate, Shopping, Sports, Travel & Hospitality, Social Gaming, Auto & Vehicles, Pets & Animals, Online Communities, Education related and/or Services in cloud-type configuration and/or using cloud services with/Geospatial Mapping/Web Mapping/2D Mapping/3D Mapping/GPS/Location Mapping/Social Mapping/Digital Mapping/3D Holographic Projection/3D Holographic Mapping/Geographic Mapping/User Behavior Mapping/Mobile Mapping with Encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud security between communication interface devices accessing data in the cloud Computing/Local Information or Global/and/or/Social Networking/Impressions/Location Data/Communities, (PSR-GM-C/L&SC-SN) information. Said another way, specific relevant data can be provided to a user based upon the 'feature' selected, not just based upon a traditional search query. Thus, GDMS 100 links and/or ties a 'feature,' and/or specific geographic location to an indexed database of data. The specific relevant data provided to a user can comprise only portions and/or sections of documents, maps, and/or images related to that specific 'feature' selected. This can greatly increase efficiency of GM and/or GIS by taking a user directly to a relevant section of a document, which can be hundreds and/or thousands of pages in length.

As should be apparent from the above discussion, the GDMS is a powerful tool that can be used to access enormous quantities of data stored at remote locations. When using the GDMS, control access to data stored at remote locations, for example, an access control module 222 as depicted in FIG. 19 can be implemented. An administrator of the data stored at the remote location to have server side control over varying levels of access to data. Thus, in some implementations, access control can be exercised on the server-side; however, in other implementations this level of access control can be exercised on the client side. Further, access control can also be exercised at/by a given database. It can also be desirable to have different levels of authorization to control data access for employees having different roles within an organization. These levels of authorization can be created and/or adjusted by an administrator to permit varying levels of access to the data.

The GDMS can specifically establish different levels of access to the data can be controlled for each individual and/or can be controlled in groups, (e.g., hierarchically) by the administrator and/or can be created and/or maintained using operations implemented within the access control module 222.

The varying levels of accessibility to data can be controlled using a number of different methods including, but not limited to, authentication protocols codes and/or passwords, secure user management tools, firewalls, user authentication protocols, user pathway mapping, and/or encryption. The levels of access control to the data can also be controlled by the creation of an individual profile for each user identifying the user's role in the organization and/or specifying their level of access to the data. Then, when a user logs onto a system, their level of access to data can be known by the system and/or the user can then only be able to view and/or access data that was commensurate with their level of authorization.

The layers of data can also be saved so that other authorized users or members can access the saved layers to view and/or make additional changes to, (or user comment impressions on) the layers and/or then save those additional changes. This allows a given user to open the selected state, make changes, alterations, and/or user comment impressions, and/or save this new altered state for review and/or potential further modification by others. Certain GDMS view state data and/or functionality can and/or cannot be accessible to and/or be editable by a user based upon access permissions that have been granted to and/or withheld from the user.

In one implementation, access to the different map tiles and/or layers of data can be based upon the scale and/or resolution of the map and/or layer, i.e., access is 'scale-driven.' The contextual and/or 'smart' layers of data can be turned on and/or off by an administrator based upon the authorization to access each layer of data. A user's ability to change and/or alter the layers of data can also be dependent upon their level of authorization.

With reference now to FIG. 20, an exemplary GDMS 300 is implemented in a server system 302 with a DMD 306 as described above. The server system 302 can further include additional data servers, for example, a map tile server 310 indexed by coordinates, reference number, and/or feature; one and/or more layer servers 312 that provide feature and/or layer information also indexed by reference to geospatial coordinates, tile reference number, and/or feature; and/or a document server 314 that can provide online or mobile coupons and/or promotions, social messaging, or offers for Products, Goods, Gambling, Auctions, Shopping, Sports, Autos & Vehicle, Pets & Animals, Online Communication, Education related and/or Services in cloud-type configuration and/or using cloud services with/Geospatial Mapping/Web Mapping/2D Mapping/3D Mapping/GPS/Location Mapping/Social Mapping/Digital Mapping/3D Holographic Projection/3D Holographic Mapping/Geographic Mapping/User-Behavior Mapping/Mobile Mapping with Encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud security between communication interface devices accessing data in the cloud Computing/Local Information or Global/and/or/ Social Networking/Impressions/Location Data/Communities, (PSR-GM-C/L&SC-SN) information, and/or other documents and/or information associated with a geospatial location, (again indexed by coordinate, reference number, and/or feature) in a format not amenable to geo-visualization.

As shown in FIG. 20, the data servers 310, 312, 314 can be connected to the DMD 306 and/or to one another to maximize operating efficiency of the datastore 306. In some implementations, the data servers 310, 312, 314 and/or the datastore 306 can be located within the same server system 302, while in other implementations, the data servers 310, 312, 314 and/or the datastore 306 can be distributed cross a network.

The server system 302 can further comprise a workflow module 316 and/or an access control module 318 through one and/or a number of different types of software programs, (i.e., programming logic and/or computer executable instructions) utilizing a variety of different types of measures to control access to the DMD 306. The workflow-module 316 and/or the access control module 318 can be positioned between the client computer 304 and/or the DMD 306, as shown in FIG. 20, to provide a layer of access control between the client device 304 and/or the DMD 306 and/or the data servers 310, 312, and/or 314. In other implementations, the access control module 318 and/or workflow module 316 can be partially and/or substantially implemented in other locations, for example, on the client device 304, and/or within the communications network 308.

Alternately, in an implementation of the GDMS 300 in an open and/or public platform, rather than a system internal to and/or controlled by a particular organization, access to data can be controlled based merely upon geospatial attributes, for example, the geospatial location, (coordinates) of a tile request, scale of a tile request, resolution of a tile request, payment for access, the combination of collecting, mining, processing and/or storing social media, mobile and/or cloud data transmitted in the cloud service providers, servers, social networks or mobile networks including layers requested, and/or freshness and/or staleness of data requested. Another example of a geospatial attribute can be the ability to download a geospatial data set as opposed to merely having the ability to view a geo-visualization of such data, e.g., as a layer and/or set of features, e.g., Product, Goods, Gambling, Auctions, Shopping, Sports, Autos & Vehicle, Pets & Animals, Online Communications, Education related and/or Services in cloud type configuration and/or using cloud services with/Geospatial Mapping/Web Mapping/2D Mapping/3D Mapping/GPS/Location Mapping/Social Mapping/Digital Mapping/3D Holographic Projection/3D Holographic Mapping/Geographic Mapping/User Behavior Mapping/Mobile Mapping with Encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud security between communication interface devices accessing data in the cloud Computing/Local Information or Global/and/or/Social Networking/Impressions/Location Data/Communities, (PSR-GM-C/L&SC-SN) information. A further example of a geospatial attribute can be the ability to save and/or bookmarks geo-visualization states defines by various combinations of underlying mar tiles and/or overlying layers and/or features for easily returning to such states as opposed to having to recreate the same filter query to return to a prior state. In such a public platform, contributors of GM and/or GIS data accessible for geo-visualization can place limits and/or restrictions on the availability of and/or accessibility of the GM and/or GIS data. A public implementation of the workflow module 316 can be used as an interface for data sources to either upload data to the DMD 306 and/or otherwise register data with the DMD 306 so that the DMD 306 can locate and/or access the data from a remote server and/or data store managed by the data source.

Another exemplary function of the access control module 318 can be embodied in the temporal determination module 328 that allows and/or denies access to map tiles and/or layers based upon the age of the information comprising the particular data set, e.g. User/consumer, wherein a user can provide or send messages, coupons, clickable advertisements, and/or mobile advertisements related to a location to other users via their mobile devices to their friends, family, business associates, or others, Retail, Media & Entertainment, Business, Government, Sports, or Education related and/or Services online or mobile coupons and/or promotions, social messaging, or offers for Products, Goods, Gambling, Auctions, Real Estate, Shopping, Sports, Travel & Hospitality, Social Gaming, Auto & Vehicles, Pets & Animals, Online Communities, Education related and/or Services in cloud type configuration and/or using cloud services with/Geospatial Mapping/Web Mapping/2D Mapping/3D Mapping/GPS/Location Mapping/Social Mapping/Digital Mapping/3D Holographic Projection/3D Holographic Mapping/Geographic Mapping/User Behavior Mapping/Mobile Mapping with Encryption technologies allowing users to access data, encrypt and/or decrypt data, sync data, secure data storage and/or process data using cloud technology across many different networks and/or fiber optic communications from an endpoint accessed through multiple devices, browsers, operating systems, networks, servers, storage, software, applications or services integrated with cloud security prevent the unauthorized collecting, tracking and/or analysis of a user's personal data, communications data, identification data, location data and/or other information and/or data by a third party using cloud computing analytics for internet or mobile access or system using encryption technologies and/or filters to provide that personal data, communications data, identification data, location data and/or other information and/or data remains secure in the cloud while accessing data via a mobile or wireless device and/or cloud security between communication interface devices accessing data in the cloud Computing/Local Information or Global/and/or/Social Networking/Impressions/Location Data/Communities, (CBGSE-PGGS-GM-C/L&SN) information. In an example, data that is significantly older can develop additional value again for use in temporal studies to identify shopping ad impressions. In such a case, the data can again only be accessible upon payment of a fee for the service. The temporal determination module 328 manages the temporal worth of GM and/or GIS data, for example, by examining time stamps associated with particular GM and/or GIS data and/or comparing the timestamps to any tags that can be encoded with the data indicating that the GM and/or GIS data set is subject to a fee for service within particular ranges of age.

Figure 21:
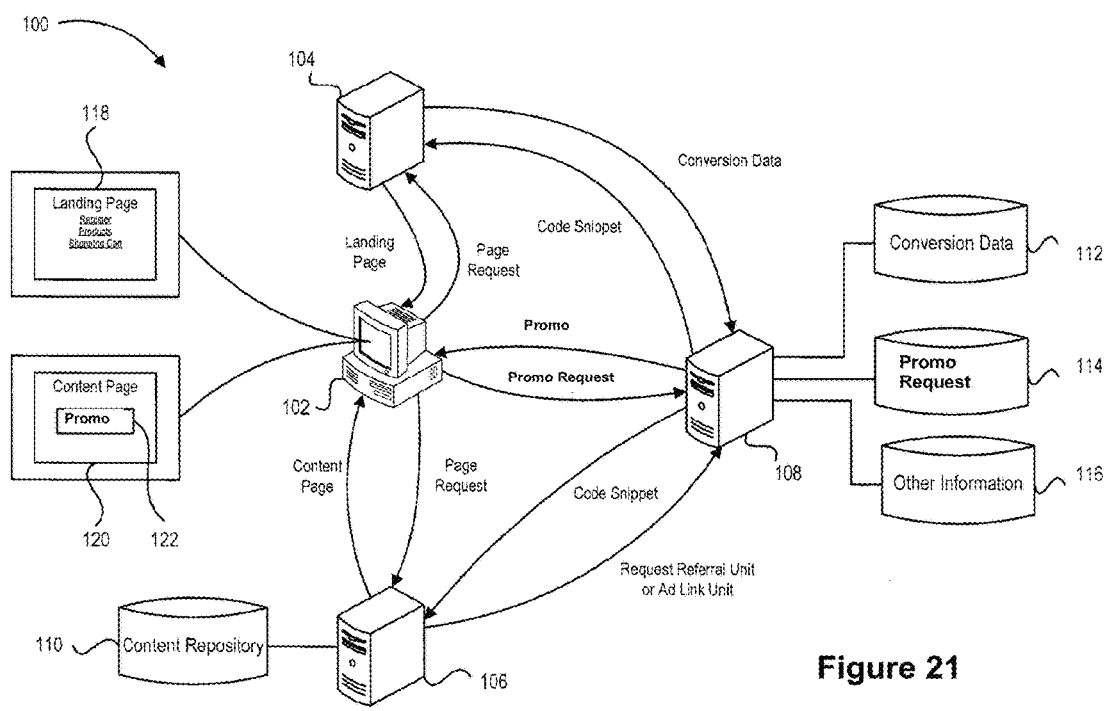
FIG. 21 is a block diagram of an example online system of the present invention.

FIG. 21 is a block diagram of an example online advertising system 100. In some implementations, one or more advertisers and/or publishers 104 can directly, or indirectly, enter, maintain, and/or track advertisement, ("ad") information in an ad management system 108. The ads can be stored in a repository 114 coupled to the system 108, (e.g., a MySQL® database) The ads may be in the form of graphical ads, such as banner ads or graphic color ads, sponsored video ads, digital promotions, social messaging, or offers mobile multimedia marketing and/or advertising for mobile publishers and/or advertisers and/or publishers and/or mobile commerce, mobile operator branded IP messaging services, mobile location data, mobile location-based advertising and/or promotions, ads combining one of more of any of such components, etc. The ads may also include embedded information, such as embedded media, links, metainformation, and/or machine executable instructions. One or more publishers 106 may submit requests for ads or social/geo/promo link promotional data set to the system 108. The system 108 responds by sending ads, social/geo/promo link promotional data set, or information that can allow for the retrieval of ads or social/geo/promo link promotional data set to the requesting publisher 106 for placement/serving one or more of the publisher's web-properties, (e.g., websites and/or other network-distributed content multimedia marketing impressions) The advertising search impressions for location-based promotions, location-based offers, location-based coupons, promotions, social messaging, or offers in connection with online or mobile ads, mobile messages, mobile coupons, mobile promotions, mobile offers feed, position-based services, location-based advertising, mobile location data, mobile location-based advertising and/or promotions, social messaging, or offers and/or multimedia marketing impressions, online coupons and/or location-based deals and/or offers and/or location-based services in real-time via a mobile or wireless device or tablet device or mobile internet device or holographic devices or holographic phone or wireless data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device, (such as a mobile phone networks or wi-fi networks) or tablet PC or computer, online coupons, position-based services, ad links, location-based promotions, location-based offers, location-based coupons, promotions, social messaging, or offers in connection with online or mobile ads, mobile messages, mobile coupons, mobile promotions, mobile offers feed, discount ad impressions, merchant ad impressions, email coupon impressions, location-based advertising, mobile location data, mobile location-based advertising and/or promotions, social messaging, or offers and/or multimedia marketing impressions, in real time, or social/geo/promo link promotional data set can be placed with or embedded in the publisher's content, (e.g., videos, articles, search results), which can be stored in a repository 110 at the publisher 106, and/or placed with content received from other sources, (e.g., other publishers and/or advertisers)

In some implementations, publisher's properties available in this system may also include both Internet-distributed and/or broadcast distributed content such as, but not limited to, television spots, radio spots, print advertising, billboard advertising, (electronic or printed), on-vehicle advertising, and/or the like.

Other entities, such as users or members 102 and/or advertisers and/or publishers 104, can provide usage information to the system 108, such as, for example, whether or not a conversion or click-through related to an ad has occurred. In some implementations, conversion data can be stored in a repository 112, where it can be used by the system 108 to improve ad-targeting performance. The usage information provided to the system 108 can include measured or observed user behavior and/or tracking a user's profile, unique data and/or actions online or via a mobile or wireless device related to ads that have been served. In some implementations, the system 108 performs financial transactions, such as crediting the publishers 106 and/or charging the advertisers and/or publishers 104 based on the usage information.

A computer network, such as a local area network, (LAN), wide area network, (WAN), the Internet, wireless network or any combination thereof, can connect the location-based services, advertisers and/or publishers 104, the system 108, the publishers 106, and/or the users or members 102.

One example of a publisher 106 is a general content server that receives requests for content, (e.g., articles, electronic mail messages, discussion threads, music, video, graphics, networked games, search results, web page listings, information feeds, dynamic web page content, etc.), and/or retrieves the requested content in response to the request. The content server may submit a request, (either directly or indirectly) for advertising search impressions for location-based promotions, location-based offers, location-based coupons, promotions, social messaging, or offers in connection with online or mobile ads, mobile messages, mobile coupons, mobile promotions, mobile offers feed or advertisements or social/geo/promo link promotional data set to an ad server in the system 108. The location-based services or ad request may include a number of ads desired. The social/geo/promo link promotional data set request may include a number of social/geo/promo link promotional data set desired and/or the number of social/geo/promo links per social/geo/promo link promotional data set. The advertising search impressions for location-based promotions, social messaging, or offers or advertisements or social/geo/promo link promotional data set request may also include content request information. This information can include the content itself, (e.g., page or other content document), a category or keyword corresponding to the content or the content request, (e.g., arts, business, computers, arts-movies, arts-music, etc.), part or all of the content request, content age, content type, (e.g., text, graphics, video, audio, mixed media, etc.), geo-location or geo-tagging information, demographic information related to the content, keyword, web property, etc., and/or the like.

In some implementations, the content server, (or a browser rendering content provided by the content server) can combine the requested content with one or more of the advertising search impressions for location-based promotions, location-based offers, location-based coupons, promotions, social messaging, or offers in connection with online or mobile ads, mobile messages, mobile coupons, mobile promotions, mobile offers feed or advertisements, or social/geo/promo link promotional data set provided by the system 108. The combination can happen prior to delivery of the content to the user or contemporaneously where the advertising server can serve the ads or social/geo/promo link promotional data set directly to an end user. The combined content and/or location-based data social networking preferences, online activities, notifications and/or user's behavior data, location data, sharing links or updates, communications, syncs and/or data transfers and/or data management systems for transactional data management and/or analytical data management in the cloud using encryption technologies and/or filters to provide that personal data, communications data, identification data, location data and/or other information and/or data remains secure in the cloud while accessing data via a mobile or wireless device and/or encryption with cloud computing sharing promotions, social messaging, or offers or advertisements or social/geo/promo link promotional data set can be delivered to the user 102 that requested the content for presentation in a viewer, (e.g., a browser or other content display system) The content server can transmit information about the location-based promotions, location-based offers, location-based coupons, promotions, social messaging, or offers in connection with online or mobile ads, mobile messages, mobile coupons, mobile promotions, mobile offers feed or advertisements, or social/geo/promo link promotional data set back to the ad server, including information describing how, when, and/or where the location-based promotions, location-based offers, location-based coupons, promotions, social messaging, or offers in connection with online or mobile ads, mobile messages, mobile coupons, mobile promotions, mobile offers feed or advertisements or social/geo/promo link promotional data set are to be rendered, (e.g., in HTML or JavaScript™) The content page 120 can be rendered in the user's viewer with one or more ads 122. When the user 102 ad click impressions on a displayed ad 122 of an advertiser, the user 102 can be redirected to a landing page 118 of the advertiser's web site.

In another example, the publisher 106 is a search service. A search service can receive queries for search results. In response, the search service can retrieve relevant search results from an index of content, (e.g., from an index of web pages) An exemplary search service is described in the article S. Brin and/or L. Page, "The Anatomy of a Large-Scale Hypertextual Search Engine," Seventh International world wide web Conference, Brisbane, Australia and/or in U.S. Pat. No. 6,285,999, both of which are incorporated herein by reference each in their entirety. Search results can include, for example, lists of web page titles, snippets of text extracted from those web pages, and/or hypertext links to those web pages, and/or may be grouped into a predetermined number of search results, (e.g., ten)

In one implementation, for the system 104 to provide geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed to the publisher that are targeted to the user 108 upon whose browser the geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed can be displayed, it is advantageous for user or member profile information about the user 108 to be provided to the system 104. In some implementations, user or member profile information and/or other types of data can be collected by the system 108 and/or stored in a repository 116. The stored data may include, for example, geographic locations of users or members, ad context information, etc. The system can then select the geo-targeted or geo-tagged advertisements or geospatial advertisements or mobile geo-tagged Internet posted promotions or offers and/or location-based promotions, location-based offers, location-based coupons, promotions, social messaging, or offers in connection with online or mobile ads, mobile messages, mobile coupons, mobile promotions, mobile offers feed to provide for viewing by the user 108 based at least in part on the user or member profile information.

Figure 22:
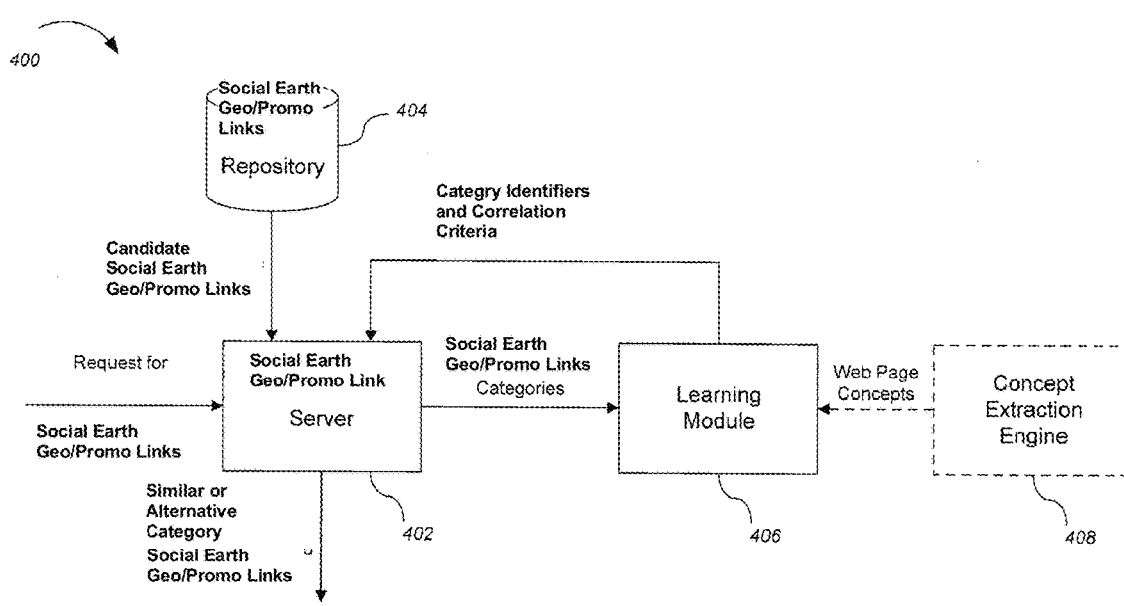
FIG. 22 is a block diagram of an example implementation of an advertising management system of the invention that provides related social/geo/promo link promotional data set with correlated broad and/or alternative categories.

FIG. 22 is a block diagram of an example implementation 400 of an advertising management system 108 of FIG. 21 that provides related social/geo/promo link promotional data set with correlated broad and/or alternative categories. The advertising management system 108 includes a social/geo/promo link server 402, a social/geo/promo link repository 404, and/or a learning module 406. In some implementations, the system 108 also includes a concept extraction engine 408. In some implementations, the ad server in system 108 also serves related social/geo/promo links.

The social/geo/promo link server 402 receives requests for related social/geo/promo link promotional data set. In some implementations, the social/geo/promo link server 402 receives related social/geo/promo link promotional data set requests from one or more content multimedia marketing impressions servers.

The social/geo/promo link server 402 receives candidate related social/geo/promo links from a social/geo/promo link repository 404. In some implementations, the candidate related social/geo/promo links are determined based on keyword corresponding to the requested content multimedia marketing impressions with which the related social/geo/promo link promotional data set is to be displayed. Other matching techniques can be used.

The social/geo/promo link server 402 identifies categories for the candidate related social/geo/promo links and/or forwards the categories to a learning module 406. In some implementations, the categories are the same as the candidate related social/geo/promo links. In some implementations, the candidate related social/geo/promo links are a subset of the categories that can be selected for social/geo/ promo link promotional data set displayed with requested content multimedia marketing impressions.

In some implementations, the related social/geo/promo link promotional data set request can include an identifier, (e.g., the Uniform Resource Locator, (URL)) of the webpage with the requested content multimedia marketing impressions with which the related social/geo/promo link promotional data set is to be displayed. Using the identifier, the web page can be crawled to determine one or more concepts evoked by the content multimedia marketing impressions of the web page. An optional concept extraction engine 408 can extract concepts from the web page content multimedia marketing impressions. The web page concepts can be forwarded to the learning module 406. Some examples of concept extraction engines are described in U.S. Pat. No. 7,231,393 and/or U.S. 2004/0068697, each of which, is incorporated by reference herein in its entirety.

The learning module 406 receives related social/geo/ promo link categories from the social/geo/promo link server 402. The learning module 406 generates or retrieves one or more category identifiers associated with each related social/ geo/promo link category. As described above, each related social/geo/promo link category can be classified under one or more categories. In some implementations, the category identifiers are predetermined. For example, the category identifiers for the related social/geo/promo link categories can be determined before a related social/geo/promo link promotional data set request is served. In some implementations, the category identifiers are pre-computed for the keyword for ads in the social/geo/promo link repository 404.

In some implementations, the learning module 406 also receives web page concepts from the concept extraction engine 408. Web page concepts can also be classified under one or more categories. Category identifiers for the web page concepts can be determined when a related social/geo/ promo link promotional data set request is received.

The learning module 406 computes one or more correlation criteria for each related social/geo/promo link category. A correlation measure provides a measure of how "close" or "distant" in correlation two category identifiers are, where the pair of category identifiers corresponds to two related social/geo/promo link categories. If category identifiers are determined for the web page concepts, correlation criteria can also be computed between a category identifier associated with a related social/geo/promo link category and/or a category identifier associated with one of the web page concepts.

In some implementations, the correlation measure can be computed using statistics accumulated over a large set of documents, (e.g., web pages) For example, the number of instances of a document evoking two category concepts can be determined. The number of instances can be used as a heuristic to measure the correlation between the two categories. That is, the larger the number of instances, the more likely the two categories are similar. Techniques for associating documents and/or co-occurring category concepts are described in U.S. Patent Publication No. 2006/0242013 A1, filed Oct. 26, 2006, for "Suggesting Targeting Information for Ads, Such as Websites and/or Categories of Websites for Example," which published patent application is incorporated by reference herein in its entirety. The correlation measure is further discussed below.

The social/geo/promo link server 402 receives from the learning module 406 one or more correlation criteria for each related social/geo/promo link category. In some implementations, the social/geo/promo link server 402 also receives the category identifiers from the learning module 406. The social/geo/promo link server 402 generates the same, similar, broad or alternative, social/geo/promo link categories based on the correlation criteria of the candidate social/geo/promo link categories. The same, similar, broad or alternative, social/geo/promo link categories are organized into one or more related social/geo/promo link promotional data set which can be provided by the system 108 to the content multimedia marketing impressions server to be combined with the requested content multimedia marketing impressions.

In some implementations, the social/geo/promo link server 402 provides the functionality of the learning module 406, including generation or retrieval of the category identifiers and/or the correlation criteria. In these implementations, the learning module 406 is not part of system 108.

Figure 23:
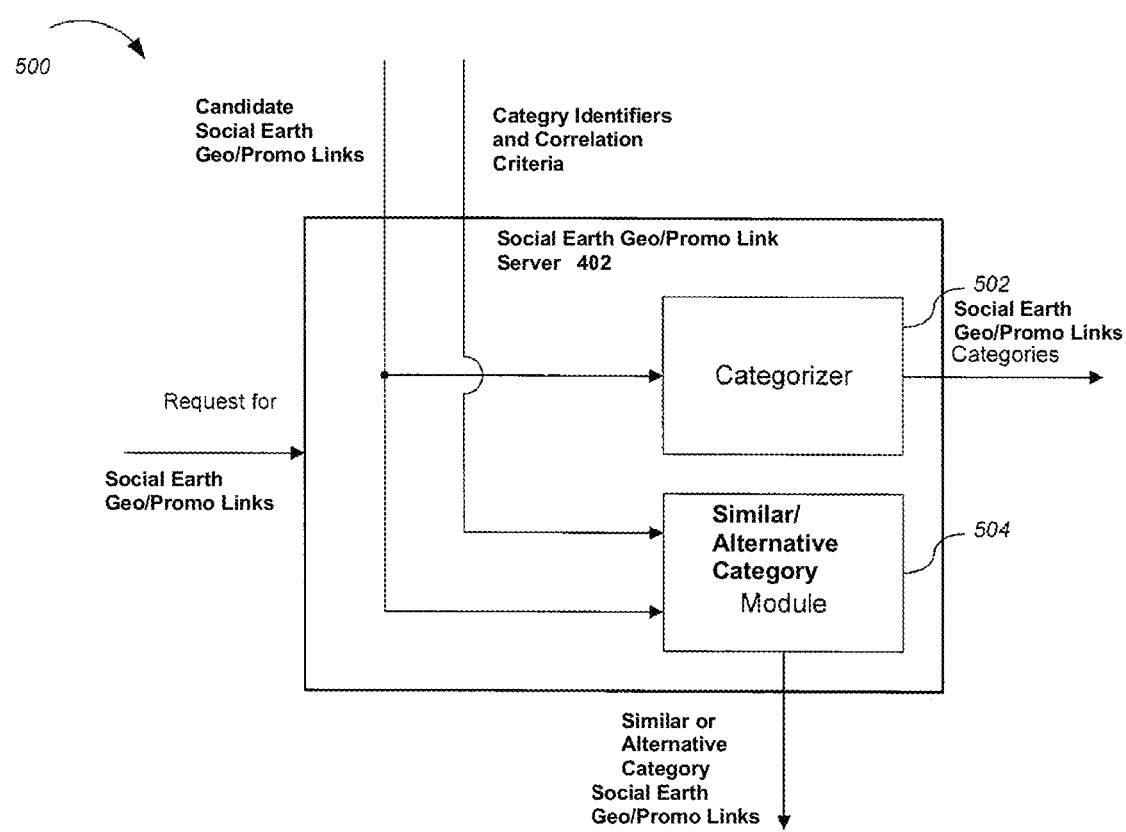
FIG. 23 is a block diagram of an example implementation of the social/geo/promo link server of the present invention.

FIG. 23 is a block diagram of an example implementation 500 of the social/geo/promo link server 402 of FIG. 22. The social/geo/promo link server 402 includes a categorizer 502 and/or a cluster/anti-cluster module 504.

The social/geo/promo link server 402 receives requests for related social/geo/promo link promotional data set. The related social/geo/promo link promotional data set request may include a number of related social/geo/promo link promotional data set desired and/or the number of related social/geo/promo link categories per related social/geo/promo link promotional data set. The number of related social/geo/promo link promotional data set desired can be used to determine whether related social/geo/promo link categories should be same, similar, broad or alternative, clusters or groupings.

The social/geo/promo link server 402 receives candidate related social/geo/promo links. In some implementations, the candidate related social/geo/promo links are ordered by relevance to the requested content multimedia marketing impressions. The social/geo/promo link server 402 can receive the ordered list of candidate social/geo/promo links. Alternatively, the social/geo/promo link server 402 can receive an unordered list, and/or the social/geo/promo link server 402 can order the candidate social/geo/promo links by relevance to the requested content multimedia marketing impressions using a relevance measure.

The categorizer 502 of the social/geo/promo link server 402 identifies categories for the candidate related social/geo/promo links. In some implementations, the categories are the same as the related-social/geo/promo links, and/or the categorizer 502 is not included in the social/geo/promo link server 402.

The social/geo/promo link server 402 receives one or more correlation criteria for each category. In some implementations, the social/geo/promo link server 402 also receives the one or more category identifiers associated with each category. In some implementations, category identifiers are also received for the web page concepts and/or are used to cluster or anti-cluster social/geo/promo link categories.

The candidate social/geo/promo links and/or the correlation criteria are provided as inputs to the cluster/anti-cluster module 504. If the request is for a single related social/geo/promo link promotional data set, the classification of the categories by characteristics, (also called categories) is used to improve the diversity of categories coverage, (alternative category clustering) of the related social/geo/promo link categories displayed in the single related social/geo/promo link promotional data set. If the request is for multiple related social/geo/promo link promotional data set, the classification of the related social/geo/promo link categories by categories is used to cluster related social/geo/promo link categories in one related social/geo/promo link promotional data set in the same category or similar categories while those in other related social/geo/promo link promotional data set are from different categories.

Figure 24:
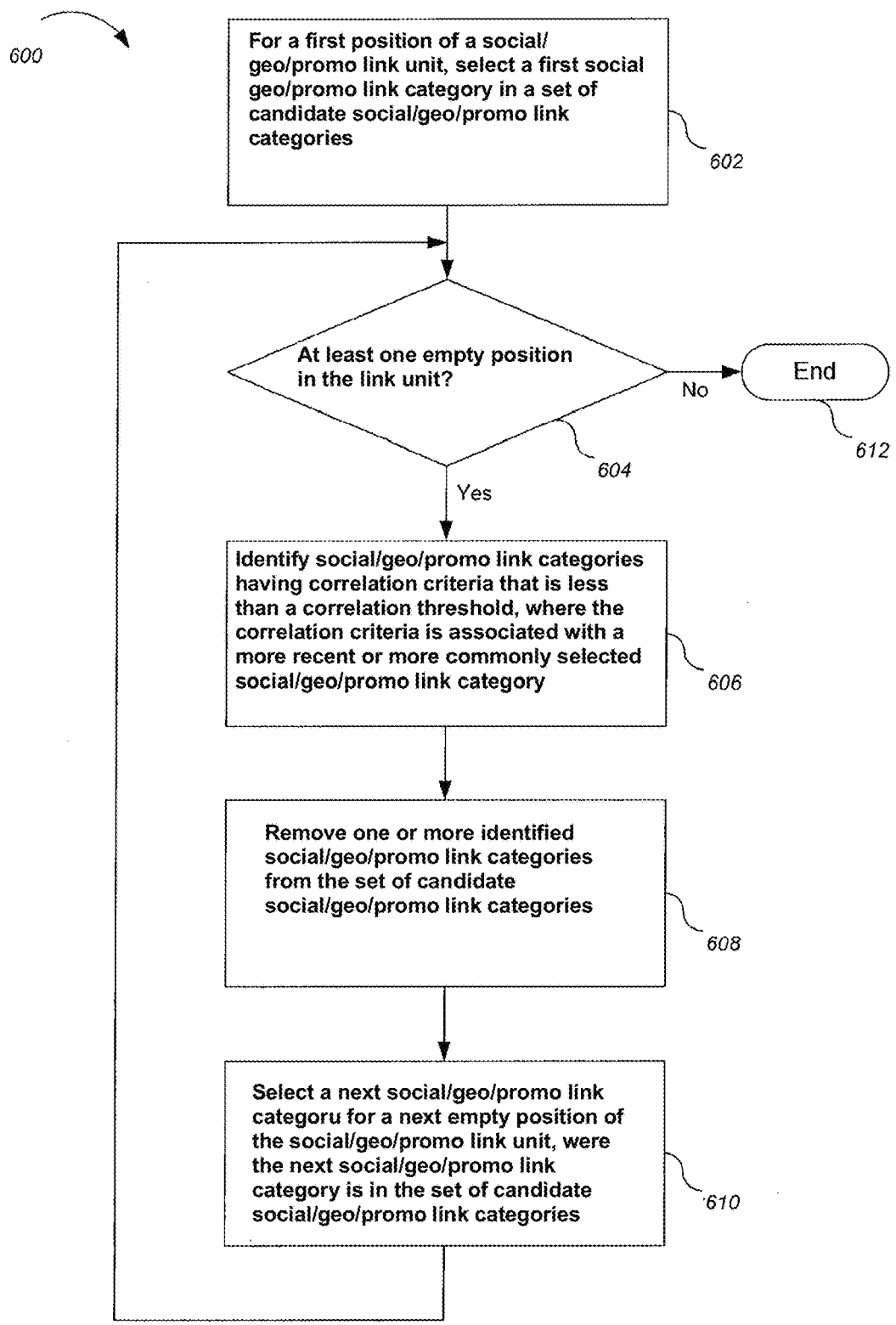
FIG. 24 is a flow diagram of an example process for providing a related social/geo/promo link promotional data set with correlated broad categories.

FIG. 24 is a flow diagram of an example process 600 for providing a related social/geo/promo link promotional data set with anti-clustered categories. The process 600 begins by selecting a first social/geo/promo link category for a first position of the social/geo/promo link promotional data set, where the first social/geo/promo link category is in a set of candidate social/geo/promo link categories, (602) In some implementations, the set of candidate social/geo/promo link categories is ordered according to the relevance of the social/geo/promo link categories to the requested content multimedia marketing impressions of the web page with which the related social/geo/promo link promotional data set is to be displayed. For an ordered set of candidate social/geo/promo link categories, the top relevance scoring social/geo/promo link category is selected for the first position of the social/geo/promo link promotional data set. In some implementations, selected social/geo/promo link categories are removed from the set of candidate social/geo/promo link categories.

As an example, the set of candidate social/geo/promo link categories can be ordered by relevance to the requested content multimedia marketing impressions of a web page. For a set with the following order: A, B, C, D, . . . , L, category A can be chosen as the most relevant social/geo/promo link category for the first position of the social/geo/promo link promotional data set.

The process 600 determines whether there is at least one empty, (e.g., unfilled) position remaining in the related social/geo/promo link promotional data set, (604) In some implementations, the link unit request can include the number of social/geo/promo link categories desired for the related social/geo/promo link promotional data set. If there are a predetermined number, (e.g., zero) of empty positions remaining in the related social/geo/promo link promotional data set, the process 600 ends, and/or (612) Generally, a related social/geo/promo link promotional data set is displayed with multiple social/geo/promo link categories.

If there is at least one empty position remaining in the related social/geo/promo-link-promotional data set, social/geo/promo link categories having a correlation measure that is less than a correlation threshold are identified, where the identified social/geo/promo link categories have one or more correlation criteria associated with the most recently selected social/geo/promo link category, (606) The identified social/geo/promo link categories are in the set of candidate social/geo/promo link categories. In some implementations, the correlation threshold can be predetermined.

In some implementations the correlation measure can indicate the "distance" between the category identifiers of two social/geo/promo link categories. That is, the smaller the correlation measures, the smaller the "distance" between the category identifiers, and/or the more similar the category identifiers are. For this type of correlation measure, the larger the correlation measure, and/or the less similar the category identifiers are. Identifying categories that have correlation criteria that are less than a correlation threshold means identifying the categories with a category identifier that is close, (within the correlation threshold) to a category identifier of the most recently selected category.

Alternatively, in some implementations, the correlation measure can indicate the "closeness" of the category identifiers of two social/geo/promo link categories. That is, the larger the correlation measure, the more similar the category identifiers are. For this type of correlation measure, the process 600 would identify the categories having a correlation measure that is greater than a correlation threshold.

Social/geo/promo link categories, which are identified, are removed from the set of candidate social/geo/promo link categories, (608) That is, social/geo/promo link categories that are too similar to the most recently selected social/geo/promo link category are eliminated from further consideration based on the correlation criteria.

A next social/geo/promo link category is selected for the next empty, (e.g., unfilled) position of the social/geo/promo link promotional data set, where the next social/geo/promo link category is selected from the set of candidate social/geo/promo link categories, (610) For an ordered set of candidate social/geo/promo link categories, the next most relevant social/geo/promo link category remaining in the set is selected for the next position of the social/geo/promo link promotional data set.

In some implementations, when the set of candidate social/geo/promo link categories is ordered according to relevance, the correlation criteria for a particular social/geo/promo link category are not compared to the correlation threshold unless the preceding social/geo/promo link categories in the ordered set have already been selected or eliminated. That is, after the first most relevant social/geo/promo link category is selected, the second social/geo/promo link category in the ordered set is selected if the second social/geo/promo link category is not too similar to the first social/geo/promo link category. If the second social/geo/promo link category is too similar, the next social/geo/promo link category in the ordered set is checked for correlation. The process continues until the social/geo/promo link positions of the social/geo/promo link promotional data set are filled.

If there is at least one empty position remaining in the related social/geo/promo link promotional data set, (604), the process repeats steps 606 through 610. The elimination and/or selection process repeats until a number, (e.g., all) of the social/geo/promo link positions for the related social/geo/promo link promotional data set have been filled. If the number, (e.g., all) of the positions of the related social/geo/promo link promotional data set has been filled, the process 600 ends, (612)

In some implementations, correlation criteria of social/geo/promo link categories can be used to reorder the set of candidate social/geo/promo link categories. That is, instead of or in addition to using the correlation criteria to eliminate social/geo/promo link categories, correlation criteria can be used to boost or lower the order position of a social/geo/promo link category in the ordered set of candidate social/geo/promo link categories. For example, the boosting or lowering can be based on the correlation measure of a social/geo/promo link category relative to the correlation criteria of other social/geo/promo link categories. In this implementation, the ordering of the set of candidate social/geo/promo link categories can account for both relevance to requested content multimedia marketing impressions and/or correlation to previously selected social/geo/promo link categories.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and/or method steps can be performed by a programmable processor executing a program of instructions to perform functions of the described implementations by operating on input data and/or generating and/or delivering targeted output.

The described features can be implemented advantageously in one or more computer programs that are executable on a programmable system including at least one programmable processor coupled to receive data and/or instructions from, and/or to transmit data and/or instructions to, a data storage system, at least one input device, and/or at least one output device. A computer program is a set of instructions that can be used, directly or indirectly, in a computer to perform a certain activity or bring about a certain result. A computer program can be written in any form of programming language, (e.g., Objective-C, Java), including compiled or interpreted languages, and/or it can be deployed in any form, including as a stand-alone program or as a module, component, subroutine, or other unit suitable for use in a computing environment.

To provide for interaction with a user, the features can be implemented on a computer having a display device such as a CRT, (cathode-ray tube) or LCD, (liquid crystal display) monitor for displaying information to the user and/or a keyboard and/or a pointing device such as a mouse or a trackball by which the user can provide input to the computer. The features can be implemented in a computer system that includes a back-end component, such as a data server, or that includes a middleware component, such as an application server or an Internet server, or that includes a front-end component, such as a client computer having a graphical user interface or an Internet browser, or any combination of collecting, mining, processing and/or storing social media, mobile and/or cloud data transmitted in the cloud service providers, servers, social networks or mobile networks including them. The components of the system can be connected by any form or medium of digital data communication such as a communication network. Examples of communication networks include, e.g., a LAN, a WAN, and/or the computers and/or networks forming the Internet.

The computer system can include clients and/or servers. A client and/or server are generally remote from each other and/or typically interact through a network. The relationship of client and/or server arises by virtue of computer programs running on the respective computers and/or having a client server relationship to each other.

Online Gambling:

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage transmission or display devices.

Furthermore, usage of the word "gaming," "gambling," "social gaming," or the like, refer to either land-based or online events, online activities, notifications and/or sharing photos, contacts, videos, blogs, RSS feeds, spatial interations, online and/or mobile communications and/or social interactions, user's behavior data, games, sessions, rounds, hands, rolls and/or operations etc., including video games, Web games, casino games, card games, dice games, sporting events and/or any other gaming or gambling events. In addition, the word "bet," "bid" or the like, refer to any type of wagers, bets or gaming ventures that are placed on random events, whether of monetary or non-monetary value.

The present invention provides a monetary or non-monetary online gaming platform, for enabling online games, gambling, events, online activities, notifications and/or sharing photos, contacts, videos, blogs, RSS feeds, spatial interations, online and/or mobile communications and/or social interactions, user's behavior data, or entertainment, that overcomes the limitations of existing land/or based and/or online gaming systems and/or including promotions, social messaging, or offers in connection with an online or mobile. The present invention provides a platform and/or method that may separate the actual event, produced by an event generator, and/or a Web server, (i.e. transaction server), that may communicate with both a player and/or one or more event generators and/or may processes the event data such that a player may place bets on the outcome of one or more events produced by one or more event generators. This separation, together with the integration of additional server components, may enable a network-based game management center, (hereinafter referred to as a virtual House" or just "House" to monitor the results of events from a plurality of event generators in real time, and/or manage data streams from one or more event generators simultaneously, whether the events are land-based and/or network-based, (virtual) One or more players, or groups of players, such as user/consumer groups, may monitor, analyze and/or play one or more events related to one or more Event generators.

According to at least one embodiment of the present invention, an event monitor such as a digital reader may be connected, associated with and/or or otherwise collect data from one or more event generators and/or may digitize and/or transmit to the transaction server data indicative of events which may occur on the one or more event generators.

According to further embodiment of the present invention, image and/or video information, digital or analog, may be collected from or near an event generator, and/or a pattern recognition unit may analyze the image and/or video information from one or more event generators such that the pattern recognition unit may produce a signal indicative of the events which may have occurred on the one or more event generators. Image and/or video information may be collected and/or transmitted via analog and/or digital communication channels or platforms. The image and/or video information may be collected by a video camera, web-cam, still digital camera, or any other suitable device or system known today or to be devised in the future.

According to some embodiments of the present invention, a person or persons may monitor a game event generator and/or may manually enter and/or transmit game event data to the transaction server. According to some embodiments, the image and/or video information collection device, (e.g., video camera) may be controlled by a computer associate with the pattern recognition unit such that the device is positioned and/or focused onto those areas of the one or more event generators most relevant at a given moment. For example, during the time bets are places on a roulette table, the image/video collection device may be positioned so as to acquire clear images of the roulette table's bet placing area, and/or during the spin of the ball, the camera may be repositioned to get a clear view of the ball and/or the number where it lands.

There is provided, in accordance with at least one embodiment of the present invention, an application, system and/or method for automated conversion of image and/or video based gaming data, or data from a reader, digital or analog, into usable statistical data, thereby enabling one or more players to participate using both historic and/or real time gaming information from one or more games and/or event generators, whether the games are online or offline, (e.g., land-based) According to further embodiments of the present invention, statistics may be compiled from game event-data collected, whether the data was collected manually through automated means such as a digital reader, video collection device, or the like.

As part of some further embodiments of the present invention, part or all of a specific player's playing history may be recorded and/or statistics relating to the player's gaming online activities, notifications and/or sharing photos, contacts, videos, blogs, RSS feeds, spatial interations, online and/or mobile communications and/or social interactions, user's behavior data may be compiled and/or presented to the player on demand. A player may use these statistics in making future gaming decisions or developing a gaming/betting strategy.

There is also provided, in accordance with at least one embodiment of the present invention, a transaction server or system for players to place bets based on the outcomes of one or more specific games, whether the games are physical or virtual. These bets may be based on standard game results or on alternative elements or derivatives related to the game progress or results.

According to some embodiments of the present invention, a player may instruct a virtual betting agent to monitor one or more event generators and/or one or a set of events taking places to place one or more bets associated with one or more game event generators, online casino, online sports betting, NBA, college basketball lines, football, soccer. According to further embodiments of the present invention, a player may place a bet on some combination of collecting, mining, processing and/or storing social media, mobile and/or cloud data transmitted in the cloud service providers, servers, social networks or mobile networks including game events occurring one or more game event generators, either over some period of time or over some number of games or game events.

According to some embodiments of the present invention, the transaction server may include a risk management unit which may stop or terminate the acceptance of bets from players one or more game events associated with one or more event generators when it is determined that exposure to potential losses by the House exceeds some threshold value. Different risk management units may apply to different groups of player and/or different groups of event generators.

Figure 25:
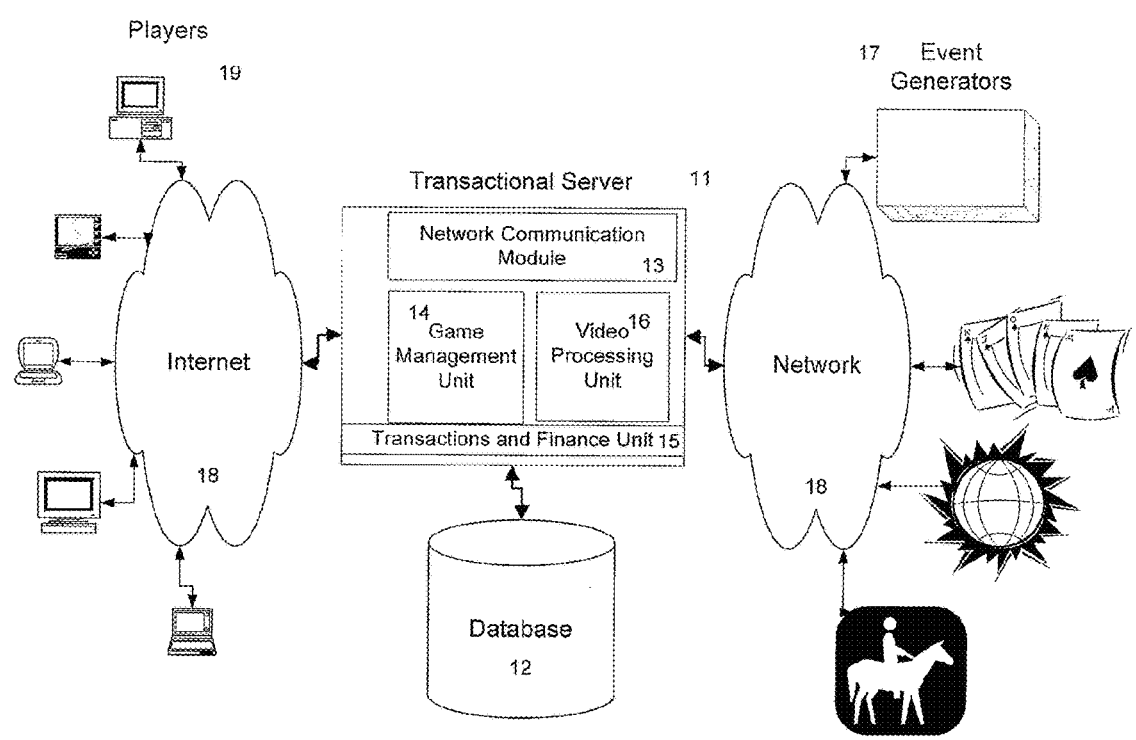
FIG. 25 is a diagram illustrating some components of an online gaming platform according to at least some embodiments of the present invention.

Specifically, reference is now made to FIG. 25, which is a monetary or non-monetary online gaming platform or system, generally designated 10 according to at least one embodiment of the present invention, for enabling online games, gambling, events, online activities, notifications and/or sharing photos, contacts, videos, blogs, RSS feeds, spatial interations, online and/or mobile communications and/or social interactions, user's behavior data, or entertainment. In FIG. 25 is shown a Transaction server, (TS) 11, operationally connected to at least one database 12. The database 12 may store player account data, game data for each gaming event, (from all the Event generators, which are described below), player activity and/or history data, player participation data, player preferences data, House data, and/or any other data that is relevant for performing the operations of the platform 10. The TS 11 is also operationally connected to at least one Event generator, ("EG") 17, such as a land based, (physical) or online, (virtual) video game, computer game, chess game, bingo game, roulette table, blackjack table, one-arm bandit machine or sporting game or any other game, entertainment event and/or gambling event that typically produces a random or indefinite result that may be bet or bid on. An EG may include a mechanism for maintaining, monitoring, implementing or otherwise generating and/or delivering targeted events, as well as a mechanism for enabling transmission of event data relating to individual events, (games/tables/machines etc.) to the TS 11. This data may be in the form of data signals that transmit game results, audio streams; images, video streams of actual event recordings, or any other data format that represents monitored events. The EG 17 may include data reading and/or transmission tools, devices or systems to transmit event data. Such tools may include electronic or mechanical mechanisms to read analog and/or digital data generated by the EG 17, and/or transfer this data to the TS, 11. Other examples of such a data reading devices may include optical readers, commonly known in the art, that are typically used in roulette tables, and/or or Video cameras. A video camera or any alternative reader may transmit data digitally either over a digital channel or over an I.P. network using digital packets.

The TS 11 may be connected to an EG 17 through a wireline and/or is wireless data network, such as the Internet 18, a company Intranet, and/or Extranet, using communications mediums including cable TV networks, satellite networks and/or cellular communication networks. Such network connectivity may enable interactive communications between players 19, the platform 10 and/or the Event generator(s) 17. According to an alternative embodiment of the present invention, the EG(s) 17 may be geographically connected to the TS 11, such as in the case where the EG(s) 17 are virtual, (computerized) EG(s) connected to the TS 11. Players according to some embodiments of the present invention, may interact with the platform using any type of computing and/or communication device, based upon user's personal computers, PDAs, mobile telephones, interactive TV, wearable computers, notebook computers, etc.

Transaction server, ("TS") 11, according to some embodiments of the present invention, may provide a platform and/or system that may separate an actual event, produced by an Event generator, and/or the server, that communicates and/or processes the event data, (Transaction server) This separation, together with the integration of additional server components, enables the implementation of a virtual House that h monitor the results of events from a plurality of Event generators, (in real time), and/or manage the data from one or more Event generators simultaneously, whether the events that have been generated are land-based and/or virtual. The House subsequently may enable one or more players, or one or more groups of players, such as user/consumer groups, to monitor, analyze and/or wager one or more events produced by one or more EGs simultaneously, whether the events are land-based and/or virtual. The House furthermore may enable one or more players to monitor and/or interact with one or more external online activities, notifications and/or sharing photos, contacts, videos, blogs, RSS feeds, spatial interations, online and/or mobile communications and/or social interactions, user's behavior data, events or gaming sessions, (hereinafter referred to as "events"), and/or "play" these events with the House and/or one or more other players.

The above stated functions of the TS 11 may be achieved by receiving event data from one or more EGs 17 and/or directing the event data to the various components of the TS 11, to the database 12 and/or to the players 19. Event data may be in the form of data signals representing event results of individual events, or actual recorded data streams, such as video streams, that capture the actual events. In this way players are able to monitor and/or interact with a plurality of external games or events simultaneously. Players 19, according to the present invention, may be operating any network enabled interactive computing or communications device. The present invention, furthermore, enables a plurality of players to play against the House, to play against each other, or to form teams whereby the teams may play against each other and/or against the House.

According to some embodiments of the present invention, one player or group of players may bear the financial risk for the bets of another player or group of players. In some games according to some embodiments of the present invention, where players compete against each other, for example poker, each player or team of players may bet against each other. In other games, a player or group of players may act as the House for another group of players, where the group representing the house may benefit from the losses of the second group and/or may be responsible for payment resulting from the wins of the second group.

The TS 11 may further contain a Network Communication Module, (NOM) 13, with server functionality, for receiving and/or transmitting data between the TS 11 and/or Event generators, (EG) 17, and/or between the TS 11 and/or the players 19. The NCM 13 may include a security layer for enabling, (secure) communication of data to and/or from the TS 11. The security layer may incorporate relevant security hardware and/or software for protecting data against unauthorized access to unencrypted identity data and/or keeping the network secure from intruders etc.

The TS 11 may further contain a Game Management Unit, (GMU) 14 for managing various operations within the TS 11, and/or for enabling interaction between the TS 11 and/or the EG(s) 17, and/or between the TS 11 and/or the players 19.

The GMU 14 may also provide a graphic user interface (GUI) that presents event data to the players and/or enables the players to monitor progress of relevant events, manage accounts, and/or give commands to the TS 11, such as bidding preferences and/or rules. According to a further embodiment of the present invention, the GUI may provide a split screen that divides the player's display device, (which may include a PC monitor, interactive TV screen, cellular phone panel, PDA screen or any other display device) into several windows, each one displaying the progress, results and/or statistical data for at least one individual game. Such a GUI may thereby simultaneous provide viewing, analyzing, bidding and/or managing options to a player over a plurality of games or events.

In addition, the TS 11 may include a Transactions and/or Finance Unit, (TFU) 15, for managing of players accounts as well as authentication protocols and/or implementation of financing and/or payouts etc. for players. The TFU 15 may be adapted to support any financial systems and/or payment methods, including online, (Internet based) accounts, credit card accounts, token accounts, ATM accounts, e-bank accounts, or any other player accounts, whether "money" based or "non-money" based accounts. According to at least one embodiment of the present invention, the TFU 15 may request initial deposits, (of money or tokens etc.) in an account. The TFU 15 may verify that the deposit satisfies House rules. Examples of such House rules relating to deposits include but are not limited to: minimum and/or maximum deposit amount, authentication protocols of the depositor identity and/or eligibility, and/or any other deposit related rules and/or regulations determined by the House.

Once this deposit has been made, the account may then be credited or debited in real time, according to the bids placed by players or payouts received by players. According to this embodiment, each bid or wager made may be verified by the TFU 15, which queries the player account before confirming a bid, to determine available resources to cover the cost of the bid.

According to a further embodiment of the present invention, the TS 11 may be operationally connected to a player's financial institution, credit/debit card account, e-bank, credit-card processing center or any other financial transaction center. This embodiment may enable player participation with the platform 10, while the platform 10 is indirectly connected to the player's account. In this way, the TFU 15 may manage each player's online account, including, but not limited to, the following functionalities: verifying player identity; authenticating financial ability of players; securing payments for bids; and/or implementing deposits of payouts etc.

According to an additional embodiment of the present invention, in the case where EG 17 is equipped with multicasting software, the TS 11 may enable a-player 19 to configure the platform 10 to route video event data or other game data from: EG 17 directly to at least one player 19. In this way, video data or alternative gaming data may be received and/or processed by one or more players 19, in addition to, (but not necessarily by) the TS 11.

According to a further embodiment of the present invention, the TS 11 may contain a Video Processing Module, (VPM) 16 that may enable processing of video data received from EG 17. This VPM 16 may incorporate a video recognition module together with video data analytics software, thereby enabling the VPM 16 to recognize, filter, format and/or analyze etc. raw video data streams from one or a plurality of EG(s) 17, thereby converting such raw data into player-usable data. Any data recognition and/or conversion tool may be used for this purpose. An example of such a data recognition and/or formatting tool has been described in U.S. Pat. No. 6,339,773, which is incorporated by reference in its entirety. The '773 patent describes a tool for converting data from a received format into another chosen format, and/or subsequent transmitting or embedding the format. Where necessary, this tool also describes reformatting the data in its original format. Such video data from EG 17 may alternatively be acquired directly from a security apparatus such as security video cameras that are located in close proximity to an individual event generator. An example of such video-based security apparatus is the NiceVision series of applications, from NICE Systems Ltd., (NICE Systems Ltd., 8 Hapnina Street, P.O Box 690, 43107 Ra'anana, ISRAEL.

According to a further embodiment of the present invention, the TS 11 may contain an Audio Processing Module, (APM) that enables processing of audio data received from EG 17. This APM may incorporate an audio recognition module together with audio data analytics software, thereby enabling the APM to recognize, filter, format and/or analyze etc. raw audio data streams from a plurality of EG(s) 17, thereby converting such raw data into player-usable data. Any data recognition and/or conversion tool may be used for this purpose.

According to a further embodiment of the present invention, the TS 11 may contain an Image Processing Module, (IPM) that enables processing of image data received from EG 17. This IPM may incorporate an image recognition module together with audio data analytics software, thereby enabling the IPM to recognize, filter, format and/or analyze etc. raw image data streams from a plurality of EG(s) 17, thereby converting such raw data into player-usable data. Any data recognition and/or conversion tool may be used for this purpose.

Figure 26:
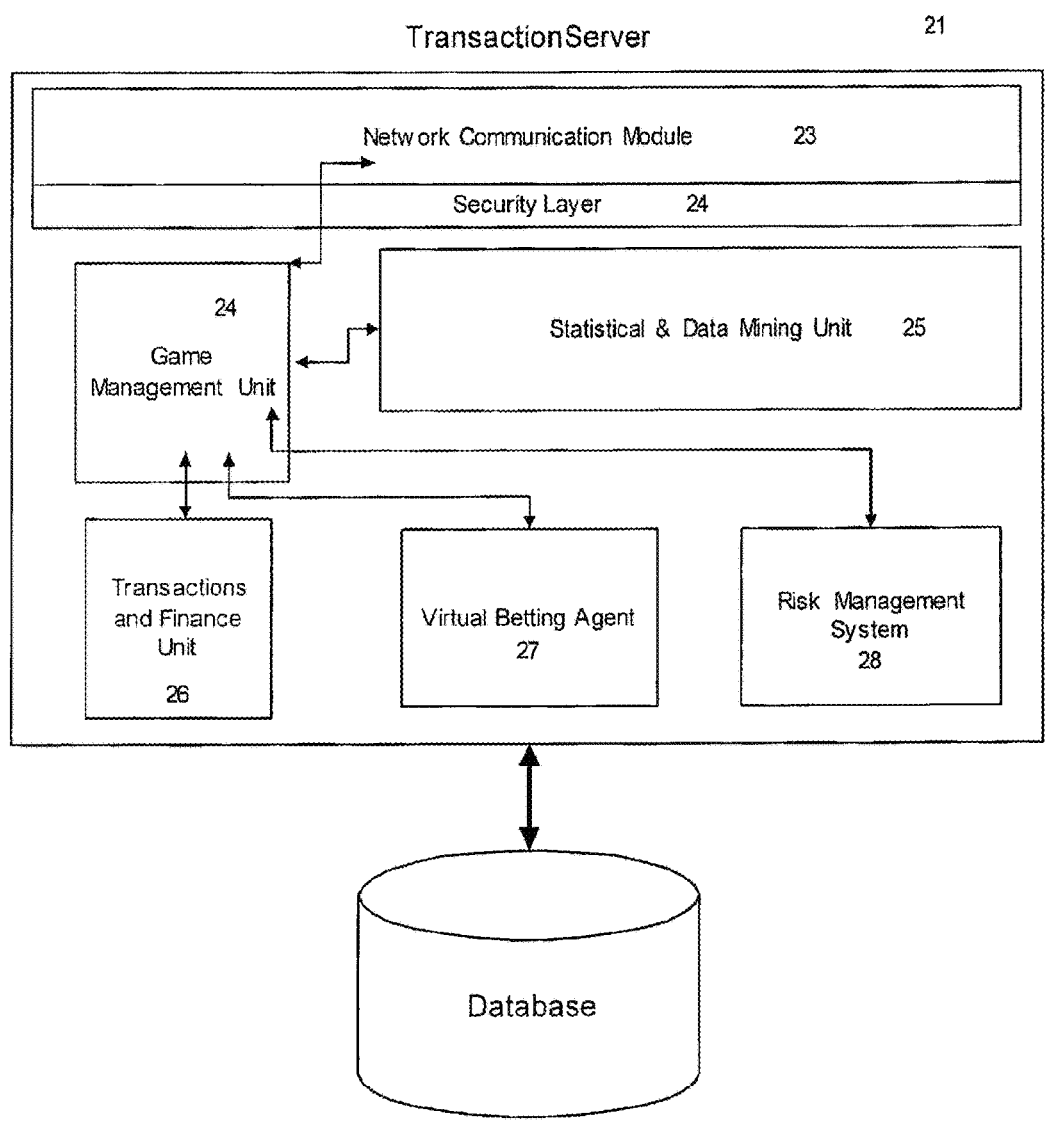
FIG. 26 is a diagram illustrating some components of a transaction server according to some embodiments of the present invention.

Reference is now made to FIG. 26, which illustrates the Transaction server, (TS) 21 according to at least one additional embodiment of the present invention. The TS, 21 may contain a security layer 24 for enabling secure communication of data to and/or from the TS 21.

According to an additional embodiment of the present invention, the TS 21 may contain a Statistics and/or Data mining & analyzing information Unit, (SDMU) 25, for processing event data from a plurality of EG(s) 17 using statistical and/or data mining & analyzing information tools, such that raw or primary event data is converted to usable data for the players and/or the platform 10. There are many tools known in the art for undertaking statistical analysis and/or data mining & analyzing information on data. Such provision of gaming data may be provided to players on a continual and/or real-time basis. According to another embodiment of the present invention, the TS 21 may contain a Virtual Betting Agent, (VBA) 27 for enabling personal configuration of gaming rules and/or conditions by players. The VBA 27 may be configured, for example, to limit the bid amounts, determine maximum game times, exiting criteria, profit and/or loss limits and/or any individual conditions, (e.g., in "a" event, do "b") etc. An example of a configuration of loss and/or profit limits is in the case where the player determines that his/her bids can be placed automatically, until such a time that a determined loss or profit limit has been reached, at which time the player's participation in a game may be automatically discontinued. Further examples of options enabled by the VBA 27 include selecting future bets on games/events and/or derivatives of games/events. For example, a player may use statistics to determine that game has more chance of winning the next 5 rounds than game 2. Player may then place a bet on game 1, against game 2, in relation to the results of the 5 upcoming rounds. Another example is where player desires to bid for a derivative occurrence in game 3, such as on the probability that the next card is "white". In this way, players may configure rules for automatic betting based on actual game results or derivative information from game data, which is derived from analyzing game progress and/or results to develop new sets of events based on the probability of events happening. By enabling the above, the VBA 27 may provide a stock-exchange type of environment of individual events or games, where players may bet on the probabilities of particular events occurring or future successes of individual events, such that each individual event has a kind of market capital that may be bet on.

According to a further embodiment of the present invention, the VBA 27 may enable at least one player to play against at least one other player. This player-to-player option is particularly, but not only, relevant in the context of future bets, wherein players may bet against other players on the chances of selected events transpiring. The TS 11 may monitor the requests and/or references of a plurality of players, and/or optionally the combination of collecting, mining, processing and/or storing social media, mobile and/or cloud data transmitted in the cloud service providers, servers, social networks or mobile networks including two or more players in player groups, thereby providing player(s)-to-player(s) betting opportunities. As in the typical player House interactions or browsing the content of a social network or mobile network or other application according to the present invention, betting occurs, results of events are acquired, and/or payments are implemented by the TS 11 according to the event results.

According to a further embodiment of the present invention, the TS 21 may contain a Risk Management System, (RMS) 28, for enabling the House to manage event risks between various events and/or for the House operations as a whole. For example, the House may determine that any EG 17 that has lost more rounds than it has won within any 50 game routine must be discontinued, or that the entire house should cease activity if a certain amount of money has been lost in a determined period. The RMS 28 may enable the House to see the total exposure or risk at any given moment, and/or to cease online activities, notifications and/or sharing photos, contacts, videos, blogs, RSS feeds, spatial interations, online and/or mobile communications and/or social interactions, user's behavior data at any moment, to limit bets or to freeze payouts etc.

Figure 27:
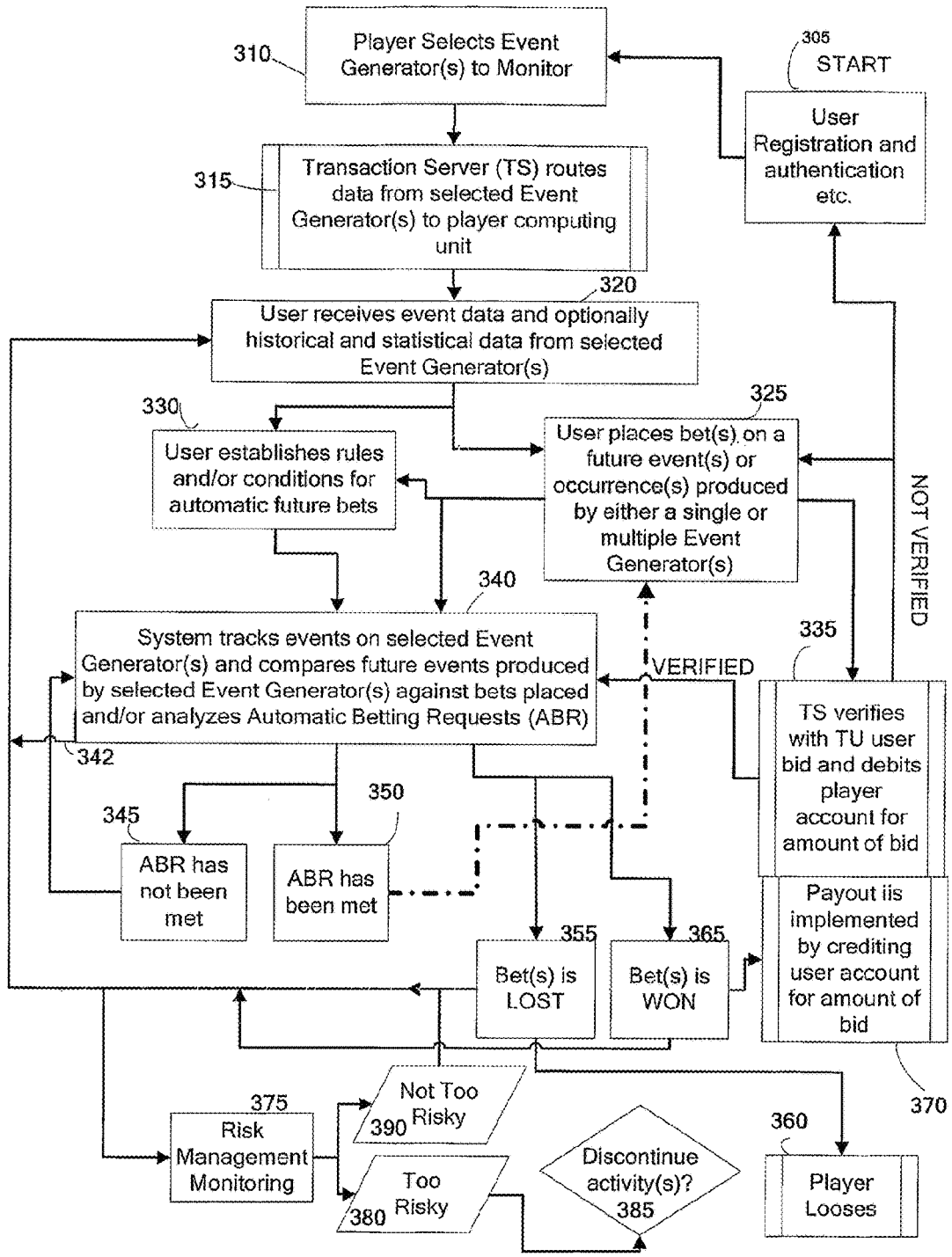
FIG. 27 is a flowchart illustrating steps which may be performed according to one or more methods associated with some embodiments of the present invention.
Figure 28:
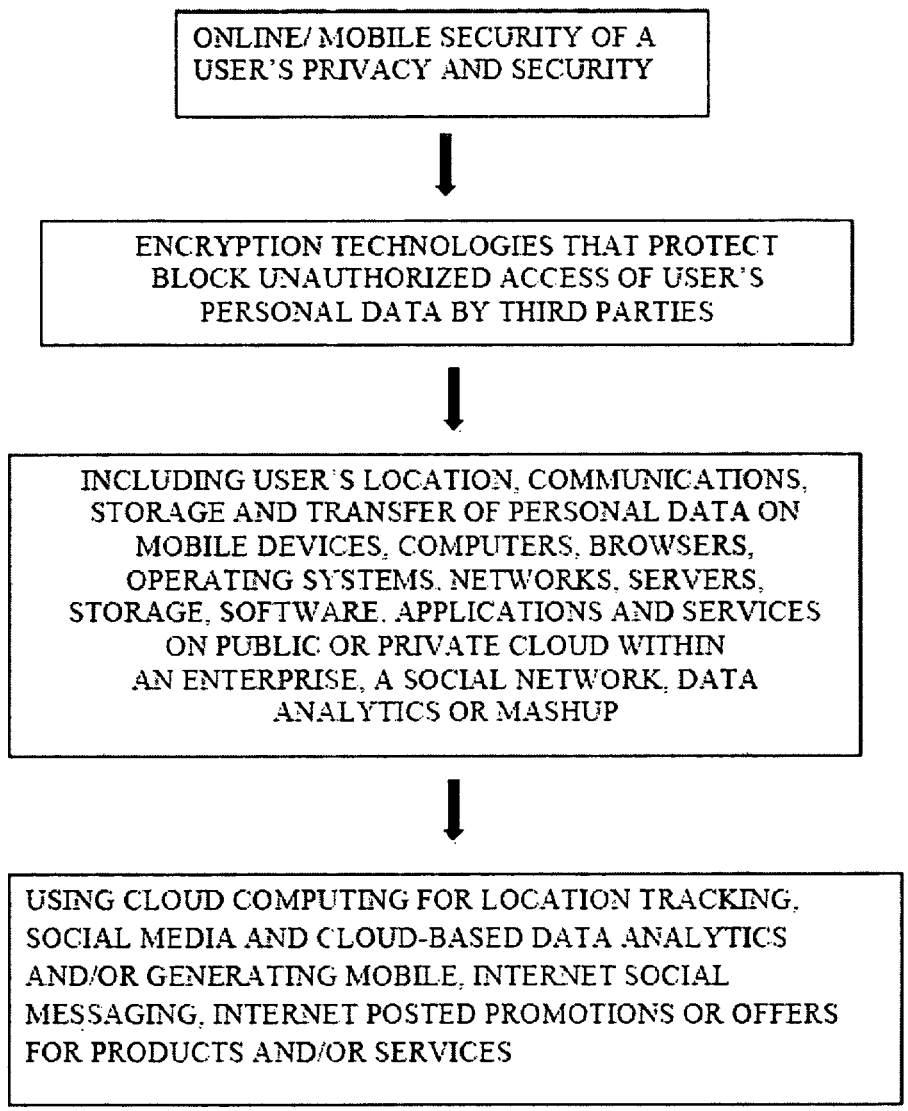
FIG. 28 is a flowchart illustrating steps which may be performed according to one or more methods associated with some embodiments of cloud computing security and/or mobile cloud security for internet or mobile access to the present invention.

FIG. 27 is a flowchart that illustrates an example of steps performed according to at least one process of the present invention. As can be seen in the figure, user 19 initially registers with the system 305, and/or subsequently utilizes the platform front-end, (such as a House Website, as presented by the GMU 24) to select 310 one or more EG(s) for monitoring. The registered player is typically required to log in to the platform 10, optionally by using a keyword, biometric data or any other necessary private code or key. The player 19 may subsequently view the various available events and/or manage his/her portfolio of gaming events, adding or deleting events in which he or she is playing or monitoring. Once the player determines, for examples which games he or she would like to monitor play, the relevant data is routed from the selected is EG(s) to the player 19 computing device. This touting of event data is typically implemented by the GMU 24. The player 19 subsequently receives 320 event data, and/or optionally historical and/or statistical data, from selected Event generator(s) 17. He/she then places bet(s) 325 on a future event(s) or ongoing events produced by; either a single or multiple Event generator(s) These bets may be monetary and/or non-monetary: bets. Additionally or alternatively, the player 19 may establish rules and/or conditions 330 for automatic future bets, optionally using a Virtual Betting Agent, (VBA) 27, for enabling personal configuration of gaming rules and/or conditions by players. Betting conditions may include, for example, bid ceilings, payout ceilings loss limits, time limits, and/or particular event limits etc. Particular event limits may include, for example, a rule that in the case of "x" wins by the House, player game is immediately suspended. After bets have been placed, TS 21 may authenticate the user and/or verify the user bid with the Transaction and/or Finance Unit, (TU) 26. The bid amount may be extracted from 335 the player's account or credit card etc., to confirm the bid placement.

In either of the above scenarios, the system subsequently tracks events on selected event generator(s) and/or compares generated, (future) events produced by selected event generator(s) against bets placed, to derive bidding results and/or analyze Automatic Betting Requests, (ABR) 340. The latter process determines whether the ABR(s) have or have not been met, and/or thereby indicates whether the player's conditions for the placing of a bid have been met. In the case where the ABR have not been met, the system continues tracking events or games 340, until such a: time as the ABR are met. When the ABR has been met, the system informs the user, and/or returns to request confirmation of bid placement by the player 325. The above event tracking and/or comparing processes 340, in the cases where bets have been placed, provide the results for the event(s) that the players have bid on. In the case where the bet is lost, the game ends 360. In the case where the bet is won, the payout, which may be a monetary or non-monetary payout, is generated, and/or the payout or game prize, whether monetary or non-monetary, may be transferred from the House to the player account 370. The player account may be a "money" account or a "non-money" account, where bonuses coupons, incentives etc., may be deposited and/or withdrawn. According to a further embodiment of the present invention, a conversion may be implemented, in any of the above gaming scenarios, to convert non-monetary deposits into monetary deposits, or non-monetary accounts into monetary accounts, or vice Versa. The user may be authenticated before the payout is made, (credited) to the user's account. In the case where the user is not authenticated, the user may need to reregister or otherwise prove his/her identity 305. Alternatively, the player may return directly to step 325 and/or place one or more additional bets. The results of the event tracking and/or comparing processes 340 are typically sent to the user 342, enabling the user to determine if he/she wishes to continue interacting with the particular event played, (i.e. step 320), without having to start from step 310.

According to at least one embodiment of the present invention, a Risk Management System, (RMS) 28 may be provided to enable the House to determine risk limits. The RMS 28 may monitor 375 the results of steps 355 and/or 365, (which relate to the event results) or any other steps in at least one gaming process, from one or more EG(s) 17, to determine whether the House determined risk ceiling has been met for the House in general, or for one or more EG(s) 17. In the case where a determined risk limit has been met 380, TS 11 may act to discontinue 385 one or more online activities, notifications and/or sharing photos, contacts, videos, blogs, RSS feeds, spatial interations, online and/or mobile communications and/or social interactions, user's behavior data, such as player bids or payouts, and/or the general functioning of the House, in accordance with the predetermined rules. In the case where a determined risk limit has not been met 390, the gaming process may be continued. The RMS 28 may monitor the House risk at any time, during all or any processes. The example illustrated in FIG. 27 is but one alternative of where the RMS 28 may implement monitoring.

According to at least one embodiment of the present invention, the receiving 320 of event data and, (optionally) historical and/or statistical data from selected Event generator(s) 17 may be enabled by the Statistics and/or Data mining & analyzing information Unit, (SDMU) 25. The SDMU 25 may enable processing of event data from a plurality of EG(s) 17 using statistical and/or data mining & analyzing information tools, such that raw or primary gaming data may be converted to usable data for both the players and/or the platform 10.

According to at least one embodiment of the present invention, the establishment of rules and/or conditions 330 for automatic future bets may be implemented using a Virtual Betting Agent, (VBA) 27. The VBA 27 may enable personal configuration of gaming rules and/or conditions by players.

According to a further embodiment of the present invention, a method is provided for enabling a land-based House to provide event betting to remote players. According to at least one version of this embodiment, as can be seen with reference to FIG. 25, the land-based House may convert at least one existing event or game into an EG 17. The land-based House may also provide a TS 11. The EG 17 may subsequently transfers event results to the TS 11, using a network, whereby the events may be processed and/or transferred to one or more remote players 19. The remote players 19 may subsequently interact with the existing events, by monitoring events, analyzing event statistics, and/or placing bets and/or setting betting conditions and/or rules using a GUI provided by the TS 11.

According to a further embodiment of the present invention, a method is provided for enabling a non-monetary gaming platform, wherein step 335 is ignored. In this case, once the user has placed a bid, the system may automatically track the selected events 340, without requiring financial verification.

According to a further embodiment of the present invention, a method is provided for enabling the data and/or results of at least one event generator 17 to be at least partially owned, possessed or otherwise purchased by at least one user, whether the user is an individual, group, partnership, company, incorporation or any other entity, and/or whether the user is participating in the events or not participating in the events. This embodiment thereby enables users or members to have interests or rights in the data and/or results of at least one Event generator 17.

Potential Aspects or Elements of the Claimed Invention that can be Optionally Excluded or Negatively Claimed.

The present invention can also in particular claimed embodiments exclude or negatively claim one or more aspect of the following list, e.g., to more particularly recite or exclude embodiments or elements that might occur in cited or other published art using encryption technologies and/or filters to access data, encrypt and/or decrypt data, sync data, secure data storage and/or process data using cloud technology through multiple using encryption technologies and/or filters accessed through multiple using encryption technologies and/or filters Accordingly, the present invention can optionally exclude, not include, or not provide, one of more, or any combination of 1. A method for online and/or mobile security of a user's privacy and/or security during internet or mobile access, including social networks, mobile platforms and/or 2D or 3D mapped data with a combination of location tracking, social media communications tracking and/or cloud-based data analytics tracking and/or predictive analytics for promotion or sales of products and/or services, with user selected privacy and/or security settings, comprising: (a) electronically providing access using a computer processor a graphical user interface (GUI) for a user to select internet and/or mobile data security and/or privacy configuration or filter data sets selected from opting out, filtering, categorizing, encrypting, concealing, or blocking data sets of internet or mobile access data using encryption technologies and/or filters to prevent the unauthorized access to said user's browsing, social, communications, purchasing, personal, location, and/or 2D or 3D mapped data by third parties; (b) electronically implementing on said users's computer processor said user selected security or privacy configuration or filter data sets using encryption technologies and/or filters to prevent the unauthorized access to said user's browsing, social, communications, purchasing, personal, location, and/or 2D or 3D mapped data by third parties;

using encryption technologies and/or filters to access data, encrypt and/or decrypt data, sync data, secure data storage and/or process data using cloud technology through multiple using encryption technologies and/or filters accessed through multiple using encryption technologies and/or filters by access data, encrypt and/or decrypt data, sync data, secure data storage and/or process data using cloud technology through multiple using encryption technologies and/or filters third-parties using data mining and/or other electronic surveillance technologies and/or data tracking technologies and/or analysis of data with cloud computing analytics for location tracking, social media communications tracking, data tracking, identification tracking, traffic analysis, electronic surveillance tracking or cloud-based data analytics tracking generating relevant advertising, mobile, internet via a mobile or wireless device for an online payment optionally wherein said computer processor is provided on one or more servers, cloud based data storage, computers, mobile devices, smartphones, software programs or applications, or operating systems;

optionally wherein said internet or mobile access data relates to user;

optionally wherein said communication, social, or personal data includes information about user texting, SMS, MMS messaging, instant messaging, multimedia messaging, audio or video conferencing, email, voicemail, video mail, pictures, video, chat, and/or multimedia, contacts, social media relationships, friends, family, or business associates;

optionally wherein said browsing or purchasing data includes user targeted promotions, social messaging, or offers, website access; browser cookies or session cookies; locations; online purchases, wish lists, gift lists, purchase history, browsing history, behavior, likes and/or dislikes, demographic information or categories relating to products or services, preferences, promotions accessed, purchase histories, behavior, 2D or 3D mapping of user location, locations of interest, browsed company, product, or service locations;

optionally wherein said targeted promotions, social messaging, or offers comprise location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, customized, promotions, social messaging, or offers;

optionally wherein said data security and/or privacy configuration or filter data selected by the said user are applied to the said user's online activity or behavior information or interactions or browsing the content of a social network or mobile network or other application online or via a mobile or wireless device data comprising one or more of: (a) the said user's impressions tracking and/or analysis data; (b) location-based information; (c) location-based data; (d) creation of reversible or transparency for windows; (e) allowing user to write notes and/or comments on the virtual landscape or windows' backs; (f) configuring an application using its backside of the windows represented as a 3D slate in the 3D space; (g) 2D or 3D mapping data; (h) 2D or 3D objects which can be set at any angle or turned completely around by the user; (i) tilting all the windows to assist the user to pick up a desired window, provision of panning virtual desktop, virtual keyboards or keypads, a screen or a touchless screen, icons that reflect the live status of the window they represent and/or zooming of a window when it receives focus; (j) mobile mapping data; (k) the said user's internet activity; (l) user or member profile and/or lifestyle preferences data; (m) social networking interactions or browsing the content of a social network or mobile network or other application or images or videos, interactive games, communications and/or data transfers and/or database management systems in the cloud using encryption technologies and/or filters to provide that personal data, communications data, identification data, location data and/or other information and/or data via a mobile or wireless device and/or cloud security for internet or mobile access or system using encryption technologies and/or filters to secure cloud security using multiple devices, browsers, operating systems, networks, fiber optic communications, multichannel platforms and/or multiple data centers, social networks and/or mobile platforms, encryption technologies for mobile computing for user's preferred a user's privacy and/or security, searching, browsing, purchases, likes or dislikes, impressions, location, interactions or browsing the content of a social network or mobile network or other application online or via a mobile or wireless device; (n) advertisers and/or publishers, brand/or merchants or global brands or demographic groups; (o) OMA CPM message store; (p) store and forward functionality for chat, group chat and/or file transfer; (q) group chat that is closed to new participants; (r) resumption capability for file transfer; (s) use of file transfer for new services such as location-sharing, social networking preferences, online activities, notifications and/or user's behavior data-information sharing and/or (t) said user's social networking interactions or browsing the content of a social network or mobile network or other application or images or videos, interactive games, communications and/or data transfers and/or database management systems in the cloud using encryption technologies and/or filters to provide that personal data, communications data, identification data, location data and/or other information and/or data via a mobile or wireless device and/or cloud security for internet or mobile access or system using encryption technologies and/or filters to secure cloud security using multiple devices, browsers, operating systems, networks, fiber optic communications, multichannel platforms and/or multiple data centers, social networks and/or mobile platforms, encryption technologies for mobile computing for user's preferred a user's privacy and/or security;

optionally wherein the said location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, customized, promotions, social messaging, or offers are selected from the group consisting of a coupon from social networking interactions or browsing the content of a social network or mobile network or other application or images or videos, interactive games, communications and/or data transfers and/or database management systems in the cloud using encryption technologies and/or filters to provide that personal data, communications data, identification data, location data and/or other information and/or data via a mobile or wireless device and/or cloud security for internet or mobile access or system using encryption technologies and/or filters to secure cloud security using multiple devices, browsers, operating systems, networks, fiber optic communications, multichannel platforms and/or multiple data centers, social networks and/or mobile platforms, encryption technologies for mobile computing for user's preferred a user's privacy and/or security, searching, browsing, purchases, likes or dislikes, impressions, location, interactions or browsing the content of a social network or mobile network or other application online or via a mobile or wireless device, or promotions, social messaging, or offers from advertisers and/or publishers, brand/or merchants or global brands or demographic groups or users or members, an advertisement, a location-based promotion, a location-based offer, a location-based discount, a daily deal ad, location-based advertising, a location-based ad, a location-based deal or offer, a mobile display ads, a mobile ad network, mobile multimedia marketing and/or advertising, mobile location data, mobile location-based advertising, a customer loyalty card, a discounts, a promotion, an offer, a location-based promotion, an online or mobile coupon or promotion, mobile location data, mobile location-based advertising, a promotions, social messaging, or offers associated with a location or a map or a social message in a social network or website online or mobile device, a location-based mobile coupon, a mobile grocery coupon, a mobile gas coupon, mobile payment systems, subscribe to mobile coupons or purchase mobile apps or cloud-based apps, a mobile airline coupon, a mobile ad products, a targeted mobile ad, a mobile multimedia marketing and/or advertising network, and/or a mobile coupon;

optionally wherein the said mobile device is selected from the group consisting of a smartphone, a tablet device, a cell phone, a mobile internet device, a wireless device or application, a netbook, a notebook, a personal digital assistant, an internet phone, a holographic device, a holographic phone, a cable internet device, a satellite internet device, an internet television, a DSL internet device, and/or a portable internet access device or computer;

optionally said method further comprises step (c) collecting, mining, processing and/or storing social media, mobile and/or cloud data and/or user identifying data from cloud computing or social networks or mobile networks or location data, or any combination thereof, location-based data and/or location-based services for exchanging data transfers and/or database management systems in the cloud using encryption technologies and/or filters to provide that personal data, communications data, identification data, location data and/or other information and/or data via a mobile or wireless device and/or cloud security to generate targeted promotions, social messaging, or offers from advertisers and/or publishers, brand/or merchants or global brands or demographic groups or users or members in a social network or mobile network are generated, said step (c) as a promotional method comprising: (a) collecting and/or analyzing initial end user or member data via a processor on a computer or mobile device to provide initial end user or member data sets, the said initial end user or member data sets comprising: (1) initial end users' or members' impressions data comprising tracking and/or analysis of website access to users, target markets, demographic groups or geographic data; (2) user or member profile data; (3) social networking interactions or browsing the content of a social network or mobile network or other application or images or videos, interactive games, communications and/or data transfers and/or database management systems in the cloud using encryption technologies and/or filters to provide that personal data, communications data, identification data, location data and/or other information and/or data via a mobile or wireless device and/or cloud security for internet or mobile access or system using encryption technologies and/or filters to access data, encrypt and/or decrypt data, sync data protect communications, storage and/or transfer of personal data in the cloud across many different networks and/or fiber optic communications from an endpoint accessed through multiple devices, browsers, operating systems, networks, servers, storage, software, applications or services with cloud security using encryption technologies and/or filters for mobile computing for user's preferred a user's privacy and/or security, searching, browsing, purchases, likes or dislikes, impressions, location, interactions or browsing the content of a social network or mobile network or other application online or via a mobile or wireless device; (4) location information data relating to selected; (a) users, members, target markets, advertisers and/or publishers, brand/or merchants or global brands, demographic groups or geographic data; (b) (1) products or services; or (2) service providers; and/or (c) points of interest near to or associated with the said: users, members, target markets, advertisers and/or publishers, brand/or merchants or global brands, demographic groups or geographic data, product or services; or product service providers; (5) social media, buying behavior, user behavior and/or tracking a user's profile, unique data and/or actions online, notifications, communications, data transfers and/or database management systems in the cloud using encryption technologies and/or filters to provide that personal data, communications data, identification data, location data and/or other information and/or data via a mobile or wireless device and/or cloud computing for privacy concerns and/or encryption of identifiable data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing targeted advertising and/or consumer feedback analytics with a combination of location tracking, social media communications tracking, data tracking, identification tracking, traffic analysis, electronic surveillance tracking and/or cloud-based data analytics tracking and/or predictive analytics for multimedia marketing; (6) 2D and/or 3D mapping data selected from: (a) the said user, member, target market, advertiser, social or global brand/or or demographic group locations or location interests or location data, sharing links or updates, communications and/or data transfers and/or database management systems in the cloud using encryption technologies and/or filters to provide that personal data, communications data, identification data, location data and/or other information and/or data via a mobile or wireless device and/or cloud computing; or (b) (1) the said product or service; or (2) the said product or service provider; locations or associated locations; (c) (1) creation of reversible or transparency for windows; or (2) allowing user to write notes and/or comments on the virtual landscape or windows' backs; or (3) configuring an application using its backside of the windows represented as a 3D slate in the 3D space; or (4) 2D or 3D mapping data; or (5) 2D or 3D objects which can be set at any angle or turned completely around by the user; or (6) tilting all the windows to assist the user to pick up a desired window, provision of panning virtual desktop, virtual keyboards or keypads, a screen or a touchless screen, icons that reflect the live status of the window they represent and/or zooming of a window when it receives focus; (7) user or member internet activity data relating to searching, browsing, purchases, likes or dislikes, impressions, location, interactions or browsing the content of a social network or mobile network or other application online or via a mobile or wireless device, advertisements, brand/or merchants or global brands or demographic groups and/or interests; (8) social networking data of interactions or browsing the content of a social network or mobile network or other application online or via a mobile or wireless device between users or members through networking interests or connections, channels or platforms, target markets, advertisers and/or publishers, brand/or merchants or global brands and/or demographics groups; and/or (9) generated multimedia marketing and/or mapping data of relationships between users or members of a social network or website; (b) generating and/or delivering targeted, via a processor on a computer system or mobile device, first promotional data sets from the said initial end user data sets, the said first promotional data sets comprising first sets of customized promotions, social messaging, or offers that are provided as 2D or 3D mapping or mobile mapping interactive displays, the said first set of location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, customized, promotions, social messaging, or offers relating to products or services of the said product or service or service providers, or related products or services, for each of (i) the said initial end users or members, (ii) additional end users or members, and/or (iii) target end user groups;

optionally wherein the said generating and/or delivering targeted comprises electronically monitoring, collecting, and/or analyzing behavior information accessed by the user, the said behavior information comprising: (1) data on the said initial end users or members; (2) data on the said user or member profiles and/or lifestyle preferences; (3) data on the said location information; (4) user behavior and/or tracking a user's profile, unique data and/or actions online, or using encryption technologies and/or filters via a mobile device and/or using encryption technologies and/or filters information for consumer feedback analytics with a combination of location tracking, social media and/or cloud-based data analytics tracking; (5) data on global brand/or products or services of past, present or future customers, users and/or target markets; (6) data on the said product or service; or the said product or service providers; (7) data on the said points of interest; (8) data on the said 2D and/or 3D mapping data or mobile mapping data; (9) data on the said user or member internet activity; (10) data on the said social networking interactions or browsing the content of a social network or mobile network or other application or images or videos, interactive games, communications and/or data transfers and/or database management systems in the cloud using encryption technologies and/or filters to provide that personal data, communications data, identification data, location data and/or other information and/or data via a mobile or wireless device and/or cloud security for internet or mobile access or system using encryption technologies and/or filters to protect communications, storage and/or transfer of personal data in the cloud from an endpoint through multiple devices, browsers, operating systems, networks, fiber optic communications, multichannel platforms, servers, storage, software, applications and/or services with cloud security using encryption technologies and/or filters for mobile computing for user's preferred a user's privacy and/or security; (11) data on the said user or member likes or dislikes, impressions; (12) data on the said advertisers and/or publishers, brand/or merchants or global brands or demographic groups or other interests; (13) data on the said online consumer feedback analytics with a combination of location tracking, social media communications tracking, data tracking, identification tracking, traffic analysis, electronic surveillance tracking and/or cloud based data analytics tracking and/or for generating relevant advertising, mobile, internet social messaging, internet posted promotions or offers for products or services via online activity, communications, location information data, and/or social media content relevant to consumer products or services, or promotions thereof and/or (14) cross-channel mobile messaging platforms;

optionally further comprising electronically displaying to the said users, members, target markets, advertisers and/or publishers, brand/or merchants or global brands or demographics groups, on the said 2D or 3D mapping or mobile mapping interactive displays, the said first set of location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, customized, promotions, social messaging, or offers that are displayed as ad links, promotion or offer information, or promotional media or location data, sharing links or updates, communications and/or data transfers and/or database management systems in the cloud using encryption technologies and/or filters to provide that personal data, communications data, identification data, location data and/or other information and/or data via a mobile or wireless device and/or encryption with cloud computing wherein the said first set is provided as part of a first social/geo/promo link category for a first position of a social/geo/promo link promotional data set;

optionally further comprising electronically identifying via a computer processor one or more second social/geo/promo link categories of the said location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, customized, promotions, social messaging, or offers using one or more correlation criteria, at least one second social/geo/promo link category having one or more correlation criteria associated with the said first social/geo/promo link category, wherein the said second social/geo/promo links can be provided to additional 2D or 3D mapping interactive displays provided to one or more of the said users, members, target markets, advertisers and/or publishers, brand/or merchants or global brands, demographics groups or geographic data;

optionally wherein the said generating and/or delivering targeted step (b) further comprises: generating and/or delivering targeted, via a processor on a computer system or mobile device, second promotional data sets from the said first promotional data sets, the said second promotional data sets comprising second sets of location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/ or other information and/or data via a mobile or wireless device and/or cloud computing sharing and/or consent sharing, customized, promotions, social messaging, or offers that are provided as 2D or 3D mapping or mobile mapping interactive displays, the said second set of customized promotions, social messaging, or offers relating to products or services of the said product or service or service providers, or related products or services, for each of (i) the said initial end users or members, (ii) additional end users or members, (iii) target end user groups, and/or (iv) advertisers and/or publishers, brand/or merchants or global brands or demographic groups; and/or optionally wherein the said displaying step (c) further comprises: electronically displaying to the said users, members, target markets, advertisers and/or publishers, brand/or merchants or global brands or demographics groups, on the said 2D or 3D mapping or mobile mapping interactive display, the said second set of location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, customized, promotions, social messaging, or offers that are displayed as ad links, promotion or offer information, or promotional media, wherein the said second set is provided as part of the said first social/geo/promo link category for the said first position of a social/geo/promo link promotional data set;

optionally wherein the said promotions, social messaging, or offers comprise or are displayed as one selected from the group consisting of advertiser impressions, global brand/or impressions or demographic group impressions or user impressions or member impressions for targeted promotions, social messaging, or offers comprising of location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, customized, promotions, social messaging, or offers in a social network or mobile network for global brand/or products or services of past, present or future, customers, users, and/or target markets, for companies, organizations, government agencies, and/or the like, by electronically collecting and/or analyzing, on a networked computer system using a processor, qualitative or quantitative online social media online communications, activity, and/or other online communications and/or activity, relevant to consumer products or services, or promotions thereof, of interest, in order to proved targeted, location-based data social networking preferences, online activities, notifications and/or user's behavior data, location data, sharing links or updates, communications and/or data transfers and/or database management systems in the cloud using encryption technologies and/or filters to provide that personal data, communications data, identification data, location data and/or other information and/or data via a mobile or wireless device and/or cloud computing sharing and/or consent sharing, 2D or 3D mapped, or impressions to generate online location information data or promotions or offers to provide improved or desired customer perception or sentiment regarding a company's products, services or promotions thereof;

optionally wherein the said mobile ad networks and/or ad servers, routers, processors or sub-processors, payment routers (routing a payment request), data centers, data storage, security, network operators, third party is selected from a government agency, a credit reporting agency, a social network, a website, a service provider, an auction site, a company, an educational or financial institution, a bank, a lender or mortgage company, a title company, an auto finance company, government agency, financial services, insurance, telecommunications, retail, travel, healthcare, pharmaceuticals and/or other fields, an airline or a regulatory agency according to applicable laws and/or regulations;

optionally wherein the said company is selected from the group consisting of a bank, lender or financial services company, a product company, a services company, a social network, a mobile network, an application, a website, a service provider, an auction site, a company, a global brand, a brand/or merchant or retailer, a real estate company, a title company or related services, an auto finance company, government agency, financial services, insurance, telecommunications, retail, travel, healthcare, pharmaceuticals and/or other fields, an airline, an educational or financial institution or bank, an entertainment company, an online auction, sport franchise, online gambling or mobile gaming, mobile casinos, mobile music or mobile operators or network operators or other type of service company;

optionally wherein the said method further comprises: (I) said user designating a portion of a purchase of the said product or service as a donation to; or (II) providing the said user with website links to: donation related advertisers and/or publishers, brand/or merchants or global brands or demographic groups, organizations or companies that provide donations comprising charitable contributions, humanitarian aid, sustainable gifts or loans; auto finance company, government agency:

optionally wherein said product or service is a global brand, a brand/or merchant or retailer for user/consumer products;

optionally wherein: the social/geo/promo link promotional data set is associated with a web page; and/or the social/geo/promo link categories are ordered by capturing, processing, analyzing and/or filtering relevance, social content multimedia marketing, social contextual ads and/or connections among the said users, members, or their friends, family, acquaintances, classmates, or business associates; user-contributed information, mood recording impressions & updating, friend communications and/or blog impressions and/or focused multimedia marketing and/or those interactions or browsing the content of a social network or mobile network or other application online or via a mobile or wireless device are used to select targeted location-based promotions, location-based offers, location-based coupons, promotions, social messaging, or offers in connection with online or mobile ads, mobile messages, mobile coupons, mobile promotions, mobile offers feed for users or members of a social network or website, and/or connecting them with the brand/or advertiser to the web page;

optionally wherein identifying one or more second social/geo/promo link categories using one or more correlation criteria further comprises: identifying one or more social/geo/promo link categories having a correlation measure that is less than a correlation threshold;

optionally wherein at least one second social/geo/promo link category has a separate correlation measure for at least one pair-wise combination of collecting, mining, processing and/or storing social media, mobile and/or cloud data transmitted in the cloud service providers, servers, social networks or mobile networks including a category identifier associated with the at least one second social/geo/promo link category and/or a category identifier associated with the first social/geo/promo link category;

optionally wherein the said access in step (a) is subject to identity verification;

optionally wherein the said social networking is provided as one selected from social shopping, social networking interactions or browsing the content of a social network or mobile network or other application or images or videos, interactive games, communications and/or data transfers and/or database management systems in the cloud using encryption technologies and/or filters to provide that personal data, communications data, identification data, location data and/or other information and/or data via a mobile or wireless device and/or cloud security for internet or mobile access or system using encryption technologies and/or filters to protect communications, storage and/or transfer of personal data in the cloud from an endpoint through multiple devices, browsers, operating systems, networks, fiber optic communications, multichannel platforms, servers, storage, software, applications and/or services with cloud security using encryption technologies and/or filters for mobile computing with access to social networking websites or mobile ad networks and/or ad servers, routers, processors or sub-processors, payment routers (routing a payment request), data centers, data storage, security, network operators, third party websites or applications or widgets, social plugins, social or business applications, SSLs, web cookies, web beacon, Flash cookies, evercookies, HTTP cookies, HTML browsers, tracking cookies, third-party tracking cookies, authentication protocols cookies, cookies and/or mobile cookies, browsing activity, browser cookies, advertising cookie, cookie-based targeting, flash cookie, location-based cookie and/or other mobile ad networks and/or ad servers, routers, processors or sub-processors, payment routers (routing a payment request), data centers, data storage, security, network operators, third party cookie that gathers and/or tracks a user's actions online, tracking which websites a user has viewed, storing information associated with specific websites (such as items in a shopping cart), tracking movement from one website to another and/or building a profile around a user, and/or embedded advertisements;

optionally further comprising a consumer feedback analytics with a combination of location tracking, social media communications tracking and/or cloud-based data analytics tracking and/or predictive analytics for multimedia marketing platform method optionally comprising one or more of:

(c) electronically collecting and/or analyzing, on a networked computer system using a processor, quantitative or qualitative online consumer feedback analytics with a combination of location tracking, social media communications tracking and/or cloud-based data analytics tracking and/or for generating mobile, internet social messaging, internet posted promotions or offers for products or services via online activity, communications, location information data, and/or social media content relevant to consumer products or services, or promotions thereof, of interest in a category from one or more online user online activity and/or social media sources;

the consumer feedback analytics with a combination of location tracking, social media communications tracking and/or cloud-based data analytics tracking and/or for generating mobile, internet social messaging, internet posted promotions or offers comprising:
  (i) impressions data comprising tracking and/or analysis of website access to said user's, target markets', advertisers and/or publishers, brand/or merchants or global brands, users, demographic groups or geographic data;
  (ii) location information data relating to selected;
    (a) users, target markets, advertisers and/or publishers, brand/or merchants or global brands, demographic groups or geographic data;
    (b) (1) products or services; or (2) product or service providers; and/or
    (c) points of interest near or associated with (1) said consumers, target markets, advertisers and/or publishers, brand/or merchants or global brands, demographic groups or geographic data; (2) said products or services; or (3) said product or service providers;
  (iii) 2D and/or 3D mapping data related to selected:
    (a) user, target market, advertiser, social or global brand/or or demographic group locations or associated locations; or
    (b) product or service or service provider locations or associated locations;
  (iv) user internet activity data relating to user searching, browsing, purchases, location, interactions or browsing the content of a social network or mobile network or other application online or via a mobile or wireless device, and/or interests; and/or
  (v) social networking data of interactions or browsing the content of a social network or mobile network or other application online or via a mobile or wireless device between said user and/or other users, target markets, advertisers and/or publishers, brand/or merchants or global brands and/or demographics groups and/or geographic data; and
  (vi) generated multimedia marketing and/or mapping data of relationships between users or members of a social network or website
  (d) electronically quantifying on a networked computer system using a processor the collected online consumer feedback analytics with a combination of location tracking, social media communications tracking and/or cloud-based data analytics tracking and/or for generating mobile, internet social messaging, internet posted promotions or offers for products or services via online activity, communications, location information data, and/or social media content; to electronically obtain, using a computer system processor, structured analytic measurements data of the online consumer feedback, consumer data, real-time for products or services via online activity, communications, location information data, and/or social media content, including electronic analytic measurements data of consumer or brand/or sentiment expressed data among online internet activity and/or social media participants concerning the consumer products or services, or promotions thereof, of interest in the category; and/or
  (e) electronically providing on a networked computer system using a processor actionable information data to companies, organizations, and/or governmental agencies based on the analytic measurements data of the online activity, communications, location information data, and/or social media content, in order to provide targeted, location-based data social networking preferences, online activities, notifications and/or user's behavior data, location data, sharing links or updates, communications and/or data transfers and/or database management systems in the cloud using encryption technologies and/or filters with a mobile or wireless device and/or cloud computing sharing and/or consent sharing, 2D or 3D mapped, or impressions to generate online location information data or promotions or offers to provide improved or desired customer perception or sentiment regarding a company's products, services or promotions thereof.

A number of implementations have been described. Nevertheless, it can be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and/or other components may be added to, or removed from, the described systems. Accordingly, other implementations are within the scope of the following claims.

What is claimed is:

1. A method for promotion and sales of products and services to a user, with user selected privacy and security settings, the method comprising:
  (a) electronically providing an integrated social networking and 2D and 3D geospatial mapping interactive website that provides geospatial mapping interactive displays interactive with social networking, where the geospatial interactive displays provide a multi-dimensional and scalable geospatial mapping functional tool, and where the social networking provides interactive emailing, instant messaging, texting, online auctions, social networking communities, online communications, user profiles, social plugins, social applications, entertainment shopping, bidding, advertisements, promotions, online coupons, mobile services, products, goods and services;
  (b) electronically assigning and providing, on an electronic computing system via a processor, a unique identifier to said user from a client mobile device or client computer receiving a request from said user to provide said user with said unique identifier through a client application operating on said client mobile device or client computer,
  (c) electronically accessing, on an electronic computing system via a processor, and using the unique identifier, on a computer processor and a graphical user interface (GUI), a website or window, displayed on the GUI on said user's client mobile device or client computer;
  (d) electronically selecting, on said website or window, a data security and privacy configuration using user-selected privacy and security settings, said data and privacy configuration comprising filtered data sets comprising opted-out, filtered, categorized, encrypted, concealed, and blocked portions of personal data sets comprising said user's: personal data, communications data, social networking data, 2D or 3D mapped location data, and browsing data, said data security and privacy configuration configured to substantial prevent electronic access to said filtered data sets by third parties;
  (e) electronically implementing on said user's computer processor said user selected security or privacy configuration preventing said access to said filtered data sets by said third parties;
  (f) electronically accessing by said user, on said user's computer processor implementing said user selected security or privacy configuration and using said unique identifier, said user's electronic activity to generate said user's personal data, communications data, social networking data, 2D or 3D mapped location data, and browsing data;
(g) electronically collecting and analyzing, on an electronic computing system via a processor, said user's filtered data sets, comprising said personal data sets excluding said filtered data sets, to generate initial end user data sets and first promotional data sets from said initial end user data sets, said first promotional data sets comprising first sets of customized promotions, social messaging, and offers that are configured to be provided as 2D or 3D mapping and mobile mapping interactive displays on a GUI to said user, via a mobile or wireless device;
wherein said generating of said first promotional data sets from said initial end user data sets comprises electronically monitoring, collecting, and analyzing said user's filtered data sets using a combination of: (1) location tracking, (2) social media communications tracking, (3) data tracking, (3) identification tracking, (4) data analytics tracking; (5) data on global brand products or services of past, present or future customers, users or target markets; (6) data on products, services, and said product or service providers; (7) data on points of interest; (8) data on 2D or 3D mapping data and mobile mapping data; (9) data on said user internet activity; (10) data on social networking interactions and browsing the content of a social network and images and videos, (11) interactive games, (12) data on said user likes, dislikes, and impressions; (13) data on said advertisers, publishers, brand merchants, global brands, and demographic groups;
(h) electronically displaying, to said user, first sets of customized promotions, social messaging, and offers provided as 2D or 3D mapping or mobile mapping interactive displays on a GUI to said user, via a mobile or wireless device;
wherein said customized promotions, social messaging, and offers are selected from: promotions, social messaging, or offers from advertisers or publishers, brand merchants or global brands or demographic groups or users or members, an advertisement, a location-based promotion, a location-based offer, a location-based discount, a daily deal ad, location-based advertising, a location-based ad, a location-based deal or offer, a mobile display ads, a mobile ad network, mobile multimedia marketing or advertising, mobile location data, mobile location-based advertising, a customer loyalty card, a discounts, a promotion, an offer, a location-based promotion, an online or mobile coupon or promotion, mobile location data, mobile location-based advertising, a promotions, social messaging, or offers associated with a location or a map or a social message in a social network or website online or mobile device, a location-based mobile coupon, a mobile grocery coupon, a mobile gas coupon, mobile payment systems, subscribe to mobile coupons or purchase mobile apps or cloud-based apps, a mobile airline coupon, a mobile ad products, a targeted mobile ad, a mobile multimedia marketing or advertising network, or a mobile coupon;
wherein said mobile device is selected from the group consisting of a smartphone, a tablet device, a cell phone, a mobile internet device, a wireless device or application, a netbook, a notebook, a personal digital assistant, an internet phone, a holographic device, a holographic phone, a cable internet device, a satellite internet device, an internet television, a DSL internet device, or a portable internet access device or computer.

2. The method according to claim 1,
wherein said personal data sets comprise data including information of said user's: texting, SMS, MMS messaging, instant messaging, multimedia messaging, audio or video conferencing, email, voicemail, video mail, pictures, video, chat, or multimedia, contacts, promotions, social messaging, or offers, website access; browser cookies or session cookies; online purchases, wish lists, gift lists, purchase history, browsing history, behavior, likes and dislikes, demographic information, categories relating to products or services, preferences, promotions accessed, purchase histories, behavior, 2D or 3D mapping of user location, locations of interest, and browsed companies, products, and service locations.

3. A method according to claim 1, wherein said targeted personal data sets excluding said filtered data sets further comprise: promotions, social messaging, and offers, accessed by said user.

* * * * *